United States Patent
Seok et al.

(10) Patent No.: US 12,342,338 B2
(45) Date of Patent: Jun. 24, 2025

(54) METHOD FOR CONFIGURING SUBBAND IN WIRELESS COMMUNICATION SYSTEM AND DEVICE THEREFOR

(71) Applicant: WILUS INSTITUTE OF STANDARDS AND TECHNOLOGY INC., Gyeonggi-do (KR)

(72) Inventors: Geunyoung Seok, Gyeonggi-do (KR); Minseok Noh, Gyeonggi-do (KR); Juhyung Son, Gyeonggi-do (KR); Youngjoon Yoon, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 18/942,296

(22) Filed: Nov. 8, 2024

(65) Prior Publication Data
US 2025/0071755 A1 Feb. 27, 2025

Related U.S. Application Data

(63) Continuation of application No. PCT/KR2023/006301, filed on May 9, 2023.

(30) Foreign Application Priority Data

| May 9, 2022 | (KR) | ........................ 10-2022-0056927 |
| Jun. 27, 2022 | (KR) | ........................ 10-2022-0078504 |
| May 2, 2023 | (KR) | ........................ 10-2023-0056967 |

(51) Int. Cl.
*H04W 72/23* (2023.01)
*H04L 1/08* (2006.01)
(Continued)

(52) U.S. Cl.
CPC ..... *H04W 72/1268* (2013.01); *H04W 72/0446* (2013.01); *H04W 72/0453* (2013.01); *H04W 72/231* (2023.01)

(58) Field of Classification Search
CPC ........... H04W 72/1268; H04W 72/231; H04W 72/0446; H04W 72/0453
See application file for complete search history.

(56) References Cited

U.S. PATENT DOCUMENTS

| 2019/0363824 A1 | 11/2019 | Sun et al. |
| 2024/0381330 A1* | 11/2024 | Gou ..................... H04W 72/231 |

FOREIGN PATENT DOCUMENTS

| WO | 2021/133953 | 7/2021 |
| WO | 2023/172418 | 9/2023 |
| WO | 2023/219398 | 11/2023 |

OTHER PUBLICATIONS

International Search Report for PCT/KR2023/006301 mailed on Sep. 27, 2023 and its English translation from WIPO (now published as WO2023/219398).

(Continued)

*Primary Examiner* — Melvin C Marcelo
(74) *Attorney, Agent, or Firm* — WOMBLE BOND DICKINSON (US) LLP

(57) ABSTRACT

In a wireless communication system, a terminal may comprise a transceiver and a processor for controlling the transceiver, wherein the processor configures a first subband for uplink transmission in a time domain interval and a second subband for downlink reception in the time domain interval, performs the uplink transmission through a first resource configured for the uplink transmission in the first subband, and performs the downlink reception through a second resource configured for the downlink reception in the second subband.

20 Claims, 25 Drawing Sheets

(51) Int. Cl.
    *H04L 5/00*         (2006.01)
    *H04L 5/14*         (2006.01)
    *H04W 72/04*       (2023.01)
    *H04W 72/0446*     (2023.01)
    *H04W 72/0453*     (2023.01)
    *H04W 72/1268*     (2023.01)
    *H04W 72/231*      (2023.01)

(56) References Cited

OTHER PUBLICATIONS

Written Opinion of the International Searching Authority for PCT/KR2023/006301 mailed on Sep. 27, 2023 and its English translation by Google Translate (now published as WO2023/219398).
NTT Docomo, Inc.: "Discussion on subband non-overlapping full duplex", 3GPP TSG RAN WG1 #109-e, R1-2204380, e-Meeting, Apr. 28, 2022 pp. 1-6.
Spreadtrum Communications: "Discussion on subband non-overlapping full duplex", 3GPP TSG RAN WG1 #109-e, R1-2203328, e-Meeting, Apr. 29, 2022, pp. 1-8.
Samsung: "Subband non-overlapping full duplex for NR duplex evolution", 3GPP TSG-RAN WG1 Meeting #109-e, R1-2203904, e-Meeting, Apr. 29, 2022, pp. 1-15.

\* cited by examiner

[Fig. 1]
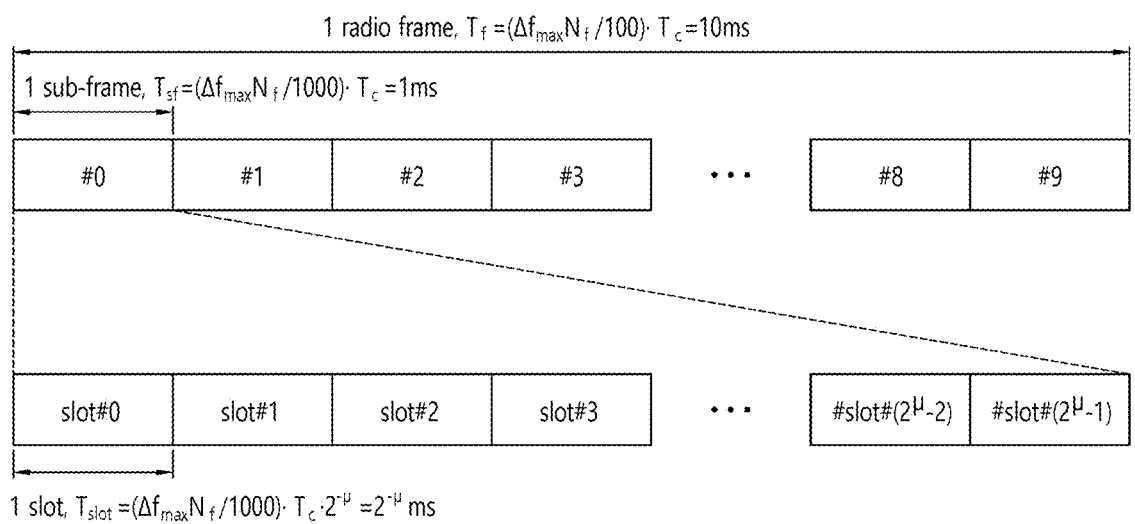

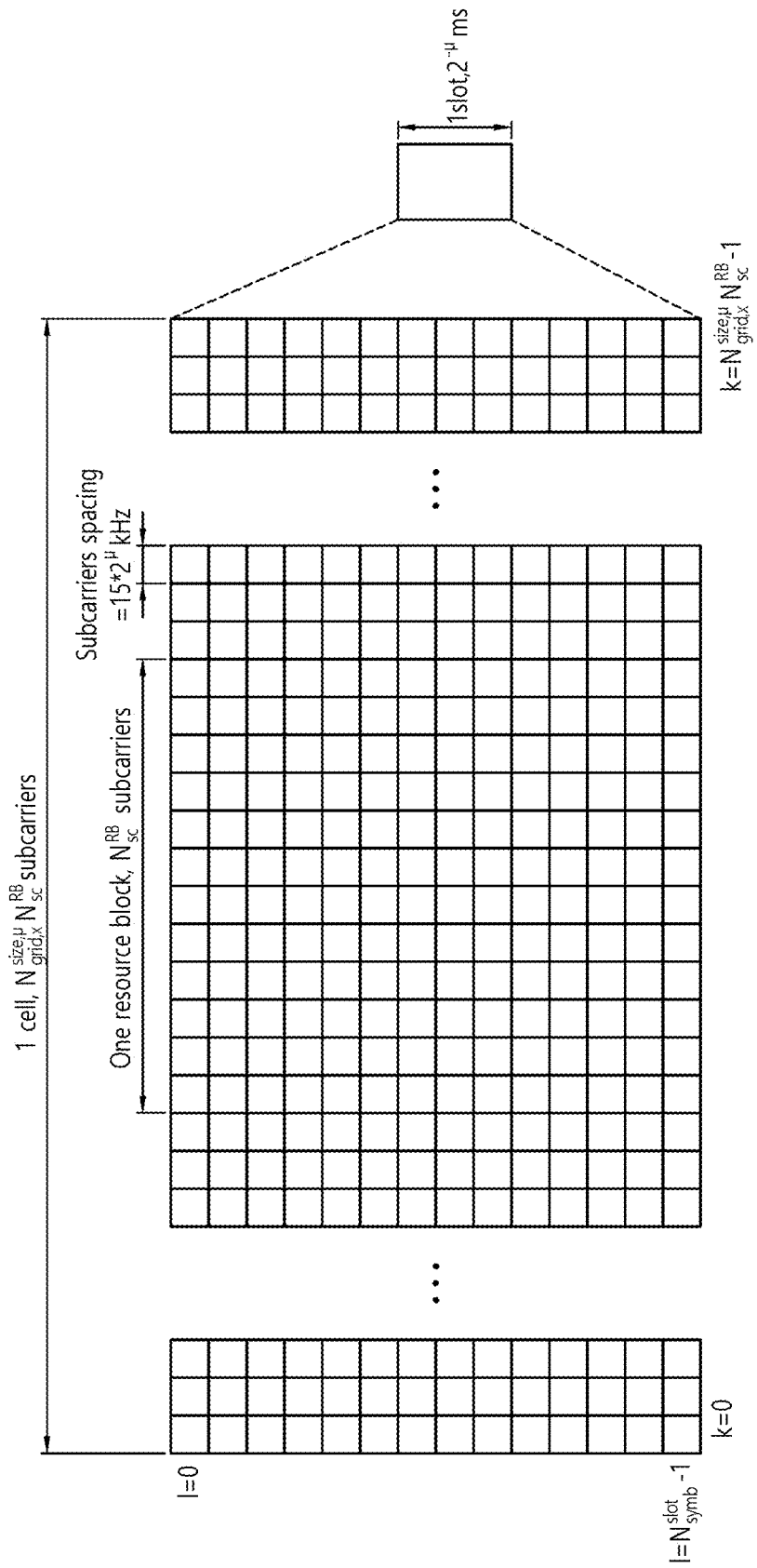
[Fig. 2]

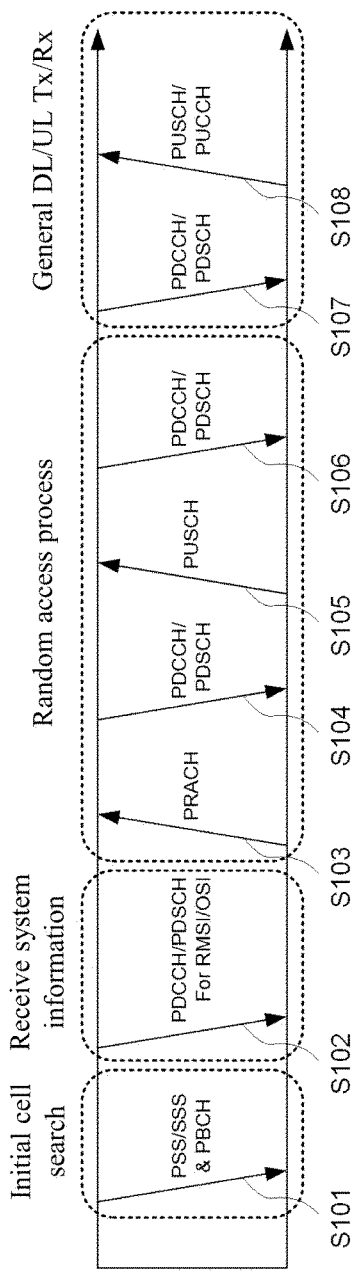
[Fig. 3]

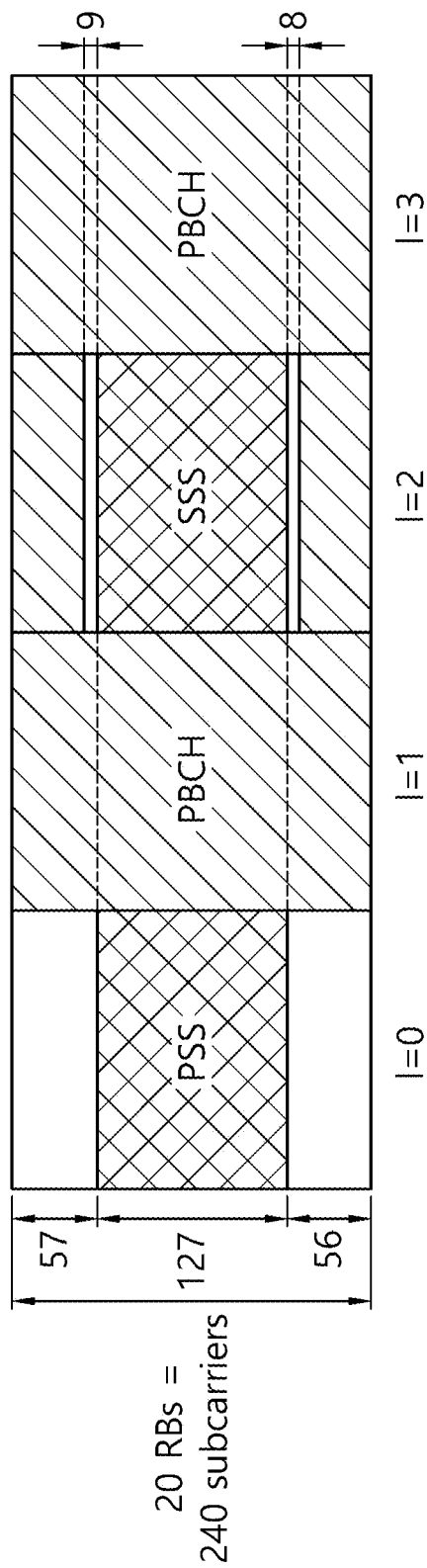
[Fig. 4a]

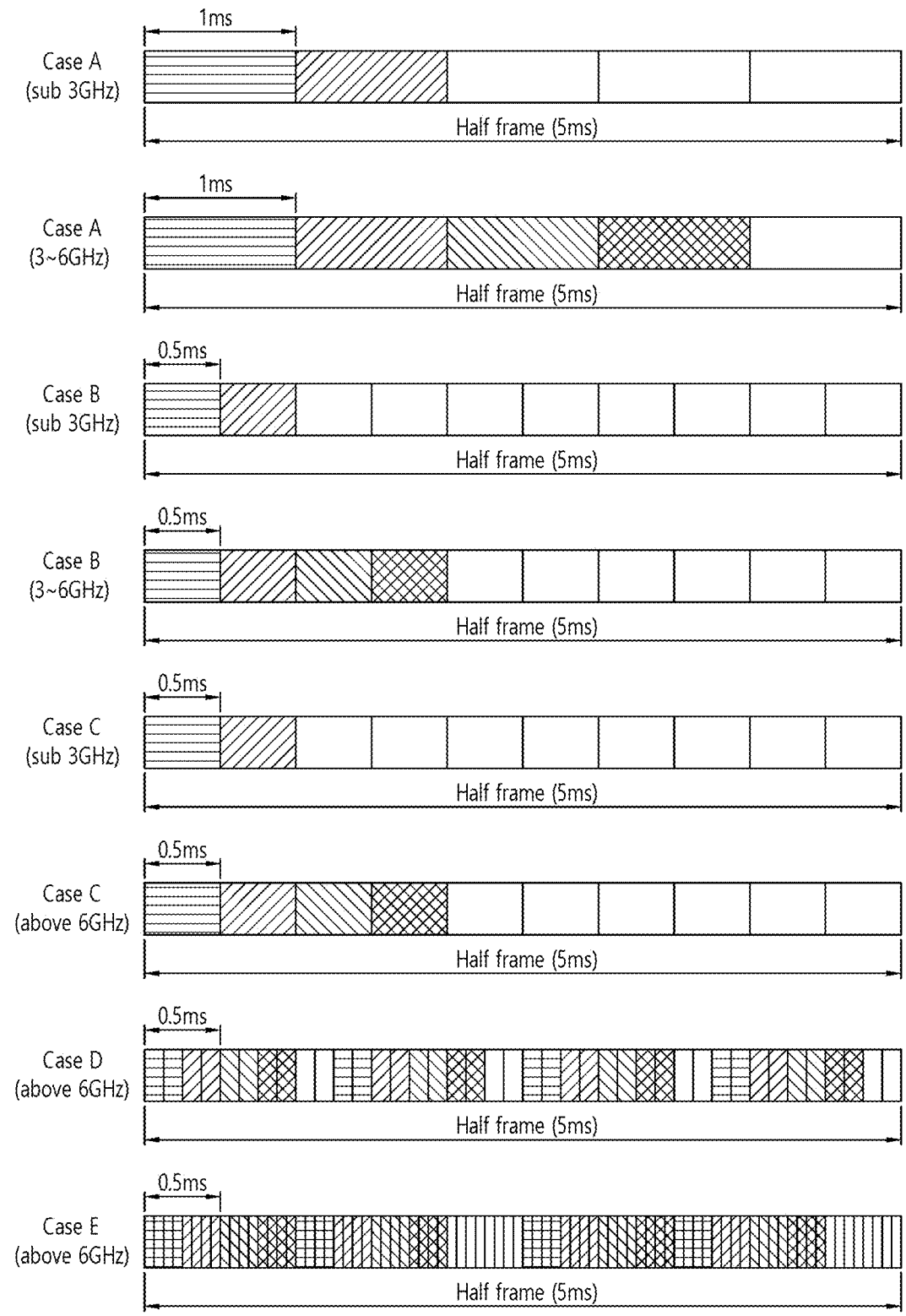
[Fig. 4b]

[Fig. 5a]
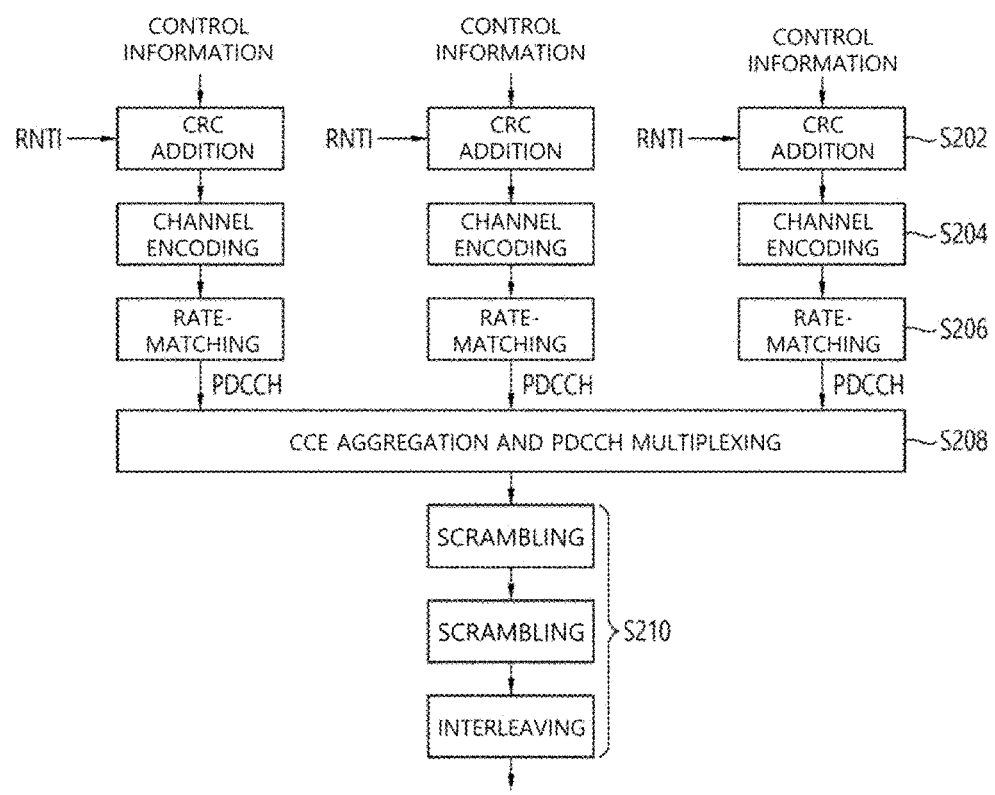

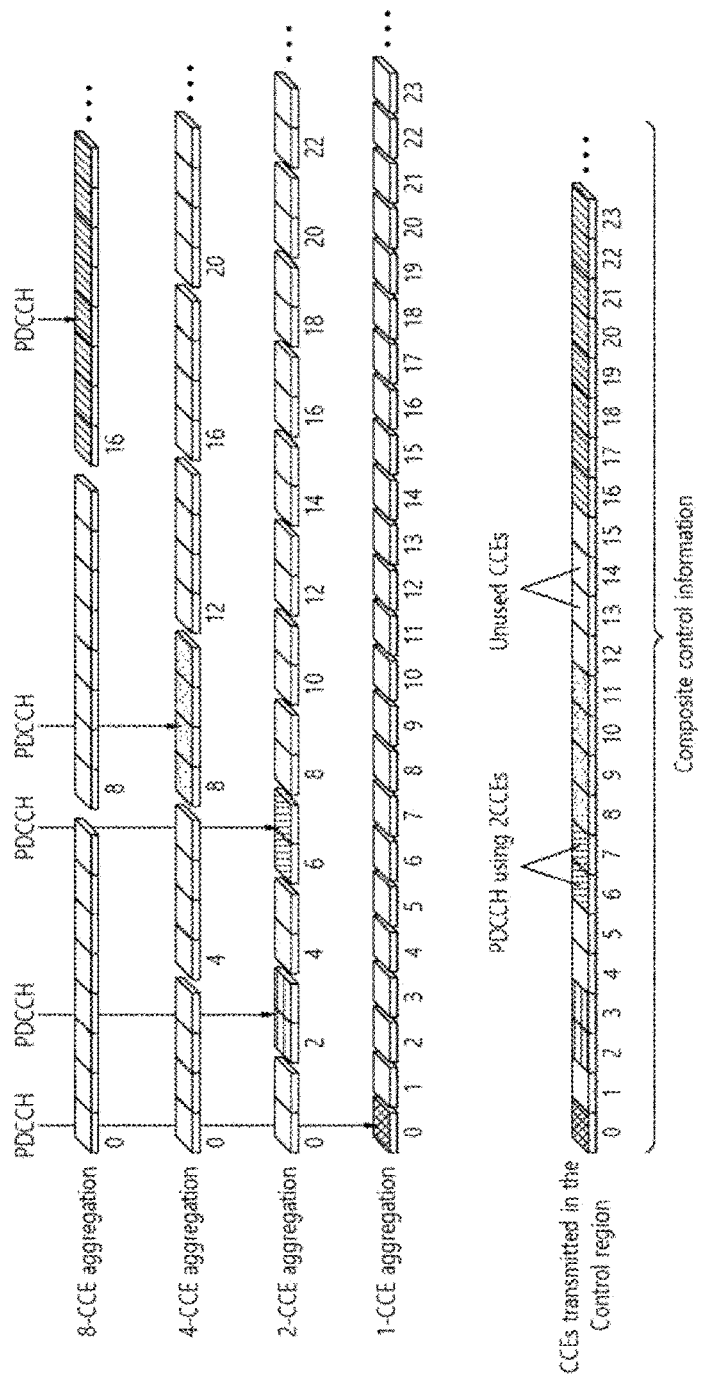
[Fig. 5b]

[Fig. 6]
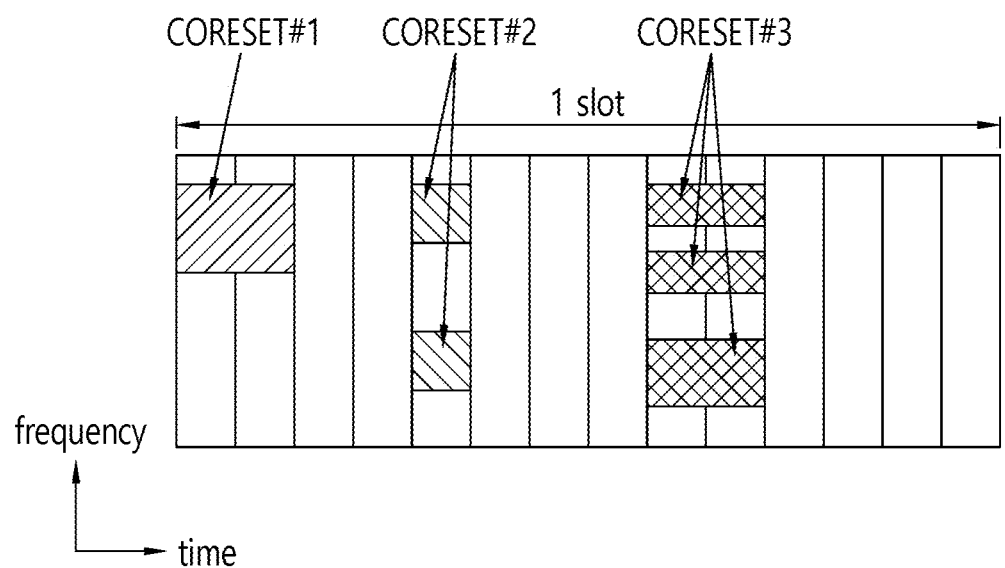

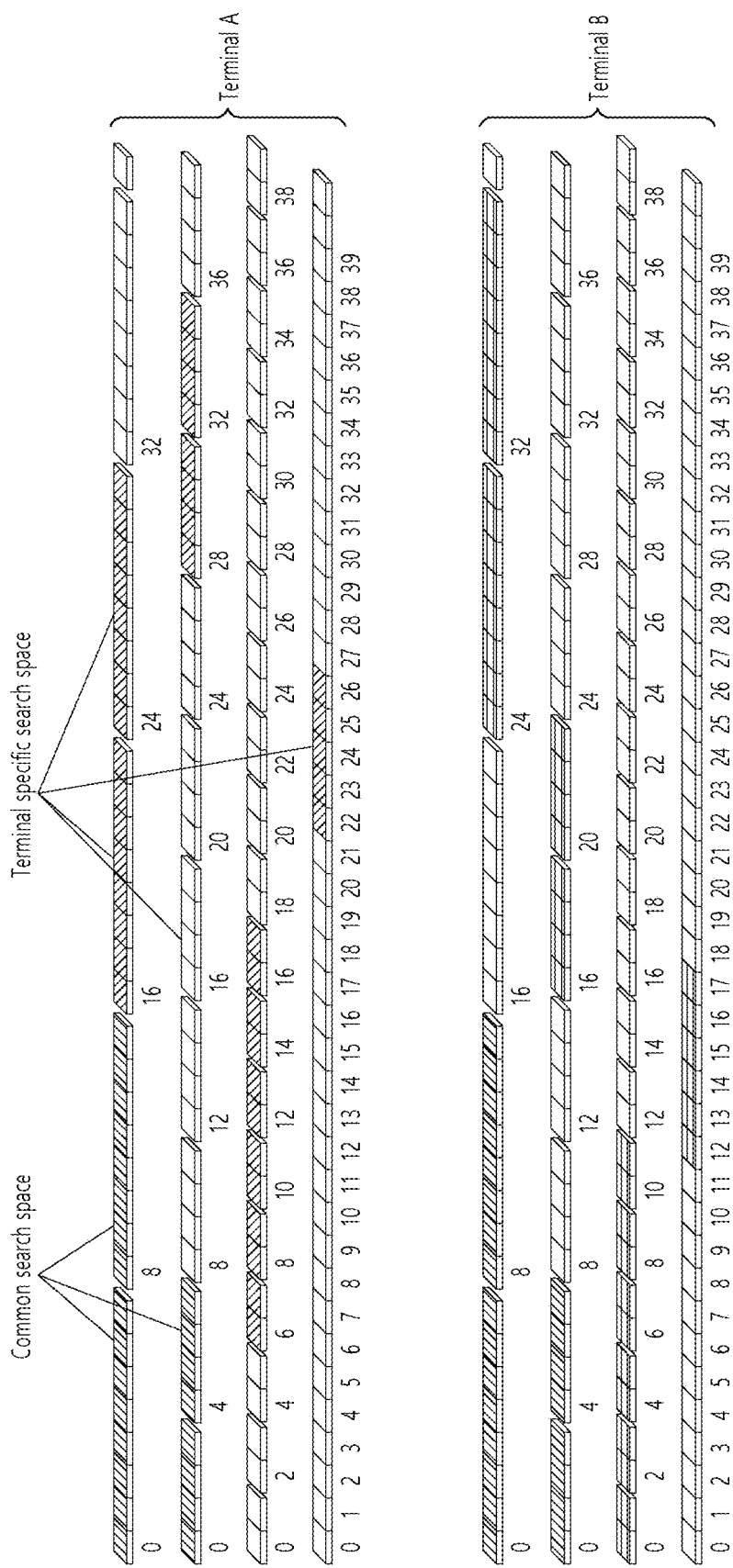
[Fig. 7]

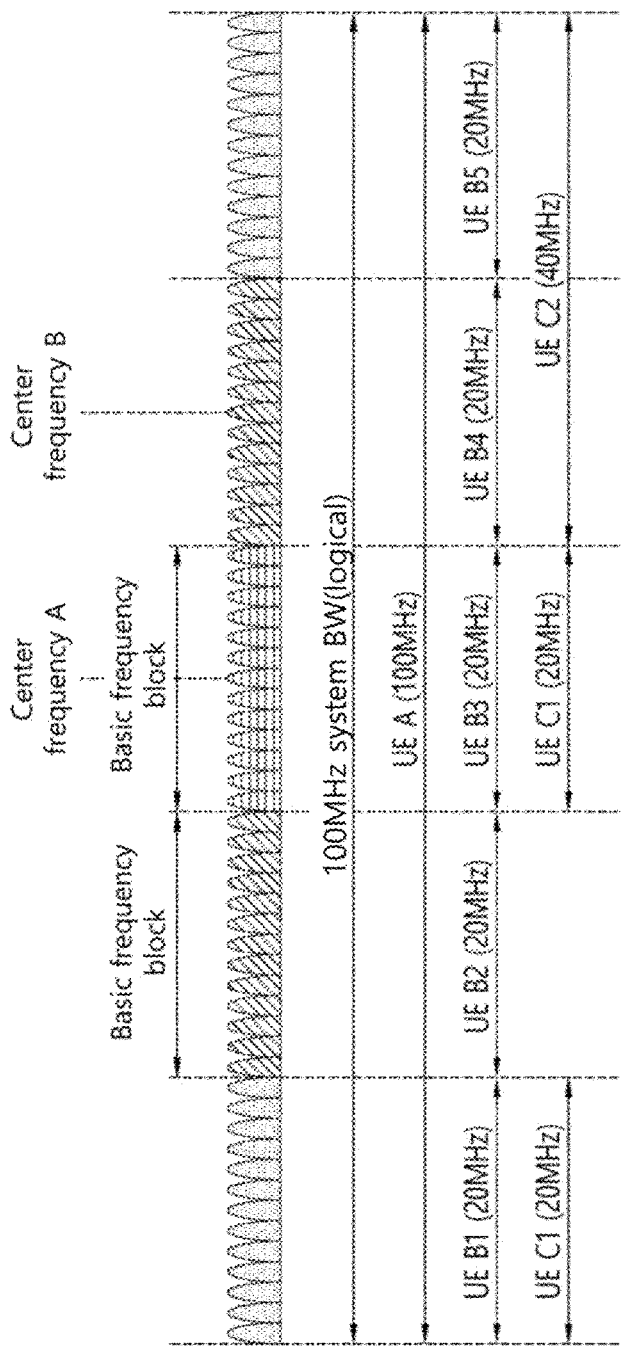
[Fig. 8]

[Fig. 9]
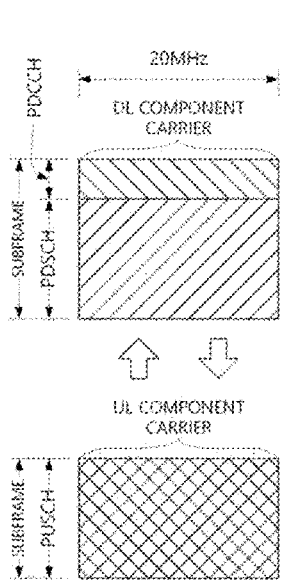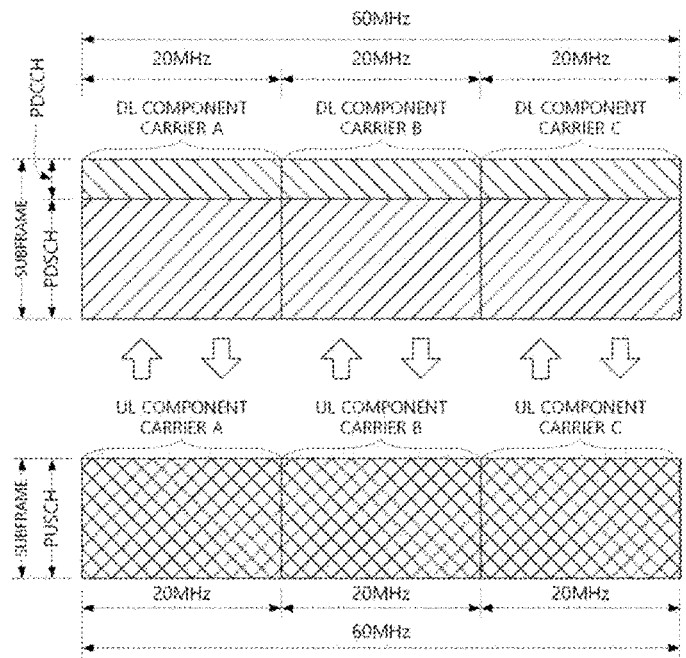
(a) Single CC
(b) Multiple CC

[Fig. 10]
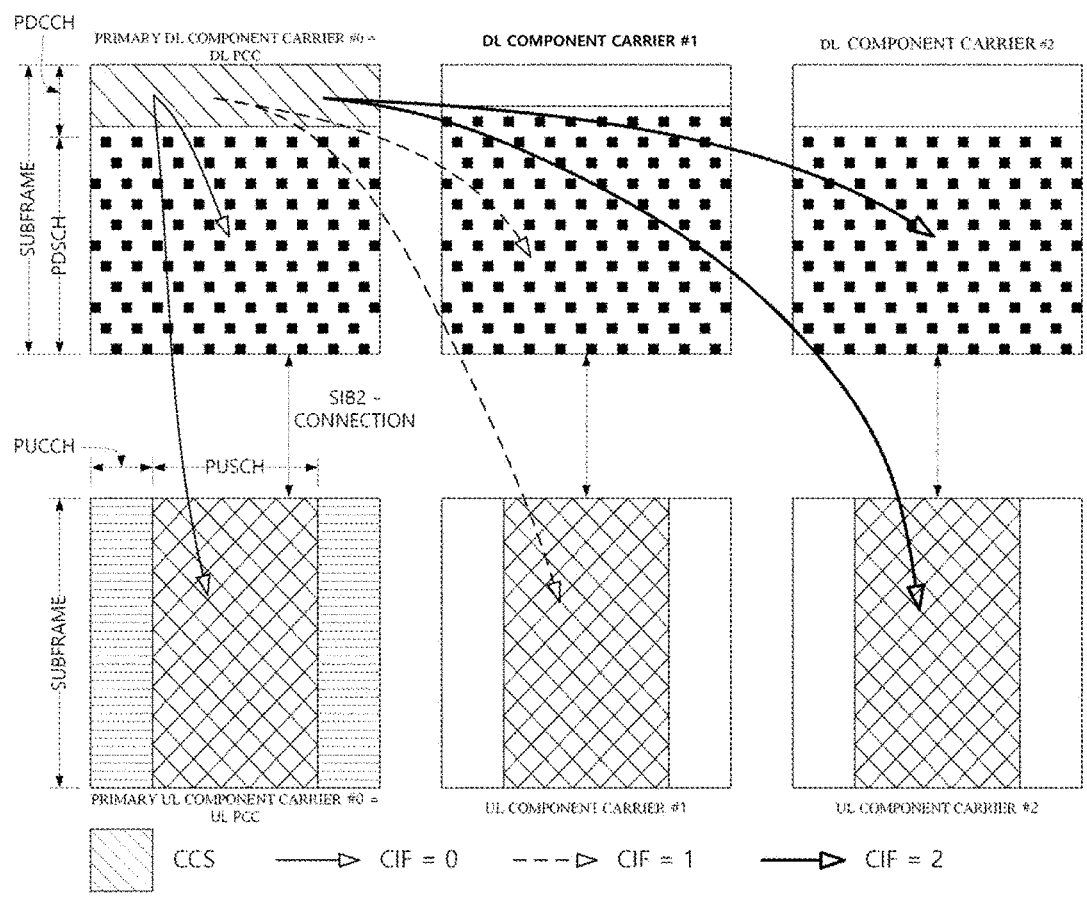

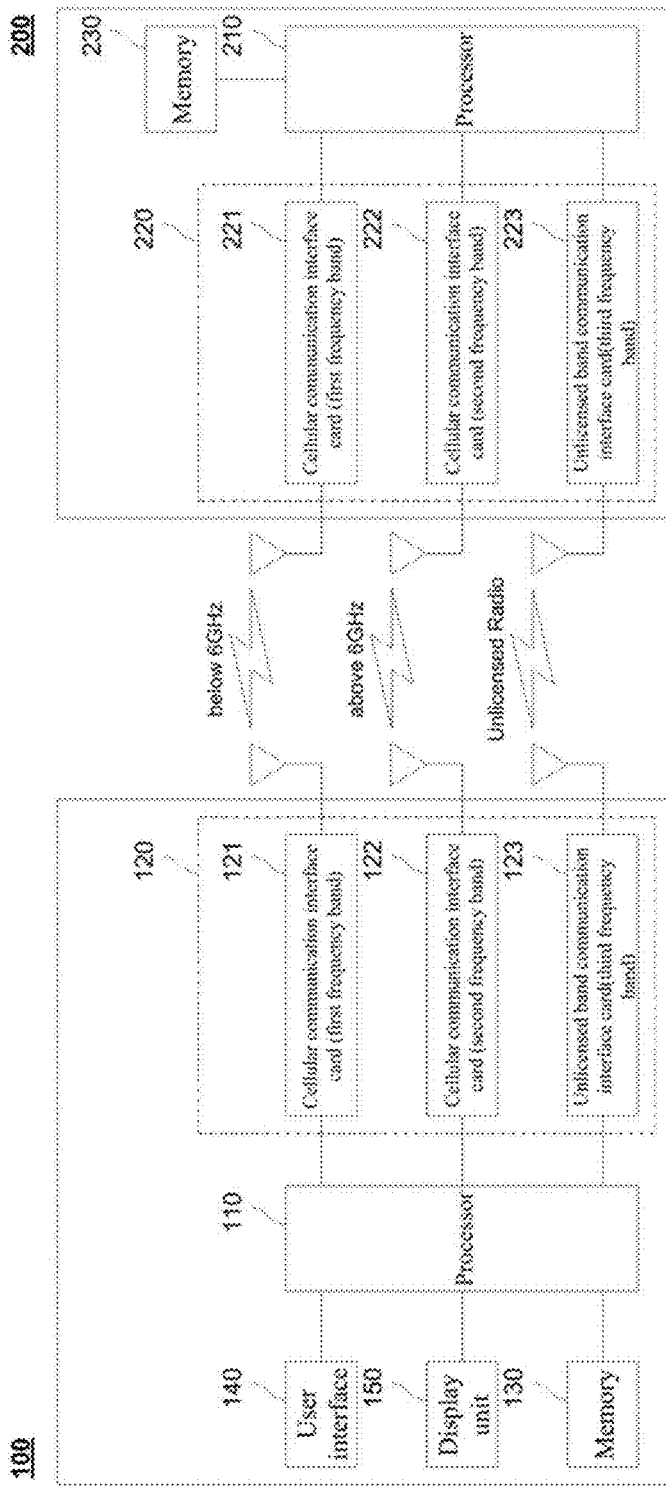
[Fig. 11]

[Fig. 12]
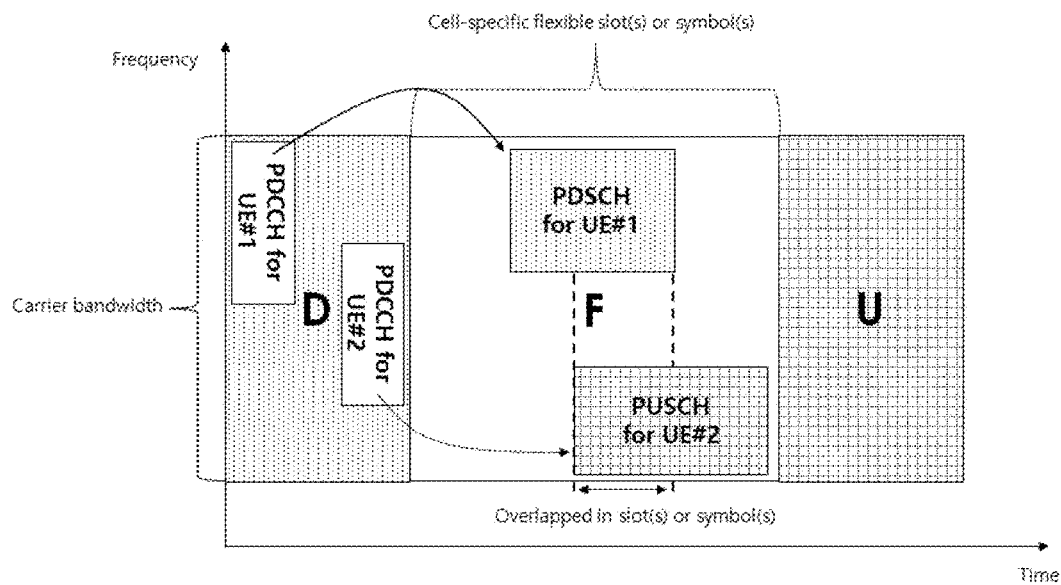
[Fig. 13]
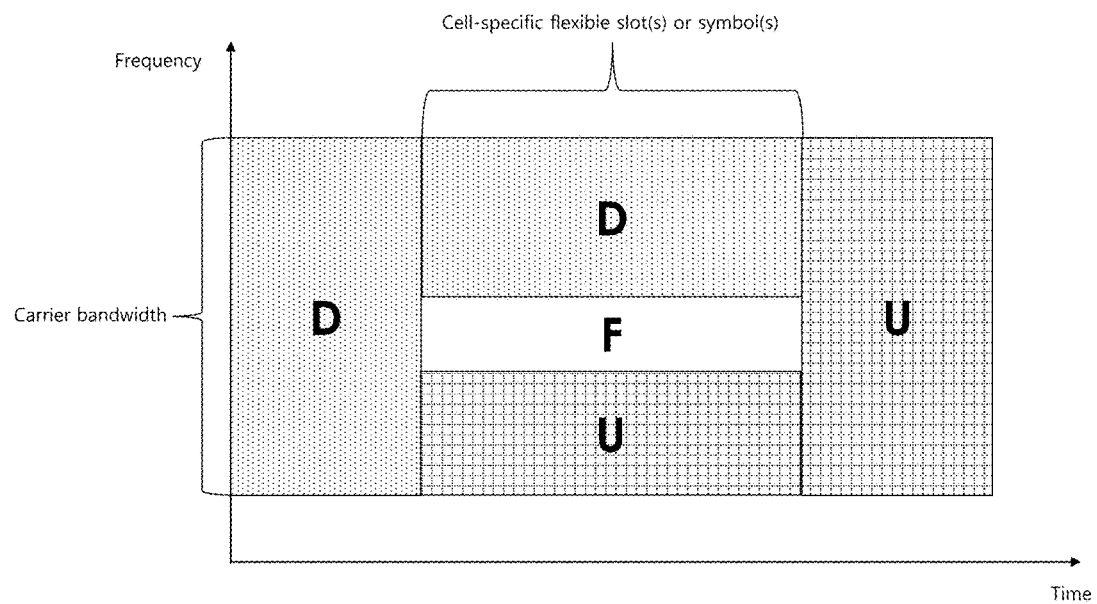

[Fig. 14]
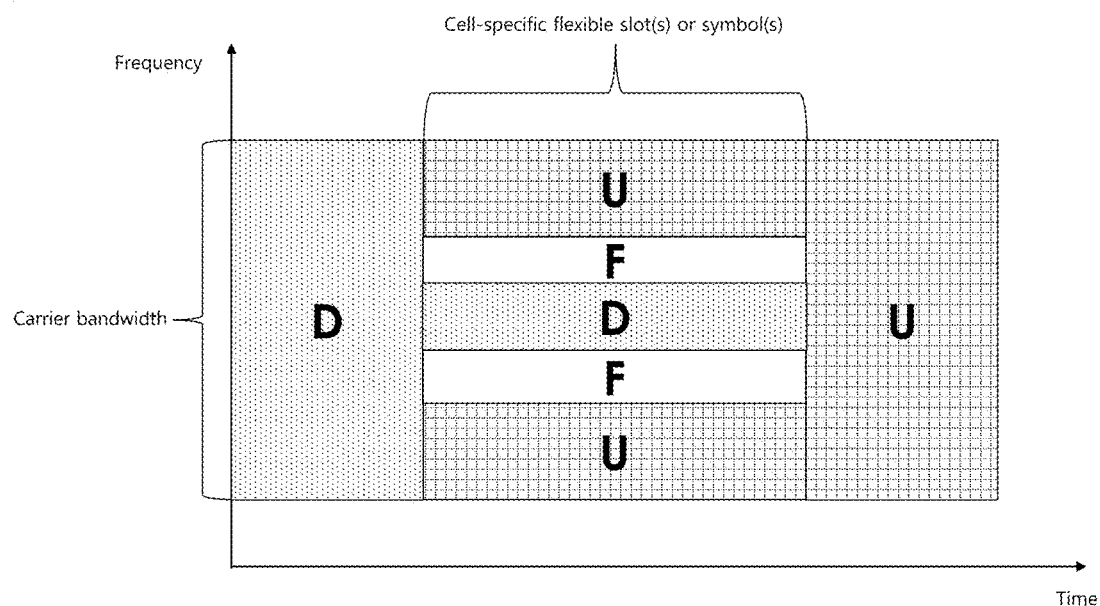
[Fig. 15]
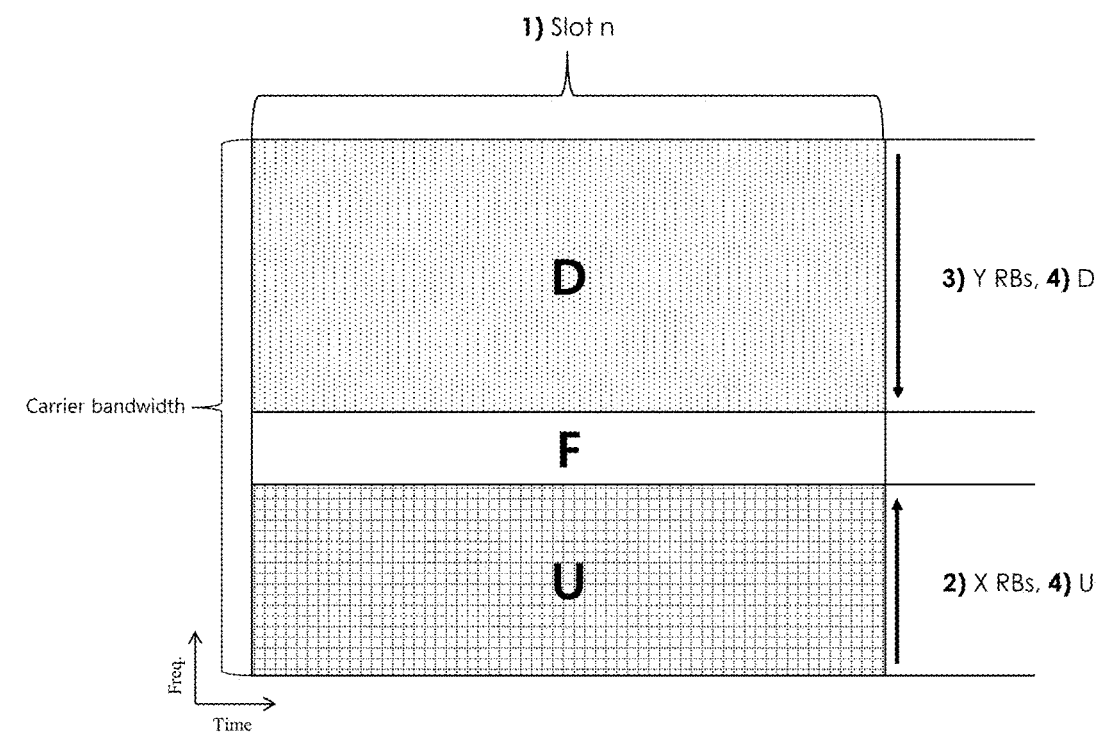

[Fig. 16]
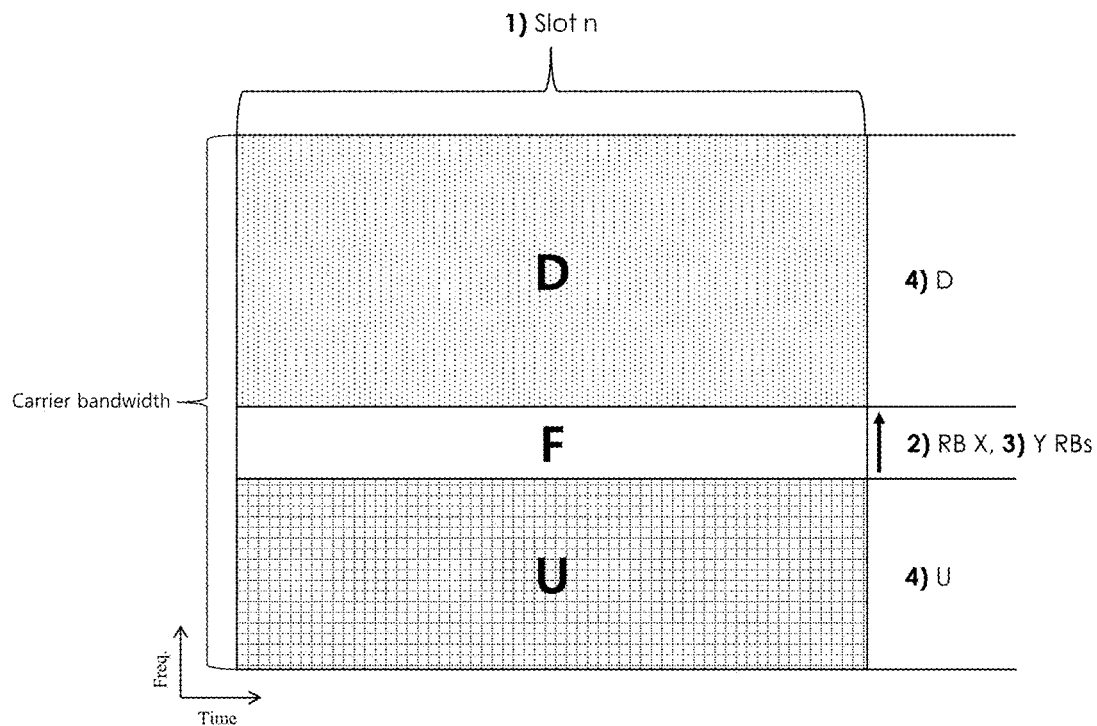
[Fig. 17]
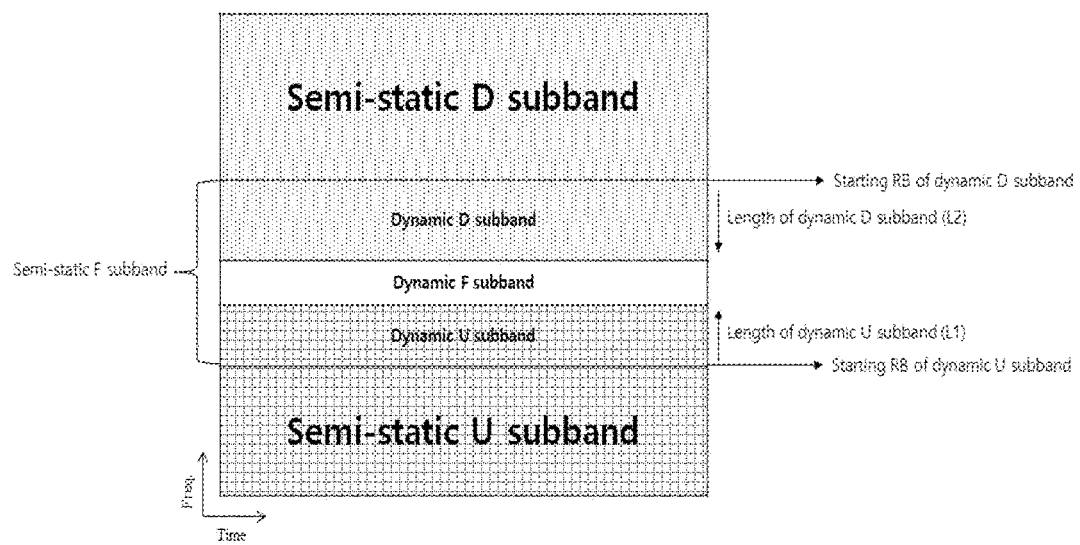

[Fig. 18]
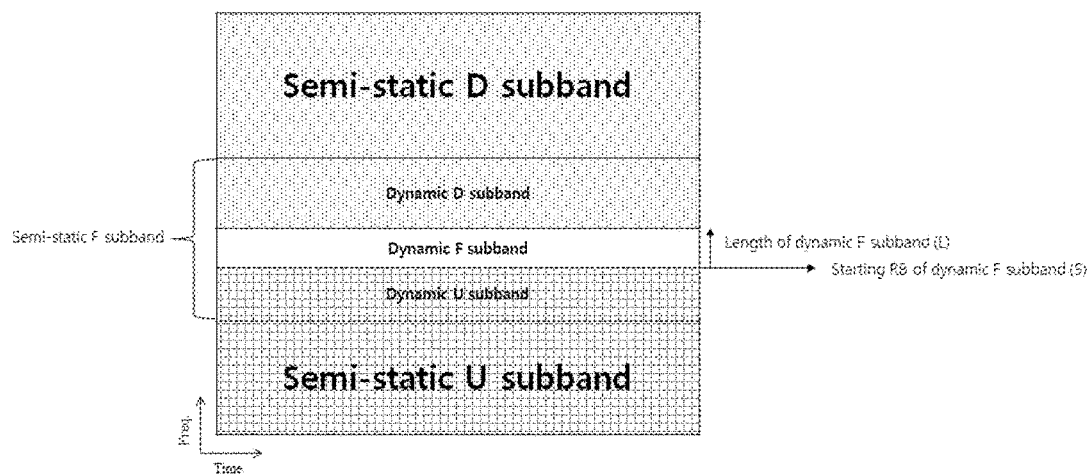
[Fig. 19]
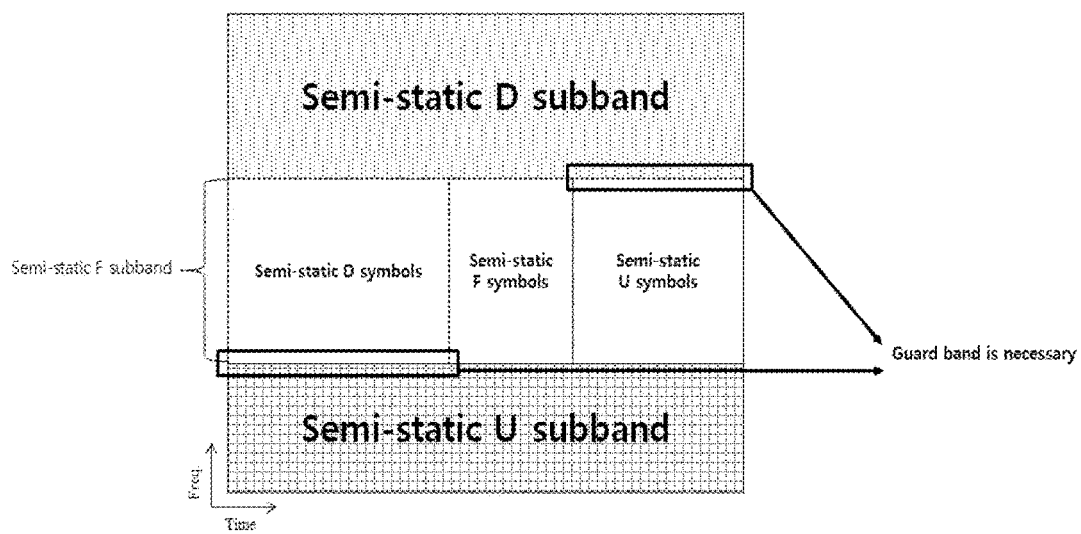

[Fig. 20]
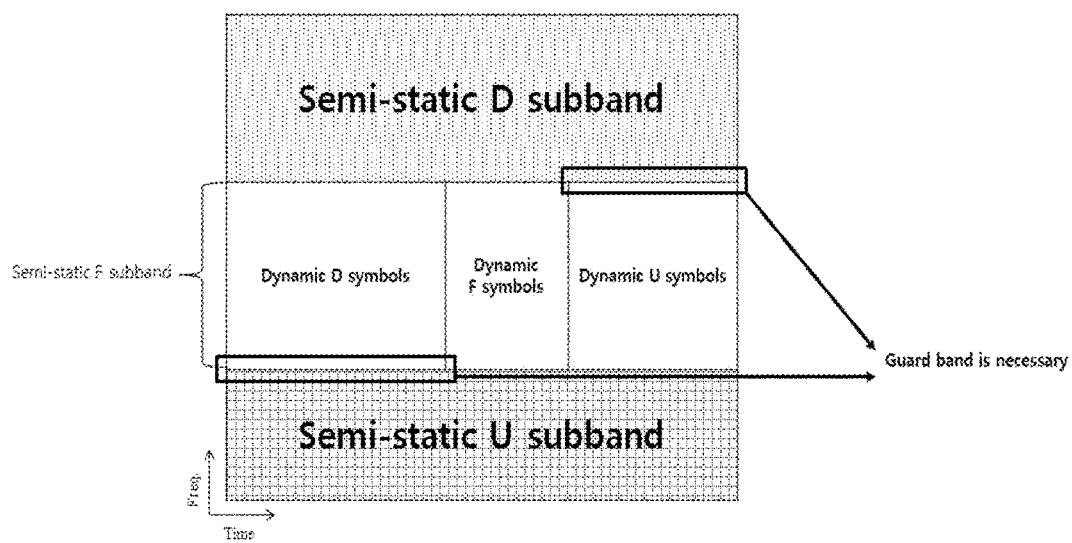

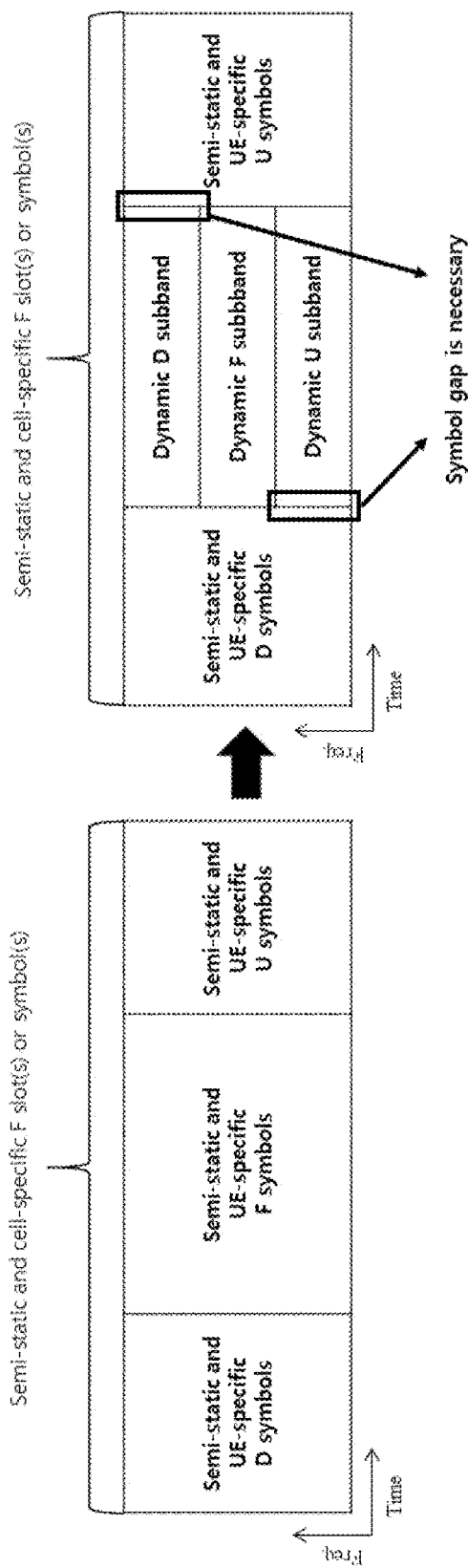
[Fig. 21]

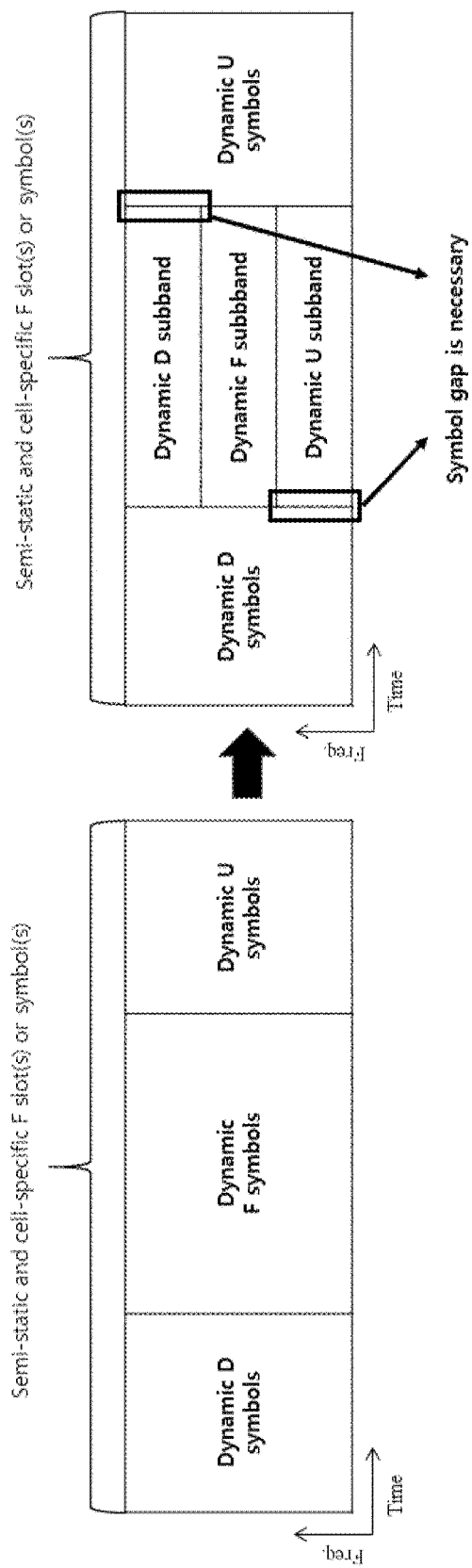
[Fig. 22]

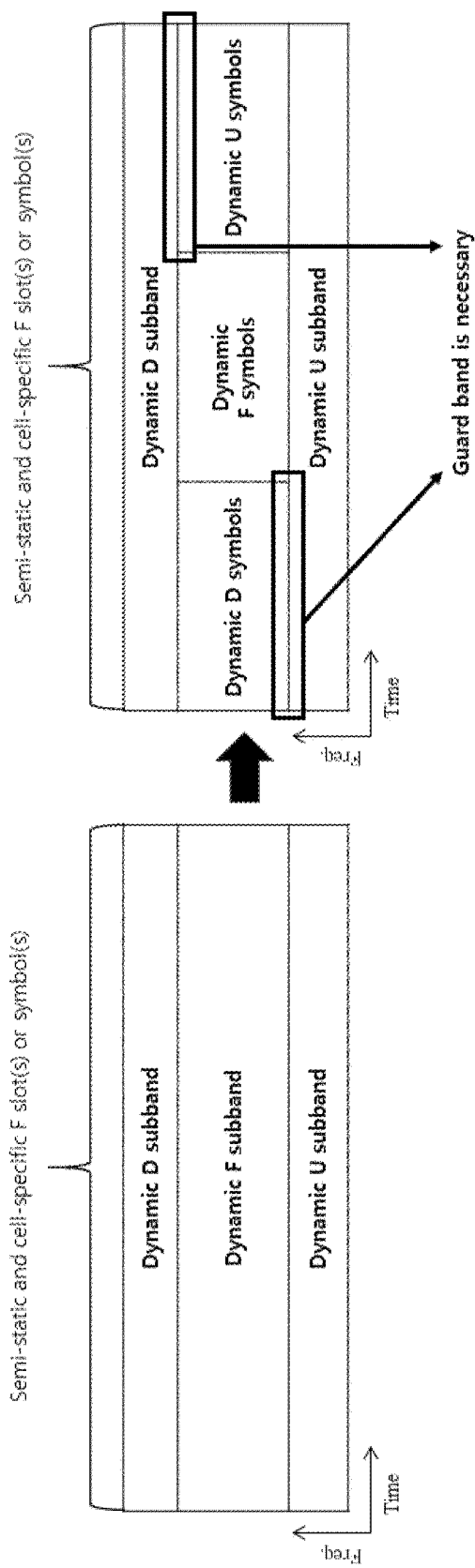
[Fig. 23]

[Fig. 24]
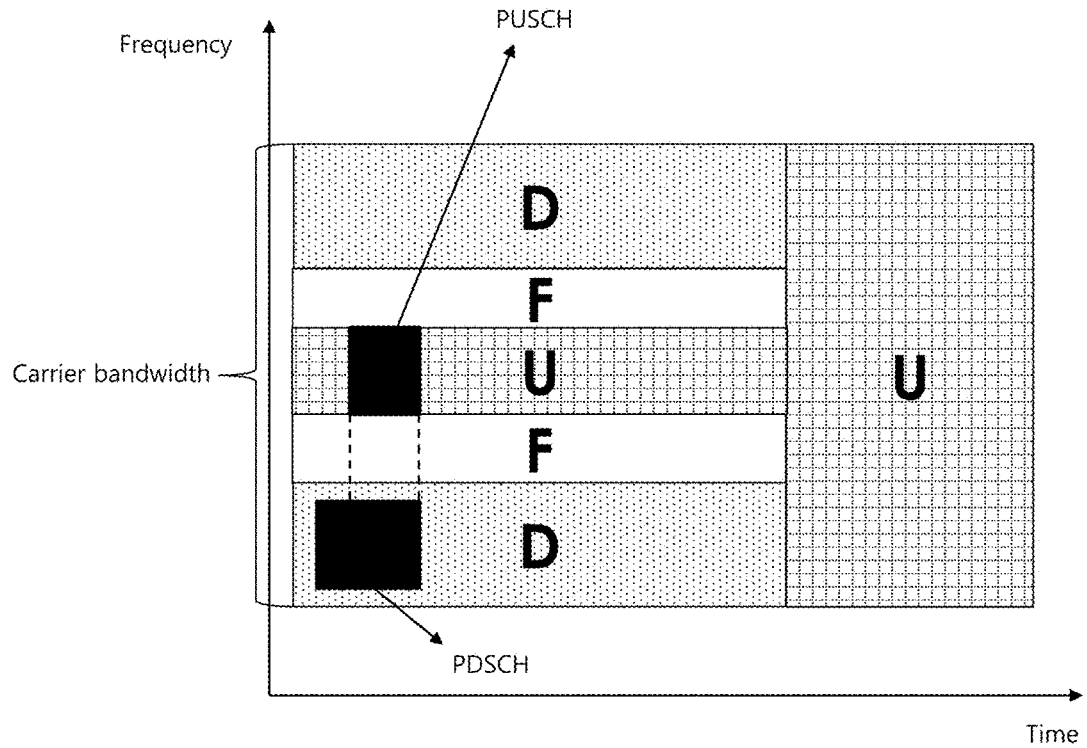
[Fig. 25]
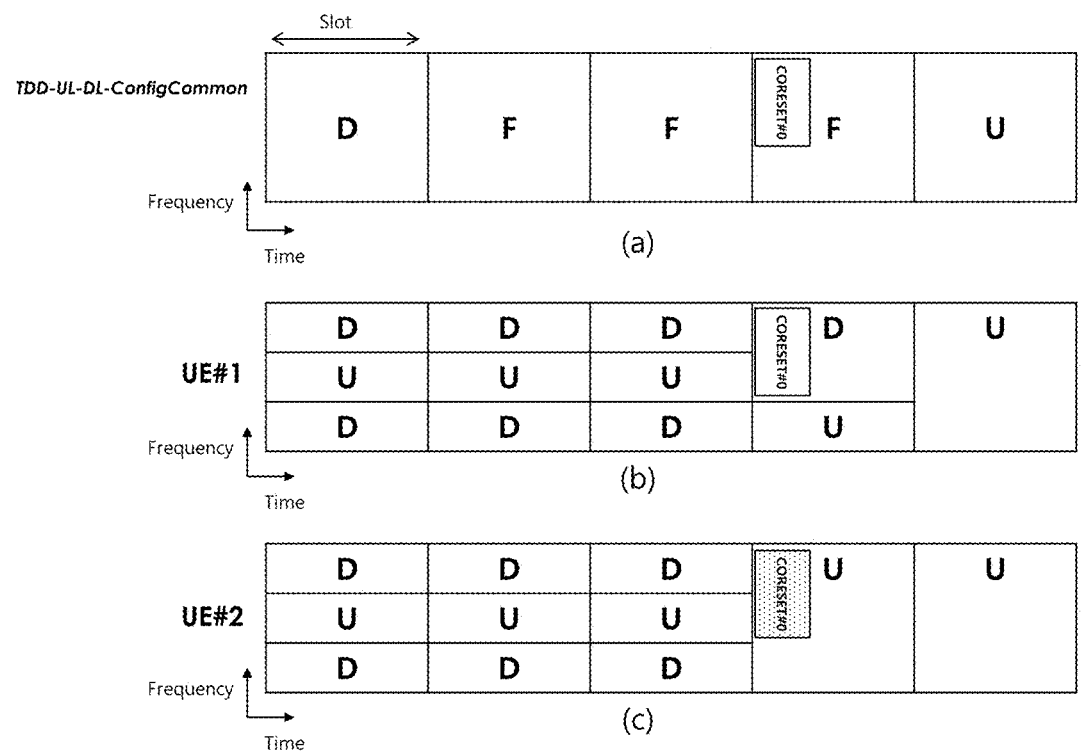

[Fig. 26]
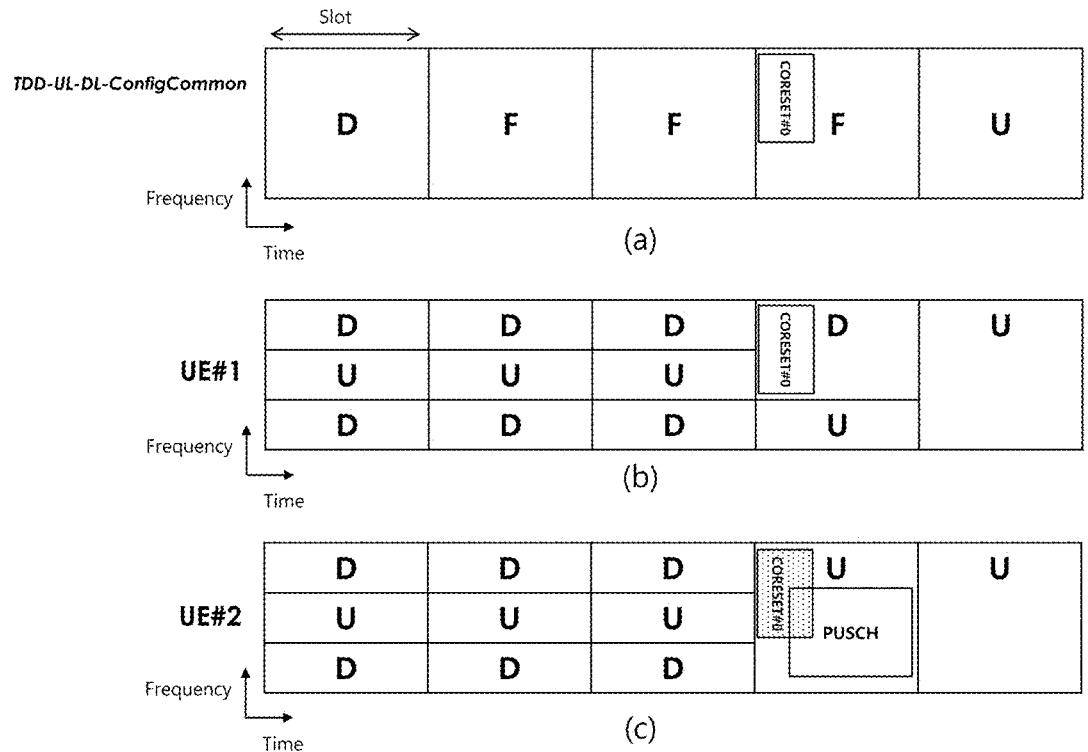
[Fig. 27]
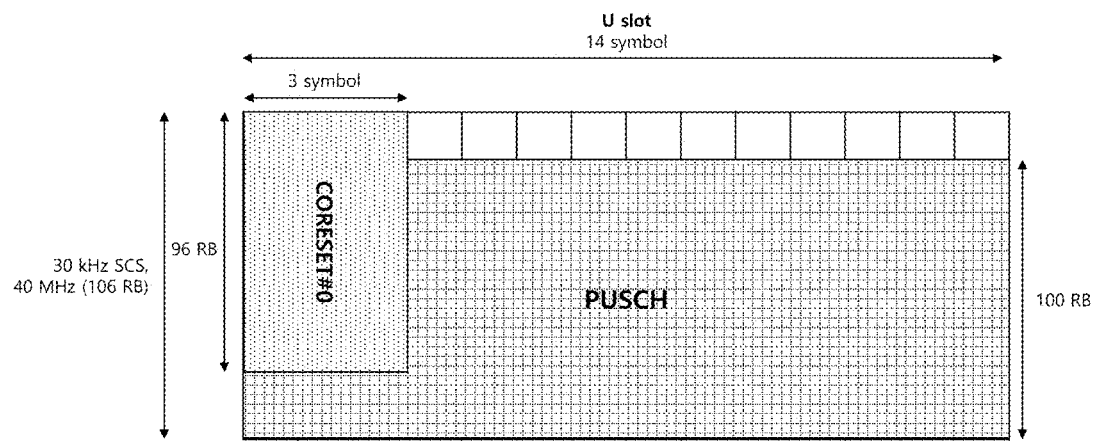

[Fig. 28]
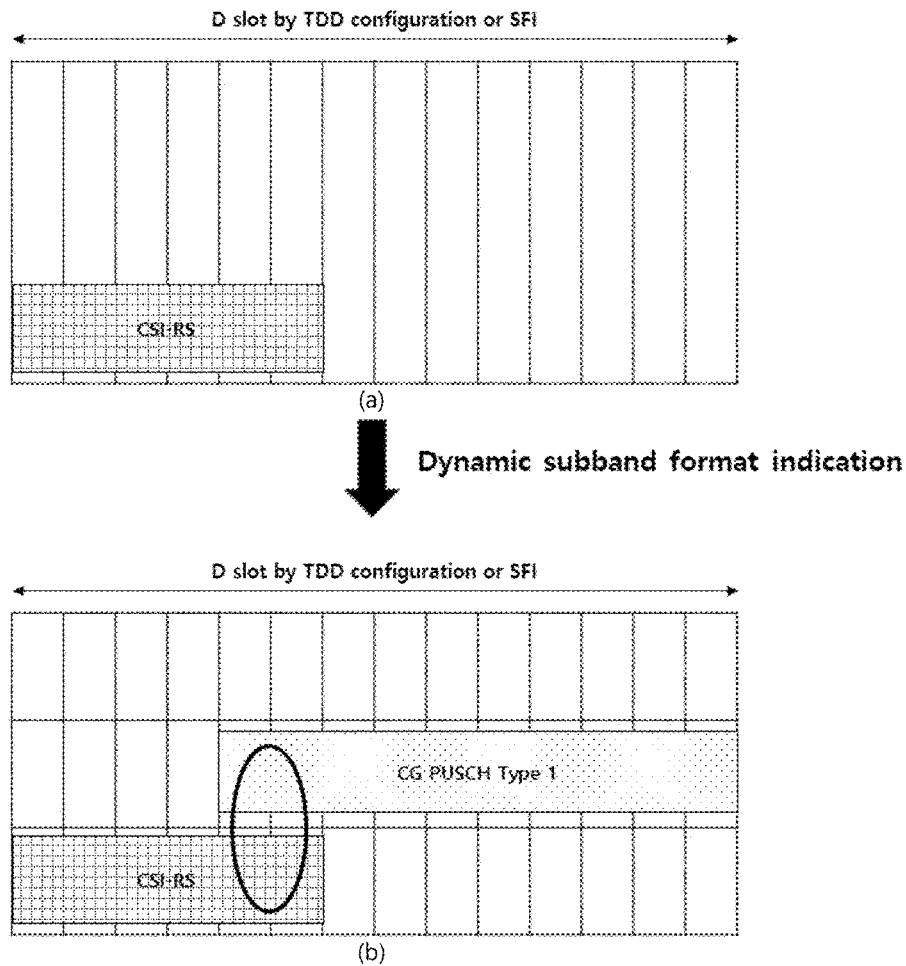
[Fig. 29]
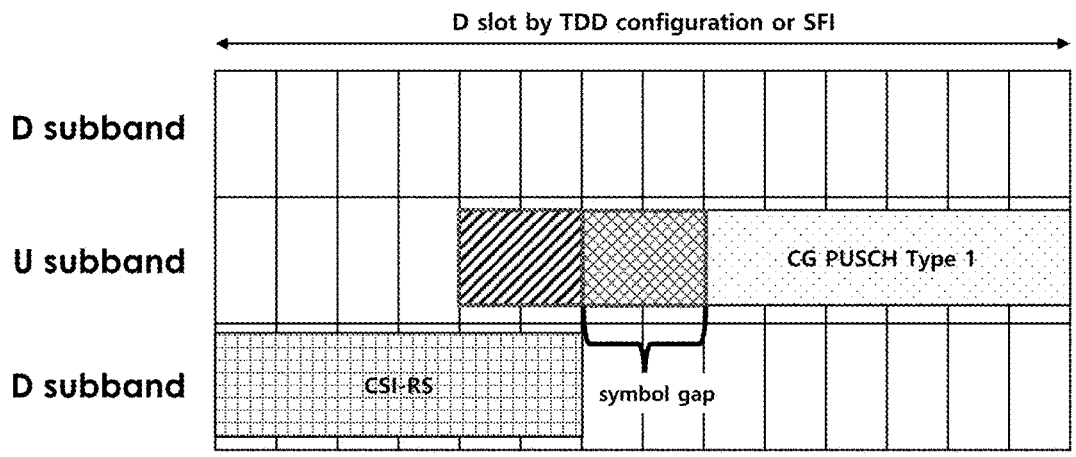

[Fig. 30]
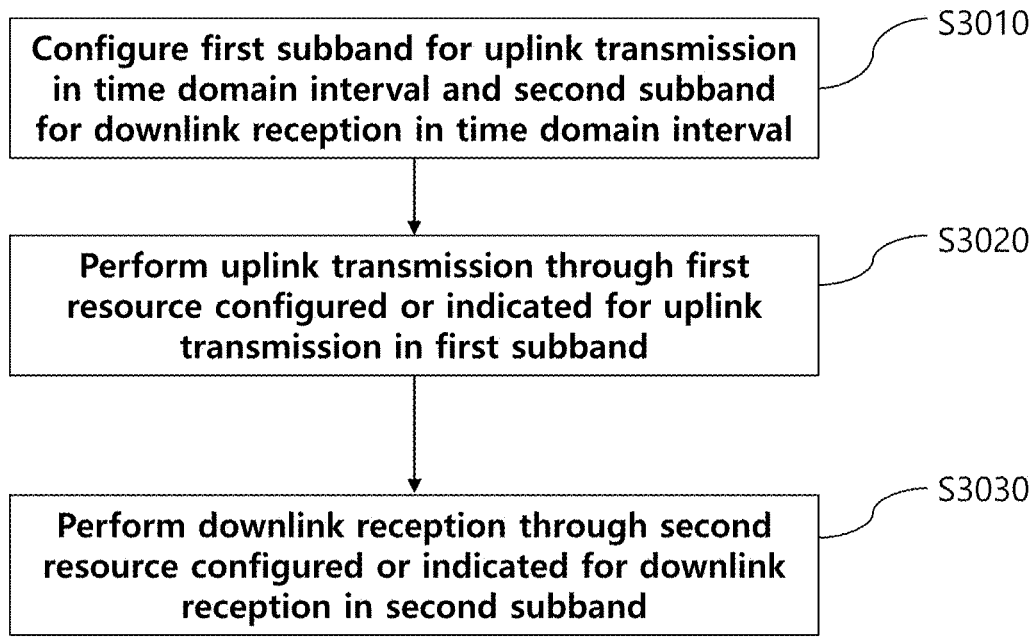

METHOD FOR CONFIGURING SUBBAND IN WIRELESS COMMUNICATION SYSTEM AND DEVICE THEREFOR

CROSS-REFERENCE TO RELATED APPLICATIONS

This application is a continuation of pending PCT International Application No. PCT/KR2023/006301, which was filed on May 9, 2023, and which claims priority under 35 U.S.C 119 (a) to Korean Patent Application No. 10-2022-0056927 filed with the Korean Intellectual Property Office on May 9, 2022, Korean Patent Application No. 10-2022-0078504filed with the Korean Intellectual Property Office on Jun. 27, 2022, and Korean Patent Application No. 10-2023-0056967 filed with the Korean Intellectual Property Office on May 2, 2023. The disclosures of the above patent applications are incorporated herein by reference in their entirety.

TECHNICAL FIELD

The present specification relates to a wireless communication system, and to a method for configuring a subband and a device therefor.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture. For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE OF INVENTION

Technical Problem

The disclosure is to provide a method for configuring a subband in a wireless communication system, and a device therefor.

Solution to Problem

The disclosure provides a method for configuring a subband in a wireless communication system, and a device therefor.

Specifically, a terminal in a wireless communication system may include a transceiver, and a processor configured to control the transceiver, wherein the processor is configured to receive a configuration of a first subband for uplink transmission in a time domain interval and a second subband for downlink reception in the time domain interval, perform the uplink transmission through a first resource configured or indicated for the uplink transmission in the first subband, and perform the downlink reception through a second resource configured or indicated for the downlink reception in the second subband, the uplink transmission and the downlink reception are performed based on whether the first resource and the second resource overlap each other in the time domain interval, the first subband and the second subband are configured or indicated on a frequency domain corresponding to the time domain interval, and the frequency domain is included in a carrier bandwidth of the terminal.

In the disclosure, a method performed by a terminal in a wireless communication system may include receiving a configuration of a first subband for uplink transmission in a time domain interval and a second subband for downlink reception in the time domain interval, performing the uplink transmission through a first resource configured or indicated for the uplink transmission in the first subband, and performing the downlink reception through a second resource configured or indicated for the downlink reception in the second subband, the uplink transmission and the downlink reception are performed based on whether the first resource and the second resource overlap each other in the time domain interval, the first subband and the second subband are configured or indicated on a frequency domain corresponding to the time domain interval, and the frequency domain is included in a carrier bandwidth of the terminal.

In the disclosure, a base station in a wireless communication system may include a transceiver, and a processor configured to control the transceiver, wherein the processor is configured to configure a first subband for uplink reception in a time domain interval and a second subband for downlink transmission in the time domain interval, perform the uplink reception through a first resource configured or indicated for the uplink reception in the first subband, and perform the downlink transmission through a second resource configured or indicated for the downlink transmission in the second subband, the uplink reception and the downlink transmission are performed based on whether the first resource and the second resources overlap each other in the time domain interval, the first subband and the second subband are configured or indicated on a frequency domain corresponding to the time domain interval, and the frequency domain is included a carrier bandwidth of a terminal.

In the disclosure, a method performed by a base station in a wireless communication system may include configuring a first subband for uplink reception in a time domain interval and a second subband for downlink transmission in the time domain interval, performing the uplink reception through a first resource configured or indicated for the uplink reception in the first subband, and performing the downlink transmission through a second resource configured or indicated for the downlink transmission in the second subband, the uplink reception and the downlink transmission are performed based on whether the first resource and the second resources overlap each other in the time domain interval, the first subband and the second subband are configured or indicated on a frequency domain corresponding to the time domain interval, and the frequency domain is included a carrier bandwidth of a terminal.

When the first resource and the second resource overlap each other in the time domain, one of the uplink transmission and the downlink reception may be configured via higher-layer signaling, and the other may be indicated via downlink control information (DCI), the terminal may perform an operation indicated via the DCI.

When the first resource and the second resource overlap each other in the time domain, the uplink transmission is indicated via first DCI, and the downlink reception is indicated via second DCI, the terminal may perform an operation indicated vis DCI recently received in a time domain between the first DCI and the second DCI.

When the first resource and the second resource entirely overlap each other in the time domain, the terminal may perform one operation between the uplink transmission and the downlink reception.

When the first resource and the second resource partially overlap each other in the time domain, the terminal may perform the downlink reception in the second resource, and the uplink transmission may be performed in a resource remaining after excluding a resource overlapping with the second resource from the first resource.

The uplink transmission may be rate-matched for the second resource and performed in the remaining resource.

When a last symbol of the second resource precedes a last symbol of the first resource, the uplink transmission may be performed in a resource remaining after excluding a resource overlapping with the second resource and a gap symbol after the last symbol of the second resource from the first resource.

The uplink transmission may be one of configured grant (CG) physical uplink shared channel (PUSCH) type 1, CG PUSCH type 2, a dynamic grant (DG) PUSCH, a sounding reference signal (SRS) configured via radio resource control (RRC) signaling, and an SRS indicated via DCI.

The downlink reception may be one of a channel state information-reference signal (CSI-RS) configured via RRC, a semi-persistent scheduling (SPS) physical downlink shared channel (PDSCH) indicated via DCI, a DG PDSCH, and a synchronization signal/physical broadcast channel (SS/PBCH) block, or the downlink reception may be a physical downlink control channel (PDCCH), and the second resource may be a control resource set (CORESET).

The time domain interval may be semi-statically configured or dynamically indicated.

Advantageous Effects of Invention

An aspect of the present specification is to provide a method for configuring a subband.

The effects to be derived from the present specification are not limited to the above-described effects, and other effects that have not been described will be clearly understood by those skilled in the art to which the present disclosure belongs from the following description.

BRIEF DESCRIPTION OF DRAWINGS

FIG. 1 illustrates an example of a wireless frame structure used in a wireless communication system.

FIG. 2 illustrates an example of a downlink (DL)/uplink (UL) slot structure in a wireless communication system.

FIG. 3 is a diagram for explaining a physical channel used in a 3GPP system and a typical signal transmission method using the physical channel.

FIGS. 4a and 4b illustrate an SS/PBCH block for initial cell access in a 3GPP NR system.

FIGS. 5a and FIG. 5b illustrate a procedure for transmitting control information and a control channel in a 3GPP NR system.

FIG. 6 illustrates a control resource set (CORESET) in which a physical downlink control channel (PDCCH) may be transmitted in a NR system.

FIG. 7 illustrates a method for configuring a PDCCH search space in a 3GPP NR system.

FIG. 8 is a conceptual diagram illustrating carrier aggregation.

FIG. 9 is a diagram for explaining signal carrier communication and multiple carrier communication.

FIG. 10 is a diagram showing an example in which a cross carrier scheduling technique is applied.

FIG. 11 is a block diagram showing the configurations of a UE and a base station according to an embodiment of the present disclosure.

FIGS. 12 to 18 illustrate a method for configuring a subband according to an embodiment of the present disclosure.

FIGS. 19 to 23 illustrate a subband configuration method according to an embodiment of the disclosure.

FIG. 24 illustrates a case where PDSCH reception and PUSCH transmission are configured or indicated in a predetermined time domain interval according to an embodiment of the disclosure.

FIGS. 25 and 26 illustrate subbands configured for multiple UEs, respectively, in one cell according to an embodiment of the disclosure.

FIG. 27 illustrates a case where a resource for downlink reception and a resource for uplink transmission, allocated for a UE, overlap each other according to an embodiment of the disclosure.

FIGS. 28 and 29 illustrate a method in which a UE performs uplink channel transmission and downlink channel reception through multiple subbands in a semi-statically configured or dynamically indicated time domain interval.

FIG. 30 illustrates a method in which a UE performs uplink transmission and downlink reception through multiple subbands, respectively, according to an embodiment of the disclosure.

BEST MODE FOR CARRYING OUT THE INVENTION

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the present disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified in this specification, a base station may refer to a next generation node B (gNB) as defined in 3GPP NR. Furthermore, unless otherwise specified, a terminal may refer to a user equipment (UE). Hereinafter, in order to facilitate understanding of the description, each content is separately divided into embodiments and described, but each of the embodiments may be used in combination with each other. In the present disclosure, the configuration of the UE may indicate configuration by the base station. Specifically, the base station may transmit a channel or signal to the UE to configure an operation of the UE or a parameter value used in a wireless communication system.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one subframe. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe number), and a slot number (or a slot index).

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x} * N^{RB}_{sc}$ subcarriers, and $N^{slot}_{symb}$ OFDM symbols. Here, x=DL when the signal is a DL signal, and x =UL when the signal is an UL signal. $N^{size,\mu}_{grid,x}$ represents the number of resource blocks (RBs) according to the subcarrier spacing constituent μ (x is DL or UL), and $N^{slots}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb} * N^{RB}_{sc}$ resource elements. Each resource element in the resource grid can be uniquely defined by a pair of indexes (k, 1) in one slot. k may be an index assigned from 0 to $N^{size,\mu}_{grid,x} * N^{RB}_{sc}-1$ in the frequency domain, and 1 may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Here, the system information received by the UE is cell-common system information for the UE to properly operate at the physical layer in Radio Resource Control (RRC), and is referred to as remaining system information (RSMI) or system information block (SIB) 1.

When the UE initially accesses the base station or does not have radio resources for signal transmission (when the UE is in RRC_IDLE mode), the UE may perform a random access procedure on the base station (operations S103 to S106). First, the UE may transmit a preamble through a physical random access channel (PRACH) (S103), and receive a response message for the preamble from the base station through the PDCCH and the corresponding PDSCH (S104). When a valid random access response is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. During the random access process, the UE may obtain UE-specific system information necessary for the UE to properly operate at the physical layer in the RRC layer. When the UE obtains UE-specific system information from the RRC layer, the UE enters the RRC_CONNECTED mode.

The RRC layer is used for message generation and management for control between a UE and a radio access network (RAN). More specifically, in the RRC layer, the base station and the UE may perform broadcasting of cell system information, delivery management of paging messages, mobility management and handover, measurement report and control thereof, UE capability management, and storage management including existing management necessary for all UEs in the cell. In general, since the update of the signal (hereinafter, referred to as RRC signal) transmitted from the RRC layer is longer than the transmission/reception period (i.e., transmission time interval, TTI) in the physical layer, the RRC signal may be maintained unchanged for a long period.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

FIGS. 4a and 4b illustrate an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity NcellID of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4a, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4a and Table 1, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 1

| Channel or signal | OFDM symbol number l relative to the start of an SS/PBCH block | Subcarrier number k relative to the start of an SS/PBCH block |
| --- | --- | --- |
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$

$$m = (n + 43N_{ID}^{(2)}) \bmod 127$$

$$0 \le n < 127$$

Here, $x(i+7)=(x(i+4)+x(i)) \bmod 2$ and is given as, $$[x(6)\ x(5)\ x(4)\ x(3)\ x(2)\ x(1)\ x(0)] = [1\ 1\ 1\ 0\ 1\ 1\ 0]$$

Further, the sequence $d_{SSS}(n)$ of the SSS is as follows.

$$d_{SSS}(n) = [1 - 2x_0((n + m_0) \bmod 127)][1 - 2x_1((n + m_1) \bmod 127)]$$

$$m_0 = 15 \left\lfloor \frac{N_{ID}^{(1)}}{112} \right\rfloor + 5N_{ID}^{(2)}$$

$$m_1 = N_{ID}^{(1)} \bmod 112$$

$$0 \le n < 127$$

$x_0(i+7)=(x_0(i+4)+x_0(i)) \bmod 2$

Here, $x_1(i+7)=(x_1(i+1)+x_1(i)) \bmod 2$ and is given as, $$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1]$$

A radio frame with a 10 ms length may be divided into two half frames with a 5 ms length. Referring to FIG. 4b, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHZ and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 KHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

FIGS. 5a and 5b illustrate a procedure for transmitting control information and a control channel in a 3GPP NR system. Referring to FIG. 5a, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5b is a diagram related to a CCE aggregation level and the multiplexing of a PDCCH and illustrates the type of a CCE aggregation level used for one PDCCH and CCE(s) transmitted in the control area according thereto.

FIG. 6 illustrates a control resource set (CORESET) in which a physical downlink control channel (PDCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 6, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 2 shows an embodiment of a physical uplink control channel (PUCCH) used in a wireless communication system.

TABLE 2

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of transmitting 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence to the two symbols may be transmitted through different RBs. In this case, the sequence may be a cyclic shift (CS) sequence from the base sequence used for PUCCH format 0. Through this, the UE can obtain a frequency diversity gain. Specifically, the UE may determine a cyclic shift (CS) value $m_{cs}$ according to the $M_{bit}$ bit UCI ($M_{bit}$=1 or 2). In addition, a sequence in which a base sequence of length 12 is cyclically shifted based on a predetermined CS value $m_{cs}$ may be mapped to 1 OFDM symbol and 12 REs of 1 RB and transmitted. When the number of cyclic shifts available to the UE is 12 and $M_{bit}$=1, 1 bit UCI 0 and 1 may be mapped to two cyclic shifted sequences having a difference of 6 cyclic shift values, respectively. In addition, when $M_{bit}$=2, 2bits UCI 00, 01, 11, and 10 may be mapped to four cyclic shifted sequences in which the difference in cyclic shift values is 3, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), ..., d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}$>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling (N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, the UE may perform transmission/reception using a bandwidth less than or equal to the bandwidth of the carrier (or cell). To this end, the UE may be configured with a bandwidth part (BWP) consisting of a continuous bandwidth of a portion of the bandwidth of the carrier. A UE operating according to TDD or operating in an unpaired spectrum may receive up to four DL/UL BWP pairs for one carrier (or cell). In addition, the UE may activate one DL/UL BWP pair. A UE operating according to FDD or operating in a paired spectrum may receive up to 4 DL BWPs on a downlink carrier (or cell) and up to 4 UL BWPs on an uplink carrier (or cell). The UE may activate one DL BWP and UL BWP for each carrier (or cell). The UE may not receive or transmit in time-frequency resources other than the activated BWP. The activated BWP may be referred to as an active BWP.

The base station may indicate an activated BWP among the BWPs configured by the UE through downlink control information (DCI). The BWP indicated through DCI is activated, and other configured BWP(s) are deactivated. In a carrier (or cell) operating in TDD, the base station may include a bandwidth part indicator (BPI) indicating the BWP activated in the DCI scheduling the PDSCH or PUSCH to change the DL/UL BWP pair of the UE. The UE may receive a DCI scheduling a PDSCH or a PUSCH and may identify a DL/UL BWP pair activated based on the BPI. In the case of a downlink carrier (or cell) operating in FDD, the base station may include a BPI indicating the activated BWP in the DCI scheduling the PDSCH to change the DL BWP of the UE. In the case of an uplink carrier (or cell) operating in FDD, the base station may include a BPI indicating the activated BWP in the DCI scheduling the PUSCH to change the UL BWP of the UE.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers.

UEs $B_1$~$B_5$ can use only a 20 MHZ bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

FIG. 9 is a drawing for explaining signal carrier communication and multiple carrier communication. Particularly, FIG. 9(a) shows a single carrier subframe structure and FIG. 9(b) shows a multi-carrier subframe structure.

Referring to FIG. 9 (a), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9 (b), three 20 MHz component carriers (CCs) can be aggregated into each of UL and DL, so that a bandwidth of 60 MHz can be supported. Each CC may be adjacent or non-adjacent to one another in the frequency domain. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

FIG. 11 is a block diagram showing the configurations of a UE and a base station according to an embodiment of the present disclosure.

In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHZ. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz, 5 GHz, 6 GHz, 7 GHz, or above 52.6 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz, 5 GHz, 6 GHz, 7 GHz, or above 52.6 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

A slot format may be configured for the UE by the base station in a TDD or unpaired spectrum system. The slot format may refer to the type of symbols in the slot. The symbol type may be at least one of a downlink symbol (DL symbol), an uplink symbol (UL symbol), or a flexible symbol. A symbol type of a slot in a radio frame may be configured for the UE by the base station. The flexible symbol may refer to a symbol that is not configured as a downlink symbol or an uplink symbol.

The UE may receive information about the type of each symbol in the slot from the base station through a cell-specific or cell-common radio resource control (RRC) signal. Alternatively, the UE may semi-statically receive information about the type of each symbol in the slot via SIB1. Furthermore, the UE may semi-statically receive information about the type of each symbol in the slot from the base station through a UE-specific UE-dedicated RRC signal. The base station may configure/set the type of each symbol in the slot for the UE by using the information about the type of each symbol in the slot.

When the UE receives the information about the type of each symbol in the slot from the base station through a cell-specific RRC signal, the information about the type of each symbol may include at least one among the period of a cell-specific slot, the number of slots including only downlink symbols starting from a cell-specific slot at which the period begins, the number of downlink symbols starting from the first symbol of a slot immediately following the last slot including only downlink symbols, the number of slots including only uplink symbols starting from the last cell-specific slot of the period, and the number of uplink symbols immediately preceding the last of slots including only uplink symbols. Furthermore, when the UE receives the information about the type of each symbol in the slot from the base station through a cell-specific RRC signal, the information about the type of each symbol may include up to two slot patterns. In this case, each of the two patterns may be applied consecutively to symbols in the time domain. The downlink symbol, the uplink symbol, and the flexible symbol configured based on the cell-specific RRC signal or SIB1 may be referred to as a cell-specific downlink symbol, a cell-specific uplink symbol, and a cell-specific flexible symbol, respectively.

When the UE receives information about the type of each symbol in the slot from the base station through a UE-specific RRC signal, the cell-specific flexible symbol may be configured as a downlink symbol or an uplink symbol. In this case, the information about the type of each symbol may include at least one among an index for a slot in a period, the number of downlink symbols starting from the first symbol in a slot indicated by the index, and the number of uplink symbols starting from the last symbol in the slot indicated by the index. In addition, for the UE, all of the symbols in the slot are configured as downlink symbols, or all of the symbols in the slot are configured as uplink symbols. The downlink symbol, the uplink symbol, and the flexible symbol configured based on the UE-specific RRC signal may be referred to as a UE-specific downlink symbol, a UE-specific uplink symbol, and a UE-specific flexible symbol, respectively.

The base station may transmit information about the slot format to the UE via a slot format indicator (SFI) in DCI format 2_0 contained in a group common (GC)-PDCCH. The GC-PDCCH may be CRC-scrambled with SFI-RNTI for UEs receiving the information about the slot format. Hereinafter, an SFI transmitted via a GC-PDCCH may be described as a dynamic SFI.

The UE may receive a dynamic SFI through GC-PDCCH to receive indication of whether symbols in a slot are cell-specific flexible symbols or UE-specific flexible symbols, downlink symbols, uplink symbols, or flexible symbols. In other words, only a flexible symbol semi-statically configured for the UE may be indicated as one of a downlink symbol, an uplink symbol, and a flexible symbol via a dynamic SFI. The UE may not expect that a semi-statically configured downlink symbol or uplink symbol will be indicated as a different type of symbol by the dynamic SFI. The UE may perform blind decoding at each monitoring period configured by the base station to receive a GC-PDCCH transmitting DCI format 2_0 including the dynamic SFI. When the UE successfully receives the GC-PDCCH by performing the blind decoding, the UE may apply information about a slot format indicated by the dynamic SFI, starting from a slot in which the GC-PDCCH has been received.

A combination of slot formats that can be indicated through a dynamic SFI may be configured for the UE by the base station. The slot format combination may be for each of 1 to 256 slots, and a slot format combination for one of the 1 to 256 slots may be configured for the UE through a dynamic SFI. The dynamic SFI may include an index indicating a slot to which the slot format combination is applied. Table 3 shows a slot format combination for each slot (see 3GPP TS38.213).

TABLE 3

| Format | \multicolumn{14}{c}{Symbol number in a slot} |

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | F | F | F | F | F | F | F | F | F | F | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | F | F | F | F | F | F | U | U | U |
| 45 | D | D | D | D | D | F | F | U | U | U | U | U | U | U |
| 46 | D | D | D | D | F | U | D | D | D | D | D | F | U | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | D | F | F | U | U | D | D | D | F | F | U | U |
| 51 | D | D | F | F | U | U | U | D | D | F | F | U | U | U |
| 52 | D | F | F | F | F | U | D | F | F | F | F | F | F | U |
| 53 | D | D | F | F | F | F | U | D | D | F | F | F | F | U |
| 54 | F | F | F | F | F | F | D | D | D | D | D | D | D | D |
| 55 | D | D | F | F | F | U | U | U | D | D | D | D | D | D |
| 56-254 | \multicolumn{14}{c}{Reserved} |
| 255 | \multicolumn{14}{l}{UE determines the slot format for the slot based on tdd-UL-DL-ConfigurationCommon, or tdd-UL-DL-ConfigurationDedicated and, if any, on detected DCI formats} |

In Table 3, D denotes a downlink symbol, U denotes an uplink symbol, and F denotes a flexible symbol. As shown in Table 3, DL/UL switching may be allowed up to two times within a slot.

In the present specification, the terms "configuration", "setting", and "indication" may be used interchangeably. That is, the terms "configured", "set", and "indicated" may have the same meaning, and similarly, the terms "is configured", "is set", and "is indicated" may have the same meaning.

FIGS. 12 to 18 illustrate a subband configuration method according to an embodiment of the present disclosure.

In a TDD or unpaired spectrum system, when a slot format is configured or indicated for a UE, problems such as uplink coverage reduction, increased latency, and decreased capacity may arise if a limited time domain resource is allocated as an uplink resource. To address these problems, a specific time domain resource within a cell may be used for both downlink reception and uplink transmission. Even when a base station uses a specific time domain resource for both downlink reception and uplink transmission, the UE may support only half-duplex communication and perform only one operation, either downlink reception or uplink transmission, in the same specific time domain resource.

The specific time domain resource may be a cell-specific flexible symbol in a semi-statically configured slot format. This is intended to minimize inter-UE interference due to transmission and reception in different symbol types (DL/UL or UL/DL).

Referring to FIG. 12, the UE may receive a cell-specific slot configuration semi-statically. The UE may perform downlink reception or uplink transmission on a resource scheduled by the base station. A resource scheduled for PDSCH reception for a first UE and a resource scheduled for PUSCH transmission for a second UE may include the same symbols in the time domain, but may be different RBs in the frequency domain. A method by which one base station schedules multiple UEs to use a specific time domain resource for both downlink reception and uplink transmission may be inefficient when considering inter-cell interference, spectrum regulation, and power consumption for PDCCH monitoring by the UE. Hereinafter, a method for addressing this inefficiency will be described. In the present specification, a subband may be configured on a frequency domain resource within a time domain resource (slot or symbol). In this case, the frequency domain resource may be included within the carrier bandwidth of the UE.

Spectrum Partitioning

A specific time domain resource (a cell-specific flexible slot/symbol) available for both downlink reception and uplink transmission may be configured for the UE by the base station in the form of multiple subbands on a frequency domain.

The multiple subbands may be subbands of the same format or different formats. The subband formats may include a downlink subband, an uplink subband, and a flexible subband. The downlink subband may include one or more downlink RB(s), the uplink subband may include one or more uplink RB(s), and the flexible subband may include one or more flexible RB(s), wherein the downlink RB(s) may refer to resources available for downlink reception and the uplink RB(s) may refer to resources available for uplink transmission. The flexible RB(s) may refer to resources available for downlink reception and uplink transmission depending on the configuration by the base station.

(Method 1-1) When multiple subbands are configured for a UE, there may be a maximum of one subband of the same format. That is, one cell-specific flexible slot/symbol interval may include at most one downlink subband, one uplink subband, and one flexible subband, respectively. Referring to FIG. 13, a cell-specific flexible slot/symbol may include multiple subbands. In this case, the multiple subbands may include one downlink subband, one uplink subband, and one flexible subband. A guard band may be needed to minimize the impact of UL/DL interference between the downlink subband and the uplink subband. Limiting the number of subbands of the same format to one is intended to configure a downlink subband, an uplink subband, and a flexible subband while minimizing the number of guard bands, thereby increasing the efficiency of a frequency resource during downlink reception and uplink transmission.

(Method 1-2) Furthermore, when multiple subbands are configured for the UE, there may be multiple subbands of the same format. That is, in one cell-specific flexible slot/symbol interval, at least one of a downlink subband, an uplink subband, and a flexible subband may be multiple subbands. Referring to FIG. 14, a cell-specific flexible slot/symbol may include multiple subbands. The multiple subbands may include one downlink subband, two uplink subbands, and two flexible subbands.

The multiple subbands in methods 1-1 and 1-2 may include non-overlapping RBs in the frequency domain.

In methods 1-1 and 1-2, the flexible subband may be configured taking into account a guard band between the uplink subband and the downlink subband. That is, there may be at least one flexible subband between the uplink subband and the downlink subband. Method 1-1 may require a smaller number of guard bands compared to Method 1-2. Therefore, there may be more resources available for downlink reception and uplink transmission. Furthermore, compared to method 1-2, method 1-1 may have more frequency resources available when a CORESET resource for PDCCH monitoring is configured for the UE, thus allowing a CORESET to be flexibly configured within one downlink subband (or flexible subband). In addition, method 1-1 may also have more frequency domain resources available for uplink transmissions than method 1-2. Thus, method 1-1 may be advantageous in terms of frequency resource utilization efficiency compared to method 1-2. Hereinafter, the methods described in the present specification are based on, but not limited to, method 1-1. In the present specification, an RB in a downlink subband may be described as a downlink RB, an RB in an uplink subband may be described as an uplink RB, and an RB in a flexible subband may be described as a flexible RB.

A method by which multiple subbands are configured in the frequency domain may be applied to a cell-specific flexible slot or symbol as well as to a cell-specific downlink slot or symbol or a cell-specific uplink slot or symbol. Thus, multiple subbands may be configured for a UE in the frequency domain for a cell-specific downlink slot or symbol and a cell-specific flexible slot or symbol. Alternatively, multiple subbands may be configured for the UE in the frequency domain for a cell-specific uplink slot or symbol and a cell-specific flexible slot or symbol.

The method by which the multiple subbands are configured in the frequency domain may be applied to a UE-specific flexible slot or symbol. Furthermore, the method by which the multiple subbands are configured in the frequency domain may be applied to a UE-specific downlink slot or symbol.

Semi-Static Subband Format Configuration

A subband may be semi-statically configured for the UE through a cell-specific RRC signal or SIB1. The UE may configure the subband by semi-statically receiving subband configuration information from the base station. The subband configuration information may include information related to the position of the subband and information related to the type of subband (the type of RB).

(Method 2-1) The UE may receive subband configuration information from the base station to configure the number of downlink RBs and the number of uplink RBs. The subband configuration information may include at least one among an index of one of slots in a period, the number of uplink RBs starting from the first RB in a slot corresponding to the index, the number of downlink RBs, the number of downlink RBs starting from the last RB in the slot corresponding to the index, the number of uplink RBs, and information about positions of a downlink subband and an uplink subband. Among the RBs in the slot, an RB that is not configured as a downlink RB or an uplink RB may be determined to be a flexible RB. Referring to FIG. 15, 1) the index for a slot is n, 2) X RBs starting from the first RB in slot n are uplink RBs, and 3) Y RBs starting from the last RB in slot n are downlink RBs. 4) A subband including X RBs starting from the first RB in slot n may be an uplink subband, and a subband including Y RBs starting from the last RB in slot n may be a downlink subband. Alternatively, in contrast to FIG. 15, the subband including X RBs starting from the first RB in slot n may be configured as a downlink subband and the subband including Y RBs starting from the last RB in slot n may be configured as an uplink subband.

(Method 2-2) The UE may receive subband configuration information from the base station to configure the number of flexible RBs and a starting RB. The subband configuration information may include at least one among an index of one of the slots in a period, an index of the first flexible RB among flexible RBs in a slot corresponding to the index, the number of flexible RBs in the slot corresponding to the index, and information about positions of a downlink subband and an uplink subband. Among the RBs in the slot, RBs that are not configured as the flexible RBs may be determined to be a downlink RB and an uplink RB. Referring to FIG. 16, 1) the index for a slot is n, 2) the index of the first flexible RB in slot n is X, 3) Y RBs starting from X to are flexible subbands, and 4) subbands other than a flexible subband in slot n may be configured as a downlink subband and an uplink subband. That is, an uplink subband may include RBs from the first RB in slot n to an RB before the first flexible RB of the flexible subband, and a downlink subband may include RBs from the last RB in slot n to an RB after the last RB of the last flexible subband. Conversely, a downlink subband may include RBs from the first RB in slot n to the first flexible RB of the flexible subband, and an uplink subband may include RBs from the last RB in slot n to the last RB of the last flexible subband.

(Method 2-3) The UE may receive subband configuration information from the base station. Based on the subband configuring information, the UE may configure an uplink (or downlink) start RB, the number of uplink (or downlink) RBs, and the number of flexible RBs. Specifically, the subband configuring information may include information about one among: an index for one of slots in a period, a starting index of an uplink (or downlink) RB in a slot corresponding to the index, the number of uplink (or downlink) RBs in the slot corresponding to the index, and the number of flexible RBs in the slot corresponding to the index. The UE may determine that an RB which is not configured as an uplink (or downlink) RB or a flexible RB is a downlink (or uplink) RB.

The number of flexible RBs may not be configured by the base station. A predefined number of RBs may not be configured for a guard band, and the flexible subband may be determined by applying a pre-defined number of RBs for the guard band.

The flexible subband may be positioned between the downlink subband and the uplink subband. Therefore, there is the effect that the UE can determine the position of the flexible position even when the starting index of a flexible RB is not separately indicated.

In methods 2-1, 2-2, and 2-3, the subband configuration information may be transmitted commonly to UEs in a cell, wherein a downlink RB, an uplink RB, and a flexible RB configured for each UE may be configured in units of a common resource block (CRB) basis. In addition, in methods 2-1, 2-2, and 2-3, the subband configuration information may be transmitted to a specific UE in the cell, and a downlink RB, an uplink RB, and a flexible RB configured for each UE may be configured in units of a physical resource block (PRB).

Methods 2-1, 2-2, and 2-3 have the effect that it is possible to identify information about all subbands even when a UE partially receives subband configuration information. In methods 2-1 and 2-2, an RB in a semi-static downlink subband may be described as a semi-static downlink RB, an RB in a semi-static uplink subband may be described as a semi-static uplink RB, and an RB in a semi-static flexible subband may be described as a semi-static flexible RB.

The method of semi-statically configuring a subband based on methods 2-1, 2-2, and 2-3 may include a cell-specific flexible slot or symbol, may include a cell-specific downlink slot or symbol, and may include a cell-specific uplink slot or symbol. Thus, a subband may be semi-statically configured for the UE with respect to the cell-specific downlink slot or symbol and the cell-specific flexible slot or symbol. Alternatively, a subband may be semi-statically configured for the UE with respect to the cell-specific uplink slot or symbol and flexible slot or symbol. Alternatively, the method for semi-statically configuring a subband based on methods 2-1, 2-2, and 2-3 may include a UE-specific flexible slot or symbol. Furthermore, the method for semi-statically configuring a subband based on methods 2-1, 2-2, and 2-3 may include a UE-specific downlink slot or symbol.

The UE may use a cell-specific RRC signal or SIB1 or a UE-specific RRC signal to perform the method for semi-statically configuring a subband based on methods 2-1, 2-2, and 2-3.

There are multiple indexes of one of slots in a period, included in the above-described subband configuration. That is, a subband may be configured for the UE with respect to multiple slots in the period.

Dynamic Subband Format Indication

A subband format may be configured (set/indicated) for a UE through dynamic signaling. That is, the subband format may be configured for the UE from DCI transmitted via a PDCCH. When a semi-static format is not configured for the UE, the UE may consider all frequency domain resources in a slot to be semi-static flexible subbands. A subband format may be dynamically indicated to the UE through DCI. That is, a semi-static downlink subband and a semi-static uplink subband configured through the semi-static format configuration may not be indicated as a different format through DCI. When no semi-static subband format is configured for the UE, the UE may apply a subband format indicated through DCI for a cell-specific flexible slot/symbol. The subband format indicated through DCI may be described as a dynamic subband.

Sub-band RB(s) may be indicated to the UE in the frequency domain through an RIV method, which is a method for indicating consecutive scheduled resources in the frequency domain in an NR system. The RIV may be a value obtained by joint-coding a starting RB index and the number of consecutively allocated RBs. Mathematical Expression 1 shows a method for determining the RIV (see 3GPP TS38.214)

[Mathematical Expression 1]

if $(L_{RBs} - 1) \le \lfloor N_{BWP}^{size}/2 \rfloor$ then $$RIV = N_{BWP}^{size}(L_{RBs} - 1) + RB_{start}$$

else $$RIV = N_{BWP}^{size}(N_{BWP}^{size} - L_{RBs} + 1) + (N_{BWP}^{size} - 1 - RB_{start})$$

where $L_{RBs} >= 1$ and shall not exceed $N_{BWP}^{size} - RB_{start}$.

Here, $L_{RBs}$ may be the number of consecutively allocated RBs, $RB_{start}$ may be the starting RB index, and $N_{BWP}^{size}$ may be the BWP size of the UE. For example, when $N_{BWP}^{size}$ is 4, the expressible starting RB index and the number of consecutively allocated RBs may be as shown in Table 4.

TABLE 4

| L | S | | | |
|---|---|---|---|---|
|   | 0 | 1 | 2 | 3 |
| 1 | 0 | 1 | 2 | 3 |
| 2 | 4 | 5 | 6 |   |
| 3 | 8 | 9 |   |   |
| 4 | 7 |   |   |   |

In Table 4, S indicates the starting RB index and L is the number of consecutively allocated RBs. According to Table 4, when $N_{BWP}^{size}$ is 4, the RIV value may be one of 0 to 9. The UE may determine the starting RB index and the number of consecutively allocated RBs by the indicated RIV value. For example, when it is indicated to the UE that an RIV value is 5, the UE may identify that two consecutive RBs have been allocated starting from RB #1 in the frequency domain.

The following describes a method by which, for a UE, a subband format in the frequency domain is indicated by the base station in an RIV form through DCI.

(Method 3-1) The number of downlink RBs and the number of uplink RBs as subband configuration information may be indicated to a UE by a base station. The number of downlink and uplink RBs may be indicated as one joint-coded value to the UE. When the one value is obtained in an RIV form, the one value may be determined through Mathematical Expression 2.

$$\text{if } L_{RBs}^2 \leq \lfloor N_F^{size}/2 \rfloor \text{ then} \qquad \text{[Mathematical Expression 2]}$$
$$RIV = (N_F^{size} + 1)L_{RBs}^2 + L_{RBs}^1$$
$$\text{else}$$
$$RIV = (N_F^{size} + 1)(N_F^{size} + 1 - L_{RBs}^2) + (N_F^{size} - L_{RBs}^1)$$

where $L_{RBs}^1 >= 0$, $L_{RBs}^2 >= 0$, and $L_{RBs}^1 + L_{RBs}^2$ shall not exceed $N_F^{size}$.

Here, $L_{RBs}^1$ may indicate the number of consecutively allocated first RBs, and $L_{RBs}^2$ may indicate the number of consecutively allocated second RBs. When a subband format is semi-statically configured for the UE, $N_F^{size}$ may be the size of a flexible subband in the semi-statically configured subband format. When a subband format is not semi-statically configured for the UE, $N_F^{size}$ may be the size of the entire carrier bandwidth. For example, when $N_F^{size}$ is 4, the number of two consecutively allocated RBs may be as shown in Table 5.

TABLE 5

| L2 | L1 | | | | |
|---|---|---|---|---|---|
|   | 0 | 1 | 2 | 3 | 4 |
| 0 | 0 | 1 | 2 | 3 | 4 |
| 1 | 5 | 6 | 7 | 8 |   |
| 2 | 10 | 11 | 12 |   |   |
| 3 | 14 | 13 |   |   |   |
| 4 | 9 |   |   |   |   |

In Table 5, L1 may be the number of consecutively allocated first RBs and L2 may be the number of consecutively allocated second RBs. According to Table 5, when $N_F^{size}$ is 4, the RIV value may be any one value among 0 to 14. The UE may determine the number of consecutively allocated RBs in downlink and uplink subbands by the indicated RIV value. That is, the UE may determine L1 as the number of consecutively allocated RBs in the uplink subband and L2 as the number of consecutively allocated RBs in the downlink subband. Conversely, the UE may determine L1 as the number of consecutively allocated RBs in the downlink subband and L2 as the number of consecutively allocated RBs in the uplink subband.

When the UE determines L1 and L2 as the number of RBs consecutively allocated to the uplink (or downlink) subband and the downlink (or uplink) subband, respectively, the UE may implicitly determine the starting RB index of each subband based on the semi-statically configured subband format. Specifically, when L1 and L2 indicated for a semi-static flexible subband are applied according to method 3-1,the starting RB of the downlink subband may be determined to be an RB before or after a semi-statically configured cell-specific downlink subband, and the starting RB of the uplink subband may be determined to be an RB after or before a semi-statically configured cell-specific uplink subband. Furthermore, in the semi-static flexible subband, RB(s) that are not determined to be a dynamic downlink subband and a dynamic uplink subband may be determined to be a dynamic flexible subband. Referring to FIG. 17, it may be indicated to the UE that for a semi-static flexible subband, L1 represents the number of RBs consecutively allocated to a dynamic uplink subband and L2 represents the number of RBs consecutively allocated to a dynamic downlink subband. Furthermore, in the semi-static subband configuration, a semi-static uplink subband may include RBs from the first RB in slot n to an RB before the first dynamic subband RB (a dynamic uplink (or downlink) subband RB), and a semi-static downlink subband may include RBs from the last RB in slot n to an RB after the dynamic subband RB (the dynamic uplink (or downlink) subband RB). Thus, the UE may determine that L1 RBs starting from an RB after the semi-statically configured uplink subband are the dynamic uplink subband, and that the L2 RBs starting from an RB before the semi-static downlink subband are the dynamic downlink subband. The UE may determine that RBs in the semi-static flexible subband, which are not dynamically indicated as a downlink subband or an uplink subband, are a dynamic flexible subband.

(Method 3-2) An index of a starting RB of a flexible subband and the number of RBs as subband configuration information may be indicated to a UE. The index of the starting RB of the flexible subband and the number of RBs may be indicated as one joint-coded value for the UE. When the one value is determined in an RIV form, the one value may be obtained through Mathematical Expression 1. In this case, $N_F^{size}$ is used instead of $N_{BWP}^{size}$ in Mathematical Expression 1, and $N_F^{size}$ is the same as defined in Mathematical Expression 2. Furthermore, an RB that is not determined as a dynamic flexible subband may be determined as a dynamic downlink subband and a dynamic uplink subband. In this case, the dynamic downlink subband and the dynamic uplink subband may include RBs consecutive to a semi-static downlink subband and a semi-static uplink subband, which are semi-statically configured, in the frequency domain. Referring to FIG. 18, a dynamic flexible subband may be positioned within a semi-static flexible subband. S may be an index of a starting RB of the dynamic flexible subband, and L may be the number of RBs consecutively allocated to the dynamic flexible subband. The UE may determine the dynamic flexible subband based on the index of the starting RB and the number of consecutive RBs, configured for the semi-static flexible subband. The UE may determine that RBs of the semi-static flexible subband, which are not configured as the dynamic flexible subband, are RBs of the dynamic downlink subband and the dynamic uplink subband. The UE may determine that RBs, which are consecutive to the semi-static downlink subband, among the RBs that are not configured for the configuration of the dynamic flexible subband, are RBs of the dynamic downlink subband. The UE may determine that RBs, which are consecutive to the semi-static uplink subband, among RBs not indicated as the dynamic flexible subband, are RBs of the dynamic uplink subband.

The unit of RB in methods 3-1 and 3-2 may be a PRB.

(Method 3-3) A base station may indicate, to a UE, an index of a starting RB in an uplink (or downlink) subband and the number of RBs. One value, in which the index of the starting RB and the number of RBs are joint-coded, may be indicated for the UE by the base station. In this case, the one joint-coded value may be obtained through Mathematical Expression 1 above. The UE may determine that RBs, which are not indicated as uplink (or downlink) RBs, are downlink (or uplink) RBs or flexible RBs. Furthermore, the number of flexible RBs may be the number of flexible RBs that are semi-statically configured or determined by the UE. The UE may determine that an RB, which is not an uplink (or downlink) RB or a flexible RB, is a downlink (or uplink) RB.

The flexible subband may be positioned between the downlink subband and the uplink subband. Therefore, the UE may identify the position of the flexible subband without ambiguity, even when a starting index of a flexible RB is not separately indicated.

In methods 3-1, 3-2, and 3-3, the dynamic downlink subband, the dynamic uplink subband, and the dynamic flexible subband may include consecutive RBs in the frequency domain.

In methods 3-1, 3-2, and 3-3, the subband configuration information may be transmitted commonly to UEs in a cell, wherein a downlink RB, an uplink RB, and a flexible RB configured for each UE may be configured in units of common resource blocks (CRBs).

When a dynamic subband format is indicated to a UE according to method 3-1, 3-2, or 3-3, information about the subband format may be transmitted to the UE through group-common signaling. For example, the dynamic subband format information may be included in DCI format 2_0 used in legacy NR. DCI format 2_0 may be transmitted through GC-PDCCH, and the GC-PDCCH may be CRC-scrambled with SFI-RNTI for UEs receiving the subband format information. The UE may perform blind decoding at each monitoring period configured by the base station to receive the GC-PDCCH including the DCI format 2_0 including the subband format information. When the UE successfully receives GC-PDCCH by performing blind decoding, the UE may apply the subband format information during the monitoring period configured by the base station starting from a slot in which the PDCCH has been received. In addition, the dynamic subband format information may be transmitted through a new DCI format (e.g., DCI format 2_x) rather than the DCI format used in legacy NR. DCI format 2_x may be transmitted through a GC-PDCCH, and the GC-PDCCH may transmit a slot formation indication in frequency domain (SFI-F) to notify UEs, which receive the subband format information, of a slot format in the frequency domain. SFI-F may be CRC-scrambled with SFIF-RNTI. To receive the PDCCH including DCI format 2_x, blind decoding may be performed at each monitoring period configured by the base station. When the UE successfully receives the GC-PDCCH by performing blind decoding, the UE may apply the subband format information during the monitoring period configured by the base station starting from a slot in which the GC-PDCCH has been received.

When a dynamic subband format is configured for a UE according to method 3-1, the payload size of DCI format 2_0 or DCI format 2_x including dynamic subband format information may be $\lceil \log_2((N_F^{size}+1)(N_F^{size}+2)/2) \rceil$ bits. When a dynamic subband format is configured for a UE according to method 3-2, the payload size of DCI format 2_0 or DCI format 2_x including dynamic subband format information may be $\lceil \log_2(N_F^{size}(N_F^{size}+1)/2) \rceil$ bits. When a dynamic subband format is configured for a UE according to method 3-3, the payload size of DCI format 2_0 or DCI format 2_x including dynamic subband format information may be $\lceil \log 2\ (N_F^{size}(N_{BWP}^{size}+1)/2) \rceil$ bits.

An RB in the dynamic downlink subband determined according to method 3-1, 3-2, or 3-3 may be described as a dynamic downlink RB, an RB in the dynamic uplink subband may be described as a dynamic uplink RB, and an RB in the dynamic flexible subband may be described as a dynamic flexible RB.

The method for dynamically indicating a subband based on method 3-1, 3-2,or 3-3 may be applied to a cell-specific flexible slot or symbol, and may be applied to a cell-specific downlink slot or symbols or uplink slot or symbol. Thus, for a cell-specific downlink slot or symbol and a cell-specific flexible slot or symbol, a subband may be dynamically indicated to a UE. In addition, for a cell-specific uplink slot or symbol, a subband may be dynamically indicated to the UE.

The method for dynamically configuring a subband for a UE based on method 3-1, 3-2, or 3-3 may be applied to a UE-specific flexible slot or symbol. In addition, the method for dynamically configured a subband for a UE, based on method 3-1, 3-2, or 3-3, may be applied to a UE-specific downlink slot or symbol.

Subband Format Configuration/Indication and Slot Format Configuration/Indication Hereinafter, a description will be made of a UE operation when slot format information, semi-statically configured or dynamically indicated to the UE, and subband format information, semi-statically configured or dynamically indicated to the UE, are configured or indicated on the same resource.

FIGS. 19 to 23 illustrate a method for configuring a subband according to an embodiment of the present disclosure.

(Method 4-1) Method 4-1 relates to an operation performed by a UE when a semi-static cell-specific subband format and a semi-static UE-specific slot format are configured for the same cell-specific flexible slot or symbol that is semi-statically configured.

i) When a semi-static subband format is configured, a UE may expect that a semi-static UE-specific slot format will not be configured. Furthermore, when a semi-static UE-specific slot format is configured, the UE may expect that a semi-static subband format will not be configured. In other words, the UE may expect that a semi-static subband format configuration and a semi-static slot format configuration will not conflict for the same semi-static cell-specific flexible symbol. This may imply that when a specific time domain resource is divided into multiple subbands, the specific time domain resource is not divided into different types of symbols in the time domain.

ii) A UE may apply a semi-static UE-specific slot format to a semi-static flexible subband. Referring to FIG. 19, the UE may apply a semi-statically configured UE-specific slot format to a semi-statically configured cell-specific flexible subband. Thus, the semi-static flexible subband may be divided into semi-static downlink/uplink/flexible slots/symbols in the time domain. In the case of ii), different types of symbols may be allocated in the time domain even within a subband, enabling more flexible utilization and scheduling of time and frequency resources. When the semi-static flexible subband is divided into semi-static downlink/uplink/flexible symbols, the semi-static flexible subband may be divided into symbols of the same type within the same slot. That is, the same slot may include only symbols of the same type, but not symbols of different types. The same slot may include symbols of the same type. When a semi-static flexible subband is divided into semi-static downlink/uplink/flexible symbols, guard bands may be required between RBs of different types of subbands. Referring to FIG. 23, a guard band may be required between a semi-static downlink subband and a semi-static uplink slot or symbol, and a guard band may be required between a semi-static uplink subband and a semi-static downlink slot or symbol. A base station may configure the number of RBs for the guard bands for the UE. Alternatively, the number of RBs for the guard band may be predefined, and the UE may use the predefined number of RBs for the guard bands.

(Method 4-2) Method 4-2 relates to an operation performed by a UE when a semi-static cell-specific subband format is configured for the same cell-specific flexible slot or symbol that is configured semi-statically, and when a dynamic SFI is indicated for the same symbols.

i) When a semi-static subband format is configured, the UE may expect that dynamic SFIs will not be indicated for the same resource. When a specific time domain resource is divided into multiple subbands, the specific time domain resource may not be divided into symbols of different types in the time domain.

ii) The UE may apply a dynamic SFI when a semi-static subband format is configured. Referring to FIG. 20, the UE may apply a dynamic SFI to a semi-statically configured cell-specific flexible subband. Thus, the semi-static flexible subband may be divided into dynamic downlink/uplink/flexible slots or symbols in the time domain. In the case of ii), different types of symbols may be allocated in the time domain even within a subband, enabling more flexible utilization and scheduling of time and frequency resources in a cell. When the semi-static flexible subband is divided into semi-static downlink/uplink/flexible symbols, the same type of symbols may be included in the same slot. That is, symbols within the same slot may not be indicated as different types of symbols. When the semi-static flexible subband is divided into dynamic downlink/uplink/flexible symbols, guard bands may be required between RBs of different types of subbands. Referring to FIG. 20, a guard band may be required between a semi-static downlink subband and a dynamic uplink slot or symbol, and a guard band may be required between a semi-static uplink subband and a dynamic downlink slot or symbol. A base station may configure the number of RBs for the guard bands for the UE. Alternatively, the number of RBs for the guard bands may be predefined, and the UE may use the predefined number of RBs for the guard bands.

(Method 4-3) Method 4-3 relates to an operation performed by a UE when a semi-static UE-specific slot format is configured for the same cell-specific flexible slot or symbol that is configured semi-statically, and when a dynamic subband format is indicated for the same slot or symbol.

i) The UE may expect that a dynamically indicated subband format will not be indicated for a semi-statically configured UE-specific flexible slot or symbol. Since the UE-specific flexible slot or symbol may be configured differently among UEs in a cell, the UEs may expect not to be further divided into subbands to prevent interference between the UEs in the cell.

ii) The UE may apply a dynamically indicated subband format to a semi-statically configured UE-specific flexible slot or symbol. Referring to FIG. 21, the UE may apply a dynamically indicated subband format to a semi-statically configured cell-specific flexible slot or symbol as well as to a UE-specific flexible slot or symbol. This has the effect of enabling more flexible resource utilization and scheduling. When semi-static UE-specific flexible slots or symbols are divided into dynamic downlink/uplink/flexible subbands, a gap for DL/UL switching may be required between a downlink symbol and an uplink symbol. In this case, the gap may be a symbol unit. Referring to FIG. 21, a gap may be required between a semi-static downlink symbol and a dynamic uplink subband. Also, a gap may be required between a dynamic downlink subband and a semi-static uplink symbol. A base station may configure the number of symbols for the gaps for the UE. Alternatively, the number of symbols for the gaps may be predefined, and the UE may use the predefined number of symbols for the gap.

(Method 4-4) Method 4-4 relates to an operation performed by a UE when a dynamic subband format and a dynamic SFI are indicated for the same cell-specific flexible slot or symbol that is semi-statically configured.

i) When a dynamic subband format is indicated, a UE may expect that a dynamic SFI will not be indicated. Alternatively, when a dynamic SFI is indicated, the UE may expect that a dynamic subband format will not be indicated. In other words, the UE may expect that a dynamic subband format indication and a dynamic slot format indication will not conflict for the same semi-static cell-specific flexible slot or symbol(s). This implies that the flexibility to dynamically indicate both the subband format and the slot format simultaneously is not required, and thus the UE may expect that only information about one of the two formats will be dynamically indicated.

ii) The UE may apply a dynamic subband format to a flexible slot or symbol indicated by a dynamic SFI. Referring to FIG. 22, the UE may determine dynamic downlink/uplink/flexible slots or symbols by applying a dynamic SFI indicated for a semi-statically configured cell-specific flexible slot or symbol. The UE may determine dynamic downlink/uplink/flexible subbands by applying an indicated dynamic subband format to the dynamic flexible slots or symbols determined by using the dynamic SFI. Transmission/reception of a signal configured by a higher layer (e.g., reception of PDSCH, reception of CSI-RS, transmission of PUCCH, transmission of PUSCH, transmission of PRACH, or transmission of SRS) may be canceled by the dynamic SFI. However, when a specific format is again indicated as the dynamic subband format, the UE may perform the canceled transmission/reception of the signal configured by the higher layer. When the dynamic flexible slots or symbols are divided into dynamic downlink/uplink/flexible subbands, a gap for DL/UL switching may be required between the downlink symbol and the uplink symbol. In this case, the gap may be a symbol unit. Referring to FIG. 22, a gap may be required between dynamic downlink symbols and a dynamic uplink subband. Furthermore, a gap may be required between a dynamic downlink subband and dynamic uplink symbols. A base station may configure the number of symbols for the gaps to the UE. Alternatively, the number of symbols for the gaps may be predefined, and the UE may use the predefined number of symbols for the gaps.

iii) The UE may apply a dynamic SFI to a flexible subband indicated by a dynamic subband format. Referring to FIG. 23, the UE may determine dynamic downlink/uplink/flexible subbands by applying an indicated dynamic subband format to a semi-statically configured cell-specific flexible slot or symbol. The UE may determine dynamic downlink/uplink/flexible slot(s) or symbol(s) by applying an indicated dynamic SFI to the dynamic flexible subband determined based on the dynamic subband format indication. Transmission/reception of a signal configured by the higher layer (e.g., PDSCH reception, CSI-RS reception, PUCCH transmission, PUSCH transmission, PRACH transmission, or SRS transmission) may be canceled by the dynamic subband format indication. However, when a specific format is again indicated by a dynamic SFI, the UE may perform the canceled transmission/reception of the signal configured by the higher layer. When the dynamic flexible subband is divided into dynamic downlink/uplink/flexible symbols, guard bands may be required between RBs of different subband types. Referring to FIG. 23, a guard band may be required between a dynamic downlink slot or symbol and a dynamic uplink subband. A guard band may be required between a dynamic uplink slot or symbol and a dynamic downlink subband. The base station may configure the number of RBs for guard bands to the UE. Alternatively, the number of RBs for the guard bands may be predefined, and the UE may use the predefined number of RBs for the guard bands.

Method for Indicating Active DL/UL BWP

Hereinafter, a description will be made of a method by which an active BWP is indicated when a subband format is semi-statically or dynamically configured for a UE.

When the UE is operating in a TDD or unpaired spectrum system, a maximum of four downlink/uplink BWP pairs may be configured for the UE by the base station for one carrier (or cell). In addition, the base station may instruct the UE to activate one of the configured downlink/uplink BWP pairs. Information instructing the UE to activate the one downlink/uplink BWP pair may be included in a bandwidth part indicator (BPI) field in DCI that schedules a PDSCH or a PUSCH. Thus, the UE may receive the DCI scheduling the PDSCH or the PUSCH from the base station and identify a downlink/uplink BWP pair activated based on the BPI field. The UE may not receive or transmit a channel/a signal on time-frequency resources other than the active BWP. In addition, the UE may not perform PDCCH monitoring on the time-frequency resources other than the active BWP. In other words, the UE may perform downlink reception or PDCCH monitoring on time-frequency resources within an active downlink BWP, and uplink transmission on time-frequency resources within an active uplink BWP. When uplink/downlink subbands are included within active downlink/uplink BWPs, the UE may not perform downlink reception on the uplink subband and may not perform uplink transmission on the downlink subband. Furthermore, when the UE performs PDCCH monitoring in the uplink subband, this may cause inefficient power consumption by the UE.

To address these problems, when a subband format is configured or indicated for the UE, the active downlink BWP may be instructed to include a downlink subband and a flexible subband, and the active uplink BWP may be instructed to include an uplink subband and flexible subband. That is, the base station may instruct the UE to configure the active BWP to include a flexible subband and the same subband format as the subband format configured through the BPI field in the DCI for a configured subband and/or symbol. The UE may perform only downlink reception or PDCCH monitoring in the downlink subband, and may perform only uplink transmission in the uplink subband. However, in the flexible subband, the UE may perform downlink reception, PDCCH monitoring, or uplink transmission. Thus, the base station may configure the active BWP to include a subband and a flexible subband of at least the same format as a pre-configured subband format.

Overwriting Rule for Slot Format

As methods by which a base station informs a UE of slot format information, there may be 1) a method using a semi-static slot format, and 2) a method using a dynamic slot format based on DCI format 2_0 of GC-PDCCH. The semi-static slot format may be slot format information that the UE configures by receiving an RRC signal or SIB1, and the dynamic slot format based on DCI format 2_0 of the GC-PDCCH may be slot format information indicated by an L1 signal.

When the UE receives semi-static slot format information through the RRC signal and dynamic subband format information through the L1 signal, the UE should determine whether symbols in a slot are downlink symbols, uplink symbols, or flexible symbols, and the UE's operation should be defined based on the determined symbols. When a downlink symbol and an uplink symbol are configured semi-statically, no other type of slot or symbol may be indicated through the dynamic slot format based on DCI format 2_0 of the GC-PDCCH. However, a semi-statically configured flexible symbol may be indicated as a downlink symbol, an uplink symbol, or a flexible symbol based on DCI format 2_0 of the GC-PDCCH. Hereinafter, a UE operation for the semi-statically configured flexible symbol will be described. Specifically, hereinafter, a description will be made of a UE operation when a cell-specific/UE-specific flexible symbol semi-statically configured to the UE or a semi-static slot format is not configured for the UE.

i) When a UE is Not Configured to Monitor DCI Format 2_0 of GC-PDCCH

For semi-statically configured cell-specific/UE-specific flexible symbols, or for symbols not configured in a semi-static slot format, when the UE is not configured to periodically monitor a CORESET for receiving DCI format 2_0 of GC-PDCCH, operations performed by the UE are as follows.

When the UE receives, from the base station, a DCI format instructing the UE to receive PDSCH or CSI-RS, the UE may receive the PDSCH or the CSI-RS in a symbol set indicated by the DCI format.

When the UE receives, from the base station, a DCI format, RAR UL grant, fallbackRAR UL grant, or successRAR that instructs the UE to transmit PUSCH, PUCCH, PRACH, or SRS, the UE may transmit the PUSCH, the PUCCH, the PRACH, or the SRS in the symbol set indicated by the DCI format.

When the UE is configured by the higher layer to receive PDSCH or CSI-RS in a symbol set in a slot, the UE may not receive the PDSCH or the CSI-RS in the symbol set in the slot.

When the UE is configured by the higher layer to transmit PUSCH, PUCCH, PRACH, or SRS in a symbol set in a slot, the UE may not transmit the PUSCH, the PUCCH, the PRACH, or the SRS in symbol set in the slot.

ii) When the UE is Configured to Monitor DCI Format 2_0 of GC-PDDCH, and Detects DCI Format 2_0, For a cell-specific/UE-specific flexible symbol that is semi-statically configured for the UE, or for a symbol in which a semi-static slot format is not configured for the UE, when the UE is configured to periodically monitor a CORESET for receiving DCI format 2_0 of GC-PDCCH and when the UE detects DCI format 2_0 that indicates a slot format with a slot format value other than 255, operations performed by the UE are as follows.

When the UE is configured to monitor PDCCH in one or more symbols of a specific symbol set in a CORESET, the UE may receive the PDCCH in the CORESET only if slot format information included in DCI format 2_0 configures the one or more symbols as downlink symbols.

When the UE detects a DCI format instructing the UE to receive PDSCH or CSI-RS through a flexible symbol in a slot that is configured based on DCI format 2_0, the UE may receive the PDSCH or the CSI-RS through the configured flexible symbol in the slot.

When the UE detects a DCI format, RAR UL grant, fallbackRAR UL grant, or successRAR that indicates, to the UE, transmission of PUSCH, PUCCH, PRACH, or SRS through a flexible symbol in a sloth configured based on DCI format 2_0, the UE may transmit the PUSCH, the PUCCH, the PRACH, or the SRS through the configured flexible symbol in the slot.

When the UE has not detected a DCI format that indicates, to the UE, reception of PDSCH or CSI-RS through a flexible symbol in a slot configured based on DCI format 2_0, the UE may not receive the PDSCH or the CSI-RS through the configured flexible symbol in the slot. In addition, when the UE has not detected a DCI format, RAR UL grant, fallbackRAR UL grant, or successRAR, which instruct the UE to transmit PUSCH, PUCCH, PRACH, or SRS through a flexible symbol in a slot configured based on DCI format 2_0, the UE may not transmit the PUSCH, the PUCCH, the PRACH, or the SRS through the flexible symbol in the slot.

When the UE is configured by the higher layer to receive PDSCH or CSI-RS for a symbol set in a slot, the UE may receive the PDSCH or the CSI-RS from the symbol set only if slot format information in DCI format 2_0 indicates the symbol set as downlink symbols.

When the UE is configured by the higher layer to transmit PUCCH, PUSCH, or PRACH for a symbol set in a slot, the UE may transmit the PUCCH, the PUSCH, or the PRACH from the symbol set only if slot format information in DCI format 2_0 indicates the symbol set as uplink symbols.

When the UE is configured by the higher layer to transmit SRS for a symbol set in a slot, the UE may transmit the SRS from the symbol set only if slot format information in DCI format 2_0 indicates the symbol set as uplink symbols.

In relation to a symbol set in a slot, when slot format information in DCI format 2_0 indicates the symbol set as downlink symbols, the UE may not expect to detect a DCI format, RAR UL grant, fallbackRAR UL grant, or successRAR, which instructs the UE to transmit PUSCH, PUCCH, PRACH, or SRS in one or more symbols in the symbol set.

When a symbol set in a slot includes a symbol in which repeated transmission of PUSCH, activated by a UL Type 2 grant PDCCH (see TS 38.213 10.2), is performed, the UE may not expect that slot format information in DCI format 2_0 will indicate symbols in a symbol set as downlink symbols or flexible symbols.

When slot format information in DCI format 2_0 indicates that symbols of a symbol set in a slot are uplink symbols, the UE may not expect to detect a DCI format instructing the UE to receive PDSCH or CSI-RS in one or more symbols in the symbol set.

iii) When a UE is Configured to Monitor DCI Format 2_0 of GC-PDDCH, but Does Not Detect DCI Format 2_0.

When the UE has been configured to periodically monitor a CORESET for receiving DCI format 2_0 of the GC-PDCCH, for cell-specific/UE-specific flexible symbols semi-statically configured for the UE or for a symbol in which a semi-static slot format is not configured for the UE, but the UE fails to detect the DCI format 2_0 that indicates the slot format, the UE's operations are as follows.

When the UE receives a DCI format instructing the UE to receive PDSCH or CSI-RS, the UE may receive the PDSCH or the CSI-RS in a symbol set in a slot.

When the UE receives a DCI format, RAR UL grant, fallbackRAR UL grant, or successRAR, which instructs the UE to transmit PUSCH, PUCCH, PRACH, or SRS, the UE may transmit the PUSCH, the PUCCH, the PRACH, or the SRS in a symbol set in a slot.

Even when the UE is configured by a higher layer to receive PDSCH or CSI-RS in a symbol set in a slot, the UE may not receive the PDSCH or the CSI-RS in the symbol set.

The UE may be configured by a higher layer to transmit SRS, PUCCH, PUSCH, or PRACH on a symbol set in a slot. In this case, when a symbol in which the UE is configured to transmit the SRS, the PUCCH, the PUSCH, or the PRACH is a symbol which is after Tproc,2 from the last symbol of a CORESET in which the UE is configured to monitor PDCCH based on DCI format 2_0, the UE may not transmit the SRS, the PUCCH, the PUSCH, or the PRACH in a slot configured by a higher layer, or may not transmit the SRS, the PUCCH, the PUSCH, or the PRACH in a symbol in a slot that is configured for transmission of the SRS, the PUCCH, the PUSCH, or the PRACH.

The UE may be configured by a higher layer to transmit SRS, PUCCH, PUSCH, or PRACH in a symbol set in a slot. In this case, when a symbol in which the UE is configured to transmit the SRS, the PUCCH, the PUSCH, or the PRACH is a symbol which is before Tproc,2 from the last symbol of a CORESET in which the UE is configured to monitor PDCCH based on DCI format 2_0, the UE may not transmit the SRS, the PUCCH, the PUSCH, or the PRACH through the symbols of the symbol set in the slot.

When the UE does not detect DCI format 2_0 indicating that a symbol set in a slot is uplink symbols and the UE does not detect a DCI format instructing the UE to transmit SRS, PUSCH, PUCCH, or PRACH in the symbol set, the UE may assume that a flexible symbol in a CORESET configured to the UE for PDCCH monitoring is a downlink symbol.

Overwriting Rule for Subband Format

As methods by which a base station informs a UE of subband format information, there may be 1) a method using a semi-static subband format, and 2) a method using a dynamic subband format based on DCI format 2_0 of GC-PDCCH or a new DCI format 2_x of GC-PDCCH. The UE may receive semi-static subband format information through an RRC signal and dynamic subband format information through an L1 signal to determine the type of subband. That is, the UE may determine whether RBs of the subband are downlink RBs, uplink RBs, or flexible RBs based on the semi-static subband format information and the dynamic subband format information, and may perform operations based on the determined RBs.

According to an embodiment of the present disclosure, a semi-statically configured downlink subband and a semi-statically configured uplink subband may not be indicated to the UE as a different type of subband or as a flexible subband through DCI format 2_0 of GC-PDCCH or the new DCI format 2_x of GC-PDCCH. However, a semi-statically configured flexible subband may be indicated to the UE as a downlink subband, an uplink subband, or a flexible subband through DCI format 2_0 or the new DCI format 2_x of GC-PDCCH. Hereinafter, operations performed by a UE regarding a semi-statically configured flexible subband will be described. Specifically, the description will be made of operations that the UE performs when a semi-statically configured cell-specific flexible subband or a semi-static subband format is not configured for the UE.

i) When the UE is Not Configured to Monitor DCI Format 2_0 of GC-PDCCH or a New DCI Format 2_x of GC-PDCCH There may be a cell-specific flexible RB semi-statically configured for the UE, or an RB in which a semi-static subband format is not configured for the UE. In this case, when the UE is not configured to periodically monitor a CORESET for reception using DCI format 2_0 of GC-PDCCH or the new DCI format 2_x of GC-PDCCH, operations performed by the UE are as follows.

When the UE detects (receives) a DCI format indicating whether to receive PDSCH or CSI-RS, the UE may receive the PDSCH or the CSI-RS in an RB set of a semi-statically configured cell-specific flexible subband. In addition, when the UE detects (receives) a DCI format indicating whether to receive PDSCH or CSI-RS, the UE may receive the PDSCH or the CSI-RS in all RBs of symbols in a slot in which DCI has been received, provided that a semi-static subband format is not configured for the UE.

When the UE receives a DCI format, RAR UL grant, fallbackRAR UL grant, or successRAR that indicates whether to transmit a PUSCH, PUCCH, PRACH, or SRS, the UE may transmit the PUSCH, the PUCCH, the PRACH, or the SRS in an RB set of a corresponding subband.

When the UE is configured by a higher layer to receive PDSCH or CSI-RS in an RB set of a specific subband, the UE may not receive the PDSCH or the CSI-RS in the RB set of the subband.

When the UE is configured by a higher layer to transmit PUSCH, PUCCH, PRACH, or SRS in an RB set of a specific subband, the UE may not transmit the PUSCH, the PUCCH, the PRACH, or the SRS in the RB set of the subband.

ii) When the UE is Configured to Monitor DCI Format 2_0 of GC-PDDCH or a New DCI Format 2_x of GC-PDCCH, and the UE Detects DCI Format 2_0 or the New DCI Format 2_x of GC-PDCCH There may be a cell-specific flexible RB semi-statically configured for the UE, or an RB in which a semi-static subband format is not configured for the UE. In this case, when the UE is configured to periodically monitor a CORESET for reception using DCI format 2_0 of GC-PDCCH or the new DCI format 2_x of GC-PDCCH and the UE detects DCI format 2_0 of GC-PDCCH or the new DCI format 2_x of GC-PDCCH, including subband format information, operations performed by the UE are as follows.

When one or more RBs in an RB set are RBs in a CORESET configured to the UE for PDCCH monitoring, the UE may receive the PDCCH in the CORESET only if subband format information of DCI format 2_0 of GC-PDCCH or the new DCI format 2_x of GC-PDCCH indicates the one or more RBs as downlink RBs.

When the subband format information of DCI format 2_0 of GC-PDCCH or the new DCI format 2_x of GC-PDCCH indicates that one or more RBs in an RB set are flexible RBs, and when the UE detects a DCI format instructing the UE to receive PDSCH or CSI-RS in the RB set including the indicated flexible RBs, the UE may receive the PDSCH or the CSI-RS in the RB set.

When the subband format information of DCI format 2_0 of GC-PDCCH or the new DCI format 2_x of GC-PDCCH indicates an RB set in a subband as flexible RBs, and when the UE detects a DCI format, RAR UL grant, fallbackRAR UL grant, or successRAR, which instructs the UE to transmit PUSCH, PUCCH, PRACH, or SRS, in the RB set in the subband, the UE may transmit the PUSCH, the PUCCH, the PRACH, or the SRS in the RB set in the subband.

The subband format information of DCI format 2_0 of GC-PDCCH or the new DCI format 2_x of GC-PDCCH indicates an RB set in a subband as flexible RBs, and the UE may not detect a DCI format instructing the UE to receive PDSCH or CSI-RS in the RB set in the subband, or the UE may not detect a DCI format, RAR UL grant, fallbackRAR UL grant, or successRAR, which instructs the UE to transmit PUSCH, PUCCH, PRACH, or SRS in the RB set in the subband. In such cases, the UE may not receive the PDSCH or the CSI-RS in the RB set in the subband. The UE may also not transmit the PUSCH, the PUCCH, the PRACH, or the SRS in the RB set in the subband.

When the UE is configured by a higher layer to receive PDSCH or CSI-RS in an RB set in a subband, the UE may receive the PDSCH or the CSI-RS in the RB set in the subband only if the subband format information of DCI format 2_0 of GC-PDCCH or the new DCI format 2_x of GC-PDCCH indicates the RB set in the subband as downlink RBs.

When the UE is configured by a higher layer to transmit SRS, PUCCH, PUSCH, or PRACH in an RB set in a subband, the UE may transmit the SRS, the PUCCH, the PUSCH, or the PRACH in the RB set in the subband only if the subband format information of DCI format 2_0 of GC-PDCCH or the new DCI format 2_x of GC-PDCCH indicates the RB set in the subband RBs as uplink RBs.

The subband format information of DCI format 2_0 of GC-PDCCH or the new DCI format 2_x of GC-PDCCH may indicate that an RB set in a subband is downlink RBs. In this case, the UE may not expect that a DCI format, RAR UL grant, fallbackRAR UL grant, or successRAR, which instructs the UE to transmit PUSCH, PUCCH, PRACH, or SRS in one or more RBs in the RB set in the subband will be detected.

When an RB set in a subband includes RBs in which repeated transmission of PUSCH activated by UL Type 2 grant PDCCH (sec 3GPP TS38.213) is configured, the UE may not expect that the RB set in the subband will be indicated as downlink RBs or flexible RBs through the subband format information of DCI format 2_0 of GC-PDCCH or the new DCI format 2_x of GC-PDCCH.

The UE may not expect that an RB set in a subband will be indicated as uplink RBs through the subband format information of DCI format 2_0 of GC-PDCCH or the new DCI format 2_x of GC-PDCCH, and that a DCI format instructing the UE to receive PDSCH or CSI-RS in one or more RBs of the RB set in the subband will be detected.

iii) When the UE is Configured to Monitor DCI Format 2_0 of GC-PDCCH or a New DCI Format 2_x of GC-PDCCH, and Does Not Detect DCI Format 2_0 of GC-PDCCH or the New DCI Format 2_x of GC-PDCCH For a semi-statically configured cell-specific flexible RB, or for an RB in which a semi-static subband format is not configured for the UE, the UE may be configured to periodically monitor a CORESET for the reception of DCI format 2_0 of GC-PDCCH or the new DCI format 2_x of GC-PDCCH. In this case, when the UE does not detect DCI format 2_0 of GC-PDCCH or the new DCI format 2_x of GC-PDCCH, operations performed by the UE are as follows.

When the UE receives a DCI format instructing the UE to receive PDSCH or CSI-RS, the UE may receive the PDSCH or the CSI-RS in an RB set of a semi-statically configured cell-specific flexible subband. In addition, when the UE detects (receives) a DCI format indicating whether to receive PDSCH or CSI-RS, the UE may receive the PDSCH or the CSI-RS in all RBs of symbols in a slot in which DCI has been received, provided that a semi-static subband format is not configured for the UE.

When the UE receives a DCI format, RAR UL grant, fallbackRAR UL grant, or successRAR, which instructs the UE to transmit PUSCH, PUCCH, PRACH, or SRS, the UE may transmit the PUSCH, the PUCCH, the PRACH, or the SRS in an RB set of the corresponding subband.

The UE may receive PDCCH as described in 3GPP TS38.213.

When the UE is configured by a higher layer to receive PDSCH or CSI-RS on an RB set in a subband from the higher layer, the UE may not receive the PDSCH or the CSI-RS in the RB set in the subband.

When the UE is configured by a higher layer to transmit SRS, PUCCH, PUSCH, or PRACH in an RB set in a subband, and when a configured symbol is a symbol which is after Tproc,2 from the last symbol of a CORESET in which the UE is configured to monitor PDCCH for DCI format 2_0 or the new DCI format 2_X, the UE may not transmit the SRS, the PUCCH, the PUSCH, or the PRACH in the subband.

When the UE is configured by a higher layer to transmit SRS, PUCCH, PUSCH, or PRACH in an RB set in a subband, and when a configured symbol is a symbol which is before Tproc,2 from the last symbol of a CORESET in which the UE is configured to monitor PDCCH for DCI format 2_0 or the new DCI format 2_X, the UE may not transmit the SRS, the PUCCH, the PUSCH, or the PRACH in the RB set in the subband.

When the UE does not detect DCI format 2_0 or the new DCI format 2_X indicating an RB set in a subband as flexible RBs or uplink RBs, and when the UE does not detect a DCI format instructing the UE to transmit SRS, PUSCH, PUCCH, or PRACH in the RB set, the UE may assume that a flexible RB of a CORESET configured to the UE for PDCCH monitoring is a downlink RB.

Hereinafter, an operation performed by the UE for semi-statically configured downlink slots or symbols is described. In addition, an operation performed by the UE when a subband format is configured or indicated for the semi-statically configured downlink slot or symbol is described. The operation is described. That is, an operation of a UE when the base station indicates a subband of a semi-statically configured cell-specific downlink slot or symbol as a downlink, uplink, or flexible subband through DCI format 2_0 or new DCI format 2_x of a GC-PDCCH is described.

i) When the UE Does Not Receive a Configuration to Monitor DCI Format 2_0 or New DCI Format 2_x of a GC-PDCCH, Which Indicates a Subband Format When the UE is not configured (does not receive a configuration) to periodically monitor a CORESET to receive DCI format 2_0 or new DCI format 2_x of the GC-PDCCH, which indicates a subband format, an operation performed by the UE is as follows.

When the UE receives a DCI format indicating PDSCH or CSI-RS reception, the UE may receive a PDSCH or a CSI-RS in a slot or symbol set indicated by DCI.

The UE may not expect to receive a DCI format, an RAR UL grant, a fallbackRAR UL grant, or successRAR indicating PUSCH, PUCCH, PRACH, or SRS transmission.

When the UE receives a configuration to receive a PDSCH or a CSI-RS in a slot or symbol set from a higher layer, the UE may receive the PDSCH or the CSI-RS in the slot or symbol set.

When the UE receives a configuration to transmit the PUSCH, PUCCH, PRACH, or SRS in the slot or symbol set from the higher layer, the UE may not transmit the PUSCH, PUCCH, PRACH, or SRS in the slot or symbol set.

ii) When the UE Receives a Configuration to Monitor DCI Format 2_0 or New DCI Format 2_x of a GC-PDCCH, Which Indicates a Subband Format, and the UE Detects DCI Format 2_0 or New DCI Format 2_x When the UE is configured to monitor DCI format 2_0 or new DCI format 2_x of a GC-PDCCH, which indicates a subband format, the UE is configured to periodically monitor a CORESET to receive DCI format 2_0 or new DCI format 2_x, and the UE detects DCI format 2_0 or new DCI format 2_x indicating the subband format, an operation performed by the UE is as follows.

When at least one symbol in a symbol set of a predetermined time domain interval is a symbol in a CORESET configured for the UE to monitor a PDCCH, the UE may receive the PDCCH in the CORESET only when subband format information of DCI format 2_0 or new DCI format 2_x does not indicate one or more RBs of the symbol set as uplink RBs. That is, the UE may receive the PDCCH in the CORESET only in the downlink RB or the flexible RB.

When the subband format information of DCI format 2_0 or new DCI format 2_x indicates an uplink RB for an RB set of a subband and the UE detects a DCI format indicating reception of a PDSCH or a CSI-RS in the RB set of the subband, the UE cannot receive the PDSCH or the CSI-RS in the RB set in the subband.

When the subband format information of DCI format 2_0 or new DCI format 2_x indicates a flexible RB for an RB set of a subband and the UE detects a DCI format, an RAR UL grant, a fallbackRAR UL grant, or success RAR indicating transmission of a PUSCH, a PUCCH, a PRACH, or an SRS, the UE may transmit the PUSCH, PUCCH, PRACH, or SRS in the RB set in the subband.

When the UE receives a configuration to transmit the SRS, PUCCH, PUSCH, or PRACH for an RB set of a subband from a higher layer, the UE may transmit the SRS, PUCCH, PUSCH, or PRACH in the RB set of the subband only when the subband format information of DCI format 2_0 or new DCI format 2_x indicates the RB set of the subband as the uplink.

When the subband format information of DCI format 2_0 or new DCI format 2_x indicates an RB set of a subband as an uplink RB, the UE may not expect to detect a DCI format indicating PDSCH or CSI-RS reception in one or more RBs of the RB set of the subband.

iii) When the UE Receives a Configuration to Monitor DCI Format 2_0 or New DCI Format 2_x of a GC-PDCCH, Which Indicates a Subband Format and the UE Fails to Detect DCI Format 2_0 or New DCI Format 2_x For a semi-statically configured downlink slot or symbol, the UE may receive configuration to periodically monitor a CORESET for reception of DCI format 2_0 or new DCI format 2_x of a GC-PDCCH. In this case, when the UE fails to detect DCI format 2_0 or new DCI format 2_x indicating the subband format, an operation performed by the UE is as follows.

When the UE receives a DCI format indicating reception of a PDSCH or a CSI-RS, the UE may receive the PDSCH or CSI-RS in an RB set of the subband indicating the DCI.

The UE may not expect to receive a DCI format, an RAR UL grant, a fallbackRAR UL grant, or successRAR indicating transmission of a PUSCH, a PUCCH, a PRACH, or an SRS.

The UE may receive the PDCCH as described in 3GPP TS38.213.

When the UE receives a configuration from a higher layer to receive a PDSCH or a CSI-RS in an RB set of a specific subband, the UE may transmit the PDSCH or the CSI-RS in the RB set of the corresponding subband.

When the UE receives a configuration to transmit an SRS, a PUCCH, a PUSCH, or a PRACH in an RB set in a subband from a higher layer and the configured symbol is a symbol after Tproc,2 from a last symbol of a CORESET configured to monitor a PDCCH for DCI format 2_0 or new DCI format 2_x, the UE may not transmit the SRS, PUCCH, PUSCH, or PRACH in the subband.

When the UE receives a configuration to transmit an SRS, a PUCCH, a PUSCH, or a PRACH in an RB set in a subband from a higher layer, the UE may not transmit the SRS, PUCCH, PUSCH, or PRACH in the RB set of the subband.

When the UE fails to detect DCI format 2_0 or new DCI format 2_x indicating the RB set in the subband as a flexible RB or an uplink RB and fails to detect a DCI format indicating the UE to transmit the SRS, PUSCH, PUCCH, or PRACH in the RB set, the UE may assume that the flexible RB of the CORESET configured for the UE for PDCCH monitoring is a downlink RB.

FIG. 24 illustrates a case where PDSCH reception and PUSCH transmission are configured and indicated in a predetermined time domain interval according to an embodiment of the disclosure.

Referring to FIG. 24, a subband may be configured or indicated in a predetermined time domain interval (slot or symbol). Multiple subbands may be configured or indicated, and the multiple subbands may include a downlink subband and an uplink subband. The UE may receive a configuration or indication of transmission of a downlink signal/channel in the downlink subband, and may receive a configuration or indication of reception of an uplink signal/channel in the uplink subband. Specifically, the UE may receive a configuration or indication to receive a PDSCH and transmit a PUSCH in a predetermined time interval. For example, the UE may receive a configuration or indication to receive a PDSCH in an RB in the downlink subband of the same slot or symbol, and may receive a configuration or indication to transmit a PUSCH in an RB in the uplink subband of the same slot or symbol. In this case, when the UE supports only a half-duplex operation according to a capability of the UE, the UE may perform only one operation between the reception of the downlink signal/channel and the transmission of the uplink signal/channel in the same slot or symbol. Hereinafter, an operation of the UE of supporting only the half-duplex operation is described.

When the UE receives a configuration or indication to receive the downlink signal/channel through a downlink subband in a predetermined time domain interval or receives a configuration or indication to transmit the uplink signal/channel through an uplink subband, the UE may prioritize the downlink signal/channel reception or the uplink signal/channel transmission dynamically indicated via DCI. That is, when the UE is dynamically indicated via DCI to receive the downlink signal/channel, the UE may receive the downlink signal/channel through the downlink subband in the predetermined time domain interval. When the UE is dynamically indicated via DCI to transmit the uplink signal/channel, the UE may transmit the downlink signal/channel through the uplink subband in the predetermined time domain interval. In addition, the UE may prioritize the downlink signal/channel reception or the uplink signal/channel transmission indicated by the most recently received DCI, i.e., transmission and reception of a signal or a channel corresponding to subsequent DCI in the time domain. The base station may dynamically indicate, to the UE, one operation between the downlink channel reception and the uplink channel transmission by reflecting a channel situation. For example, there may be a case where the UE is configured to receive a CSI-RS in an RB in the downlink subband of the same time domain interval from the higher layer and the UE is indicated to transmit the PUSCH in the RB in the uplink subband of the same time domain interval through DCI. In this case, the UE may perform the operation indicated via DCI. That is, the UE may transmit the PUSCH in the RB in the uplink subband of the same time domain interval. In other words, the UE may perform transmission of the PUSCH in the RB in the uplink subband of the same time domain interval without receiving the CSI-RS in the RB of the downlink subband of the same time domain interval. For example, there may be a case where the UE is indicated via first DCI to transmit the PUSCH in the RB in the uplink subband of the same time domain interval and the UE is indicated via second DCI to receive the PDSCH in the RB in the downlink subband of the same time domain interval. In this case, the UE may perform an operation indicated via the most recently received DCI. That is, the UE may perform the operation indicated by DCI received later between the first DCI and the second DCI. For example, when the UE has received the second DCI later than the first DCI, the UE may perform the operation indicated by the second DCI without performing the operation indicated by the first DCI. That is, the UE may receive the PDSCH in the RB in the downlink subband of the time domain interval.

When the downlink channel is an SPS PDSCH based on a configured grant or the uplink channel is a PUSCH based on a configured grant (CG), the operation of the UE may be determined based the type of a CG PUSCH.

When the UE is configured to receive the SPS PDSCH and is configured to transmit a type 1 CG PUSCH from the higher layer in the same time domain interval, the UE may operation reception of the SPS PDSCH without performing the transmission of the type 1 CG PUSCH. Whether to receive the SPS PDSCH is activated by the DCI, but whether to receive the type 1 CG PUSCH is not activated by the DCI, and this is because the base station may indicate to the UE to prioritize the reception of the SPS PDSCH.

There may be a case where the UE is configured to receive the SPS PDSCH from the higher layer and is configured to transmit the type 2 CG PUSCH in the same time domain interval. In this case, the UE may perform an operation corresponding to the most recently received DCI between the first DCI for activation the reception of the SPS PDSCH and the second DCI for activation of the transmission of the type 2 CG PUSCH. For example, when the UE receives the second DCI later than the first DCI in the time domain, the UE may perform the operation corresponding to the second DCI, i.e., the transmission of the type 2 CG PUSCH.

Inter-UE Collision Handling

A collision between signals and channels received or transmitted by different UEs may occur in cell. Multiple subbands may be configured in a frequency area of a flexible slot or symbol and/or a downlink sot or symbol dynamically indicated or semi-statically configured by the base station. The semi-statically configured flexible slot or symbol and/or downlink slot or symbol may include a UE-specifically configured slot or symbol. Accordingly, different UEs in the same serving cell may be configured with different slot formats and subband formats.

FIGS. 25 and 26 illustrate subbands configured for multiple UEs, respectively, in one cell according to an embodiment of the disclosure.

Referring to part (a) of FIG. 25 and part (a) of FIG. 26, a slot format configured UE-specifically and semi-statically for a first UE (UE #1) and a second UE (UE #2) by the base station in a cell supporting TDD or unpaid spectrum may be a "DFFFU". The first UE and the second UE may be configured to receive CORESET #0 in the semi-statically configured fourth slot (UE-specifically configured slot F). CORESET #0 may be a CORESET indicated by a physical broadcast channel (PBCH) for initial cell access of the UE. Specifically, the UE may be configured to monitor type-0 common search space (CSS) of CORESET #0. The type-0 common search space may be a search space for monitoring DCI format 1_0 scheduling a PDSCH in which SIB1 is transmitted by the UE. The DCI format 1_0 may be CRC-scrambled by SI-RNTI. In addition, the first UE and the second UE may receive a UE-specific slot format for the semi-statically configured flexible slot or symbol. The first UE and the second UE may be UE-specifically configured with a subband format for the semi-statically configured flexible slot or symbol and/or downlink slot or symbol (part (a) of FIG. 25). The first UE may be configured with multiple subbands for semi-statically configured cell-specific slot F corresponding to the fourth slot (part (b) of FIG. 25), and the second UE may be configured with an uplink slot (slot U) (part (c) of FIG. 25). The second UE receives a configuration to receive CORESET #0, but UE-specifically receives an additional configuration that the fourth slot is an uplink slot, and thus the second UE may not receive CORESET #0.

Referring to part (c) of FIG. 26, the second UE may be configured by the base station to transmit a PUSCH in the fourth slot. In this case, a resource for transmission of the PUSCH, configured for the second UE, may be overlapped with the time and frequency resources for reception of CORESET #0, configured for the second UE. In this case, in a cell supporting multiple subbands, the base station may simultaneously perform the reception of the uplink channel and the transmission of the downlink channel through the same time and frequency resources. Accordingly, between different UEs in the cell, due to the uplink transmission (or downlink reception) of a specific UE, the interference may occur in the downlink reception (or uplink transmission) of the other UE. Referring to part (c) of FIG. 26, the interference may occur between PUSCH transmission of the second UE and CORESET #0 reception of the first UE. The CORESET #0 includes system information for initial cell access, and thus the reception of the UE may need to be prioritized. Hereinafter, a method for resolving the interference between resources of different UEs and resolving the ambiguity in resource sizes between the base station and the UE is described. In the specification, the configuration that multiple subbands are configured for a slot or a symbol may be described as an SBFD configuration. For example, a downlink symbol for which multiple subbands are configured may be described as an SBFD symbol, and a flexible symbol for which multiple subbands are configured may be described as an SBFD symbol.

FIG. 27 illustrates a case where a resource for downlink reception and a resource for uplink transmission, allocated for a UE, overlap each other according to an embodiment of the disclosure.

Referring to FIG. 27, an uplink slot may be UE-specifically configured for the UE in a cell in which a subcarrier spacing (SCS) is 30 kHz and a carrier bandwidth (CW) is 40 MHZ (160 RBs). In this case, CORESET #0 may be configured to be received through 3 OFDM symbols and 96 RBs. In addition, a PUSCH may be configured to be transmitted through 14 OFDM symbols and 100 RBs. With respect to a resource allocated for reception of CORESET #0 and a resource allocated for transmission of a PUSCH, three symbols may overlap on the time domain and 90 RBs may overlap on the frequency domain.

(Method 5-1) With respect to the SBFD configuration, when a resource for uplink transmission and a resource for downlink reception overlap each other, the uplink transmission (e.g., PUSCH) may be rate-matched through a resource scheduled from the base station and the PUSCH may be transmitted. When a resource to which PUSCH transmission is allocated and a resource allocated for reception of an SS/PBCH block or CORESET #0 partially overlap each other in the time and frequency resources, the UE may rate-match the PUSCH for the overlapping resources and transmit the same. That is, even though the UE does not receive CORESET #0 in a slot configured to be an uplink slot, the UE may identify that the resource allocated for the reception of CORESET #0 and the resource allocated for the transmission of the PUSCH overlap each other, and may rate-match the PUSCH, based on a resource remaining after excluding the overlapping resources, and transmit the same. This method can maximize uplink data throughput by utilizing a maximum of resources allocated for PUSCH transmission and transmitting the PUSCH, without causing the interference in the reception of a cell common SS/PBCH block or CORESET #0 which needs to be received first.

Referring to FIG. 27, the UE may perform rate-matching for as many PUSCHs as overlapping (3 symbols*90 RBs) and transmit the same. That is, the UE may perform rate-matching for as many PUSCHs as (3 symbols*90 RBs)/(14 symbols*100 RBs).

(Method 5-2) With respect to the SBFD configuration, when a resource for uplink transmission and a resource for downlink reception overlap each other, the UE may drop transmission of a PUSCH to be transmitted through a resource scheduled from the base station. When a resource allocated for reception of an SS/PBCH block or CORESET #0 and a resource allocated for transmission of a PUSCH fully or partially overlap each other in the time domain and frequency domain, the UE may drop the transmission of the PUSCH and may not transmit the PUSCH. The case where the resources fully or partially overlap each other in the time domain and frequency domain may mean a case where the resource allocated for PUSCH transmission are partially included or is identical to the resource allocate for reception of the SS/PBCH block or CORESET #0. That is, the case may mean a case where if the overlapping resources are excluded, there is no resource configured for the transmission of the PUSCH or the possibility of decoding failure is high even though the resource for PUSCH transmission partially exists and the PUSCH is rate-matched and transmitted through the partially existing resource.

Intra-UE Collision Handling

The UE may be configured or indicated to receive a downlink channel/signal in a semi-statically configured or dynamically indicated downlink slot or symbol (time domain interval). The UE may be configured or indicated to transmit an uplink channel/signal in a semi-statically configured or dynamically indicated downlink slot or symbol. The UE may be dynamically indicated such that multiple subbands are configured in the frequency band of the slot or symbol configured to receive the downlink channel/signal. The UE may be configured or indicated to receive the downlink channel/signal through a downlink subband of the multiple subbands, or may be configured or indicated to transmit the uplink channel/signal through an uplink subband of the multiple subbands. That is, the UE may be configured or indicated to receive the downlink channel/signal in the downlink subband of the multiple subbands configured in the same time domain interval (the semi-statically configured or dynamically indicated downlink slot or symbol) and transmit the uplink channel/signal in the uplink subband of the multiple subbands. In this case, the downlink channel/signal may be an RRC-configured CSI-RS, a CSI-RS triggered/indicated via DCI, a PDSCH (DG PDSCH), the reception of which is indicated via a dynamic grant (DG), a semi-static PDSCH (SPS PDSCH), a PDCCH (i.e., a CORESET for PDCCH monitoring), an SS/PBCH block, etc., and the uplink channel/signal may be CG PUSCH type 1, CG PUSCH type 2, a PUSCH, the transmission of which is indicated via a DG (DG PUSCH), an RRC-configured SRS, an SRS triggered/indicated via DCI, etc.

When the UE is configured to perform transmission the CG PUSCH by using an uplink subband of the multiple subbands, the UE may consider the uplink subband as occasion for the CG PUSCH transmission.

Hereinafter, an operation performed by the UE when uplink channel/signal transmission and downlink channel/signal reception are configured in multiple subbands, respectively, in the same time domain interval is described. In the specification, the case where the resources overlap each other may mean a case where when multiple subbands configured in the same time domain interval are configured, a resource allocated for an uplink signal/channel transmitted through the uplink subband of the multiple subbands and a resource allocated for a downlink signal/channel received through the downlink subband of the multiple subbands overlap in a specific time domain interval (slot or symbol).

Methods 6 to 10 described below corresponds to a case where a downlink channel/signal is an RRC-configured CSI-RS.

Case of Collision Between RRC-Configured CSI-RS and CG PUSCH Type 1

FIGS. 28 and 29 illustrate a method in which a UE performs uplink channel transmission and downlink channel reception through multiple subbands in a semi-statically configured or dynamically indicated time domain interval.

Referring to part (a) of FIG. 28, the UE may be configured to receive a CSI-RS in the semi-statically configured or dynamically indicated downlink slot. Thereafter, the UE may be dynamically indicated such that the multiple subbands are configured in the frequency domain of the slot. When the time-frequency domain resources allocated for CG PUSCH type 1 transmission is configured for transmission of CG PUSCH type 1 in the uplink subband of the multiple subbands, the UE may consider the configured time-frequency domain resources as occasion for transmission of CG PUSCH type 1. Referring to part (b) of FIG. 28, two symbols (the fifth symbol and the sixth symbol) in the slot configured to receive the CSI-RS and the occasion for CG PUSCH type 1 transmission may overlap on the time domain. FIG. 28 illustrates a case where only some symbols overlap, but the resource allocated for CSI-RS reception and the resource allocated for CG PUSCH type 1 transmission (occasion for CG PUSCH type 1 transmission) overlap in all time domains.

(Method 6-1) When the resource allocated for the reception of the RRC-configured CSI-RS and the resource allocated for the transmission of CG PUSCH type 1 overlap in the time domain, the UE may select only one of the reception of the RRC-configured CSI-RS and the transmission of CG PUSCH type 1 and perform the same. In this case, the case where the resources overlap each other may be a case where the resource allocated for the reception of the RRC-configured CSI-RS and the resource allocated for the transmission of CG PUSCH type 1 fully overlap each other on the time domain. That is, the case may be a case where all the symbols allocated for CG PUSCH type 1 transmission are included in the symbols allocated for the reception of the RRC-configured CSI-RS.

i) When the resource allocated for the reception of the CSI-RS and the resource allocated for the transmission of CG PUSCH type 1 overlap each other in the time domain, the UE may perform the reception of the RRC-configured CSI-RS. The UE is indicated such that multiple subbands are dynamically configured in the time domain interval, but the time domain interval is previously configured as a downlink slot or symbol, and thus the previous configuration may be prioritized. That is, the UE may perform the reception of the CSI-RS without performing the transmission of CG-PUSCH type 1.

ii) When the resource allocated for the reception of the RRC-configured CSI-RS and the resource allocated for the transmission of CG PUSCH type 1 overlap in the time domain, the UE may perform the transmission of CG-PUSCH type 1. The transmission of the uplink channel/signal is possible through the uplink subband also in the downlink slot or symbol, and the uplink coverage extension is possible.

(Method 6-2) When the resource allocated for the CSI-RS reception and the resource allocated for CG PUSCH type 1 transmission overlap each other, the UE may receive the RRC-configured CSI-RS and may rate-match CG PUSCH type 1 and transmit the same. In this case, the case where the resources overlap each other may be a case where the resource allocated or the reception of the RRC-configured CSI-RS and the resource allocated for the transmission of CG PUSCH type 1 partially overlap each other on the time domain. That is, the case may be a case where a symbol allocated for the transmission of CG PUSCH type 1 and a symbol allocated for the reception of the RRC-configured CSI-RS partially overlap. In other words, when the resource allocated for the reception of the RRC-configured CSI-RS and the resource allocated for the transmission of CG PUSCH type 1 partially overlap in the time domain interval, the UE may receive the RRC-configured CSI-RS, perform rate-matching for the resource overlapping with the resource allocated for the reception of the RRC-configured CSI-RS in the time domain among the resources allocated for CG PUSCH type 1, and transmit, based on an non-overlapping resource, CG PUSCH type 1. In this case, the UE may receive the RRC-configured CSI-RS and transmit CG PUSCH type 1 in consideration of a downlink-to-uplink switching gap (DL-to-UL switching gap) symbol for RF retuning. The UE may receive the RRC-configured CSI-RS in the overlapping symbol, and may rate-match and transmit CG-PUSCH type 1 in a symbol remaining after excluding the switching gap symbol from non-overlapping symbols. According to method 6-2, when it is configured that the reception of the RRC-configured CSI-RS and the transmission of CG PUSCH type 1 are performed through multiple subbands configured in the time domain interval, respectively, the reception of the RRC-configured CSI-RS can be secured in the overlapping symbol in the time domain, and the transmission of CG PUSCH type 1 can be secured to the maximum in a symbol except for the overlapping symbol and the gap symbol in the time domain.

Referring to FIG. 29, the UE may be configured to receive a downlink channel/signal (CSI-RS) in the downlink subband of the multiple subbands configured in the same time domain interval (the semi-statically configured or dynamically indicated downlink slot or symbol), and transmit the uplink channel/signal (CG PUSCH type 1) in the uplink subband of the multiple subbands. In this case, two symbols (the fifth symbol and the sixth symbol) of resources allocated for reception of the CSI-RS may be overlapped with the resource allocated for transmission of CG-PUSCH type 1 in the time domain. The UE may perform rate-matching for CG PUSCH type 1 for six symbols (the ninth symbol to the fourteenth symbol) and transmit the same through the uplink subband in consideration of two overlapping symbols and two downlink-to-uplink switching gap symbols.

i) When the UE is configured to repeatedly transmit CG PUSCH type 1 and a symbol allocated for reception of the CSI-RS and a symbol allocated for the initial repeated transmission (initial transmission occasion) of CG PUSCH type 1 partially overlap each other, the UE may perform the initial repeated transmission of CG PUSCH type 1 by rate-matching the same. In addition, the UE may perform the same repeated transmission of the next CG PUSCH type 1 as the initial CG PUSCH type 1 repeated transmission by rate-matching the same. Accordingly, the same TB size (TBS) is determined for repeated transmissions of CG PUSCH type 1, and thus the base station can facilitate soft combining of the repeated transmissions of the CG PUSCH.

ii) There may be a case where the UE is configured to repeatedly transmit CG PUSCH type 1 and a symbol allocated for the CSI-RS reception and a symbol allocated for repeated transmission (initial transmission occasion) of CG PUSCH type 1 partially overlap each other. In this case, when CG PUSCH type 1 configured to be transmitted in the overlapping symbol is not the initial repeated transmission, the UE may drop the transmission of CG PUSCH type 1 configured to be transmitted in the overlapping symbol, and may not transmit CG PUSCH type 1. Accordingly, the same TB size (TBS) is determined for the repeated transmissions of CG PUSCH type 1, and thus the base station can facilitate soft combining of the repeated transmissions of the CG PUSCH.

Case Where Collision Between RRC-Configured CSI-RS and CG PUSCH Type 2

The UE may perform CG PUSCH type 2 transmission through an uplink subband of the multiple subbands. The UE may receive an indication of CG PUSCH type 2 transmission through DCI format 0_0, 0_1, or 0_2 scrambled by CS-RNTI received through the PDCCH.

(Method 7) When a resource allocated for reception of an RRC-configured CSI-RS and a resource allocated for transmission of CG PUSCH type 1 overlap each other in the time domain, the UE may perform CG PUSCH type 2 transmission. That is, the UE may perform CG PUSCH type 2 transmission without receiving the RRC-configured CSI-RS. Accordingly, uplink transmission is possible also in the downlink slot or symbol, and thus uplink coverage can be extended. In this case, the resource allocated for reception of the RRC-configured CSI-RS and the resource allocated for CG PUSCH type 2 transmission may overlap in all time domains or may overlap in some time domains.

Case of Collision Between RRC-Configured CSI-RS and Dynamic Grant (DG) PUSCH

The UE may be indicated to transmit a DG PUSCH in a semi-statically configured or dynamically indicated downlink slot or symbol. The UE may perform transmission of the DG PUSCH through an uplink subband of the multiple subbands. The UE may receive indication of the transmission of the DG PUSCH through DCI format 0_0, 0_1, or 0_2 scrambled by CS-RNTI received through the PDCCH.

(Method 8) When a resource allocated for CSI-RS reception and a resource allocated for DG PUSCH transmission overlap each other in the time domain, the UE may transmit the DG PUSCH. That is, the UE may perform DG PUSCH transmission without receiving the RRC-configured CSI-RS. Accordingly, uplink transmission is possible also in the downlink slot or symbol, and thus uplink coverage can be extended. In this case, the resource allocated for reception of the RRC-configured CSI-RS and the resource allocated for DG PUSCH transmission may overlap in all time domains or may overlap in some time domains.

Case of Collision Between RRC-Configured CSI-RS and RRC-Configured SRS

The UE may be configured to transmit an SRS through an uplink subband of multiple subbands.

(Method 9-1) When a resource allocated for reception of an RRC-configured CSI-RS and a resource allocated for transmission of an SRS overlap each other in the time domain, the UE may select one of the RRC-configured CSI-RS reception and SRS transmission and perform the same. In this case, the case where the resources overlap each other may be a case where the resource allocated for RRC-configured CSI-RS reception and the resource allocated for SRS transmission fully or partially overlap each other on the time domain.

i) When the resource allocated for the reception of the RRC-configured CSI-RS and the resource allocated for the transmission of the SRS overlap each other, the UE may receive the RRC-configured CSI-RS. The UE is indicated such that multiple subbands are dynamically configured in the time domain interval, but the time domain interval is previously configured as a downlink slot or symbol, and thus the previous configuration may be prioritized. That is, the UE may perform the reception of the RRC-configured CSI-RS without performing the SRS transmission.

ii) When the resource allocated for the reception of the CSI-RS and the resource allocated for the transmission of the SRS overlap each other, the UE may transmit the SRS. When the uplink subband is dynamically indicated for the UE by the base station such that uplink transmission is possible also in the downlink slots or symbols for uplink coverage extension, the UE may transmit the SRS by prioritizing uplink transmission.

(Method 9-2) When the resource allocated for CSI-RS reception and the resource allocated for SRS transmission partially overlap each other in the time domain, the UE may receive the RRC-configured CSI-RS in the overlapping resource and transmit the SRS in the non-overlapping resource. In this case, the UE may receive the RRC-configured CSI-RS and transmit the SRS in consideration of a downlink-to-uplink switching gap (DL-to-UL switching gap) for RF retuning. That is, the UE may receive the RRC-configured CSI-RS in the overlapping symbol and transmit the SRS in symbol remaining after excluding the switching gap symbol from non-overlapping symbols. The SRS transmission may be performed in units of symbols. Accordingly, according to method 9-2, the UE may receive the RRC-configured CSI-RS in the overlapping resource and transmit the SRS in the non-overlapping resource, and thus the uplink signal/channel transmission and the downlink signal/channel reception configured for the UE can be secured to the maximum.

Case of Collision Between RRC-Configured CSI-RS and SRS Triggered/Indicated Via DCI The UE may be indicated via DCI to transmit the SRS through the uplink subband of the multiple subbands. The UE may transmit the SRS in the uplink subband of the slot or symbol indicated by DCI. In this case, the DCI indicating the SRS transmission may be DCI format 0_0, 1_1, 0_1, 0_2 (in a case where an SRS request field exists), or 1_2 (in a case where an SRS request field exist).

(Method 10) When the resource allocated for the reception of the RRC-configured CSI-RS and the resource allocated for the transmission of the SRS triggered/indicated via DCI overlap each other in the time domain, the UE may transmit the triggered/indicated SRS. The UE may transmit the SRS triggered/indicated via DCI without receiving the RRC-configured CSI-RS. The transmission of the uplink channel/signal is possible through the uplink subband also in the downlink slot or symbol, and the uplink coverage extension is possible.

Methods 11 to 15 described below corresponds to a case where a downlink channel/signal is a CSI-RS triggered/indicated via DCI.

The UE may receive an indication of a CSI-RS through DCI format 1_1 or 1_2.

Case of Collision Between CSI-RS Triggered/Indicated Via DCI and CG PUSCH Type 1

(Method 11-1) When a resource allocated for reception of a CSI-RS triggered/indicated via DCI and a resource allocated for transmission of CG PUSCH type 1 overlap each other in the time domain, the UE may receive the CSI-RS triggered/indicated via DCI. That is, the UE may receive the CSI-RS triggered/indicated via DCI, without transmitting CG PUSCH type 1. In this case, the case where the resources overlap each other may be a case where the resource allocated for the reception of the CSI-RS triggered/indicated via DCI and the resource allocated for transmission of CG PUSCH type 1 fully overlap each other on the time domain. That is, the case may be a case where all the symbols allocated for transmission of CG PUSCH type 1 are included in symbols allocated for reception of the CSI-RS triggered/indicated via DCI.

(Method 11-2) When a resource allocated for reception of a CSI-RS triggered/indicated via DCI and a resource allocated for transmission of CG PUSCH type 1 overlap each other in the time domain, the UE may receive the CSI-RS and rate-match CG PUSCH type 1 to transmit the same. In this case, the case where the resources overlap each other may be a case where the resource allocated for the reception of the CSI-RS triggered/indicated via DCI and the resource allocated for the transmission of CG PUSCH type 1 partially overlap each other on the time domain. That is, the case may be a case where symbols allocated for the transmission of CG PUSCH type 1 and symbols allocated for the reception of the CSI-RS triggered/indicated via DCI partially overlap each other. In other words, when the resource allocated for the reception of the CSI-RS and the resource allocated for the transmission of CG PUSCH type 1 partially overlap each other in a time domain interval, the UE may receive the CSI-RS triggered/indicated via DCI, perform rate-matching for a resource overlapping with the resource allocated for the reception of the CSI-RS among the resources allocated for CG PUSCH type 1, and transmit, based the non-overlapping resource, CG PUSCH type 1. In this case, the UE may receive the CSI-RS triggered/indicated via DCI and transmit CG PUSCH type 1 in consideration of a downlink-to-uplink switching gap (DL-to-UL switching gap) symbol for RF retuning. The UE may receive the CSI-RS triggered/indicated via DCI in the overlapping symbol, and may rate-match CG-PUSCH type 1 and transmit the same in a symbol remaining after excluding the switching gap symbol from the non-overlapping symbols. According to method 11-2, when the configuration is made such that the reception of the CSI-RS triggered/indicated via DCI and the transmission of CG PUSCH type 1 are performed through multiple subbands configured in the time domain interval, respectively, the reception of the CSI-RS can be secured in the overlapping symbol in the time domain, and the transmission of CG PUSCH type 1 can be secured to the maximum in a symbol except for the overlapping symbol and the gap symbol in the time domain.

i) When the UE is configured to repeatedly transmit CG PUSCH type 1 and a symbol allocated for reception of the CSI-RS triggered/indicated via DCI and a symbol allocated for the initial repeated transmission (initial transmission occasion) of CG PUSCH type 1 partially overlap, the UE may perform the initial repeated transmission of CG PUSCH type 1 by rate-matching the same. In addition, the UE may perform the same repeated transmission of the next CG PUSCH type 1 as the initial CG PUSCH type 1 repeated transmission by rate-matching the same. Accordingly, the same TB size (TBS) is determined for repeated transmissions of CG PUSCH type 1, and thus the base station can facilitate soft combining of the repeated transmissions of the CG PUSCH.

ii) There may be a case where the UE is configured to repeatedly transmit CG PUSCH type 1 and a symbol allocated for the reception of the CSI-RS triggered/indicated via DCI and a symbol allocated for repeated transmission (initial transmission occasion) of CG PUSCH type 1 partially overlap each other. In this case, when CG PUSCH type 1 configured to be transmitted in the overlapping symbol is not the initial repeated transmission, the UE may drop the transmission of CG PUSCH type 1 configured to be transmitted in the overlapping symbol, and may not transmit CG PUSCH type 1. Accordingly, the same TB size (TBS) is determined for repeated transmissions of CG PUSCH type 1, and thus the base station can facilitate soft combining of the repeated transmissions of the CG PUSCH.

Case of Collision Between CSI-RS Triggered/Indicated Via DCI and CG PUSCH Type 2

The UE may receive an indication of transmission of CG PUSCH type 2 through DCI format 0_0, 0_1, or 0_2 scrambled by the CS-RNTI received through the PDCCH.

(Method 12) The UE may not expect a situation in which a resource allocated for reception of a CSI-RS triggered/indicated via DCI and a resource allocated for transmission of CG PUSCH type 2 overlap each other in the time domain. That is, when multiple subbands are configured in the time domain interval, the UE may be indicated via DCI format 1_1 or 1_2 to receive the CSI-RS in a first resource of a downlink subband of the multiple subbands, and may be indicated via DCI format 0_0, 0_1, or 0_2 scrambled by CS-RNTI to transmit CG PUSCH type 2 in a second resource of an uplink subband of the multiple subbands. In this case, when the first resource and the second resource overlap each other in the time domain, the UE may not expect to be indicated to receive the CSI-RS triggered/indicated via DCI or transmit CG PUSCH type 2. In other words, when the first resource for the reception of the CSI-RS in the downlink subband and the second resource for the transmission of CG PUSCH type 2 in the uplink subband overlap each other in the time domain, the base station may not indicate the UE to receive the CSI-RS triggered/indicated via DCI or transmit CG PUSCH type 2.

Case of Collision Between CSI-RS Triggered/Indicated Via DCI and DG PUSCH

The UE may receive an indication of the transmission of a DG PUSCH via DCI format 0_0, 0_1, or 0_2 scrambled by CS-RNTI received through the PDCCH.

(Method 13) The UE may not expect a situation in which a resource allocated for reception of a CSI-RS triggered/indicated via DCI and a resource allocated for transmission of a DG PUSCH overlap each other in the time domain. That is, when multiple subbands are configured in the same time domain interval, the UE may be indicated via DCI format 1_1 or 1_2 to receive a CSI-RS in a first resource of a downlink subband of the multiple subbands, and may be indicated via DCI format 0_0, 0_1, or 0_2 to receive a DG PUSCH in a second resource of an uplink subbands of the multiple subbands. In this case, when the first resource and the second resource overlap each other in the time domain, the UE may not expect to be indicated to receive the CSI-RS triggered/indicated via DCI or transmit the DG PUSCH. In other words, when the first resource for the reception of the CSI-RS in the downlink subband and the second resource for the transmission of the DG PUSCH in the uplink subband overlap each other in the time domain, the base station may not indicate the UE to receive an SPS PDSCH triggered/indicated via DCI or transmit the DG PUSCH.

Case of Collision Between CSI-RS Triggered/Indicated Via DCI and RRC-Configured SRS (Method 14) When a resource allocated for reception of a CSI-RS triggered/indicated via DCI and a resource allocated for transmission of an RRC-configured SRS overlap each other in the time domain, the UE may receive the CSI-RS triggered/indicated via DCI. That is, the UE may not perform the transmission of the RRC-configured SRS and perform the reception of the CSI-RS triggered/indicated via DCI. Even though the UE receives a configuration of the uplink subband in the downlink slot or symbol, the base station may trigger/indicate the reception of the CSI-RS to receive the CSI-RS first.

Case of Collision Between CSI-RS Triggered/Indicated Via DCI and SRS Triggered/Indicated Via DCI The DCI indicating the transmission of the SRS may be DCI format 0_0, 1_1, 0_1, 0_2 (in a case where an SRS request field exists), or 1_2 (in a case where an SRS request field exists).

(Method 15) The UE may not expect a situation in which a resource allocated for reception of a CSI-RS triggered/indicated via DCI and a resource allocated for an SRS triggered/indicated via DCI overlap each in the time domain. In other words, the base station may not indicate, to the UE, overlapping between the first resource for reception of the CSI-RS in the downlink subband and the second resource for transmission of the SRS triggered/indicated via DCI in the uplink subband in the time domain.

Methods 16 to 20 described below correspond to a case where a downlink channel/signal is an SPS PDSCH. The UE may receive an indication of reception of an SPS PDSCH via DCI format 1_0, 1_1, or 1_2 scrambled by CS-RNTI.

Case of Collision Between SPS PDSCH and CG PUSCH Type 1

(Method 16-1) When a resource allocated for reception of an SPS PDSCH and a resource allocated for transmission of CG PUSCH type 1 overlap each other in the time domain, the UE may receive the SPS PDSCH. That is, the UE may not perform the transmission of CG PUSCH type 1, and may perform the reception of the SPS PDSCH. In this case, the case where the resources overlap each other may be a case where a resource allocated for the reception of the SPS PDSCH and a resource allocated for the transmission of CG PUSCH type 1 fully overlap each other on the time domain. That is, the case may be a case where all the symbols allocated for the transmission of CG PUSCH type 1 are included in symbols allocated for the reception of the SPS PDSCH.

(Method 16-2) When a resource allocated for reception of an SPS PDSCH and a resource allocated for transmission of CG PUSCH type 1 overlap each other in the time domain, the UE may receive the SPS PDSCH and rate-match CG PUSCH type 1 to transmit the same. In this case, the case where the resources overlap each other may be a case where the resource allocated for the reception of the SPS PDSCH and the resource allocated for the transmission of CG PUSCH type 1 partially overlap each other on the time domain. In other words, when the resource allocated for the reception of the SPS PDSCH and the resource allocated for the transmission of CG PUSCH type 1 partially overlap in a time domain interval, the UE may receive the SPS PDSCH, perform rate-matching for a resource overlapping with the resource allocated for the reception of the SPS PDSCH among resources allocated for CG PUSCH type 1, and transmit, based on the non-overlapping resource, CG PUSCH type 1. In this case, the UE may receive the SPS PDSCH and transmit CG PUSCH type 1 in consideration of a downlink-to-uplink switching gap (DL-to-UL switching gap) symbol for RF retuning. The UE may receive the SPS PDSCH in the overlapping symbol, and may rate-match CG-PUSCH type 1 and transmit the same in a symbol remaining after excluding the switching gap symbol from the non-overlapping symbols. According to method 16-2, when the configuration is made such that the reception of the SPS PDSCH and the transmission of CG PUSCH type 1 are performed through multiple subbands configured in the time domain interval, respectively, the reception of the SPS PDSCH can be secured in the overlapping symbol in the time domain, and the transmission of CG PUSCH type 1 can be secured to the maximum in a symbol except for the overlapping symbol and the gap symbol in the time domain.

i) When the UE is configured to repeatedly transmit CG PUSCH type 1 and a symbol allocated for transmission of the SPS PDSCH and a symbol allocated for the initial repeated transmission (initial transmission occasion) of CG PUSCH type 1 partially overlap, the UE may perform the initial repeated transmission of CG PUSCH type 1 by rate-matching the same. In addition, the UE may perform the same repeated transmission of the next CG PUSCH type 1 as the initial CG PUSCH type 1 repeated transmission by rate-matching the same. Accordingly, the same TB size (TBS) is determined for repeated transmissions of CG PUSCH type 1, and thus the base station can facilitate soft combining of the repeated transmissions of the CG PUSCH.

ii) There may be a case where the UE is configured to repeatedly transmit CG PUSCH type 1 and a symbol allocated for the transmission of the SPS PDSCH and a symbol allocated for repeated transmission (initial transmission occasion) of CG PUSCH type 1 partially overlap each other. In this case, when CG PUSCH type 1 configured to be transmitted in the overlapping symbol is not the initial repeated transmission, the UE may drop the transmission of CG PUSCH type 1 configured to be transmitted in the overlapping symbol, and may not transmit CG PUSCH type 1. Accordingly, the same TB size (TBS) is determined for repeated transmissions of CG PUSCH type 1, and thus the base station can facilitate soft combining of the repeated transmissions of the CG PUSCH.

Case of Collision Between SPS PDSCH and CG PUSCH Type 2

The UE may receive an indication of transmission of CG PUSCH type 2 via DCI format 0_0, 0_1, or 0_2 scrambled by CS-RNTI received through a PDCCH.

(Method 17) The UE may not expect a situation in which a resource allocated for reception of an SPS PDSCH and a resource allocated for transmission of CG PUSCH type 2 overlap each other in the time domain. That is, when multiple subbands are configured in the same time domain interval, the UE may be indicated, via DCI format 1_0, 1_1, or 1_2 scrambled by CS-RNTI, to receive an SPS PDSCH in a first resource of a downlink subband of the multiple subbands, and may be indicated, via DCI format 0_0, 0_1, or 0_2 scrambled by CS-RNTI, to transmit CG PUSCH type 2 in a second resource of an uplink subband of the multiple subbands. In this case, when the first resource and the second resource overlap each other in the time domain, the UE may not expect to receive an indication to receive the SPS PDSCH or transmit CG PUSCH type 2. In other words, when the first resource for receiving the SPS PDSCH in the downlink subband and the second resource for transmitting CG PUSCH type 2 in the uplink subband overlap each other in the time domain, the UE may not indicate the UE to receive the SPS PDSCH or transmit CG PUSCH type 2.

Case of Collision Between SPS PDSCH and DG PUSCH

The UE may receive an indication of transmission of an SPS PDSCH via DCI format 0_0, 0_1, or 0_2 scrambled by CS-RNTI received through a PDCCH.

(Method 18) The UE may not expect a situation in which a resource allocated for reception of an SPS PDSCH and a resource allocated for transmission of a DG PUSCH overlap each other in the time domain. That is, when multiple subbands are configured in the time domain interval, the UE may be indicated, via DCI format 1_0, 1_1, or 1_2 scrambled by CS-RNTI, to receive an SPS PDSCH in a first resource of a downlink subband of the multiple subbands, and may be indicated, via DCI format 0_0, 0_1, or 0_2, to transmit a DG PUSCH in a second resource of an uplink subband of the multiple subbands. In this case, when the first resource and the second resource overlap each other in the time domain, the UE may not expect to be indicated to receive the SPS PDSCH or transmit the DG PUSCH. In other words, when the first resource for receiving the SPS PDSCH in the downlink subband and the second resource for transmitting the DG PUSCH in the uplink subband overlap each other in the time domain, the base station may not indicate the UE to receive the SPS PDSCH or transmit the DG PUSCH.

Case of Collision Between SPS PDSCH and RRC-Configured SRS (Method 19) When a resource allocated for reception of an SPS PDSCH and a resource allocated for transmission of an RRC-configured SRS overlap each other in the time domain, the UE may receive the SPS PDSCH. That is, the UE may not perform the transmission of the RRC-configured SRS and may perform the reception of the SPS PDSCH. In this case, even though the UE is configured with an uplink subband in a downlink slot or symbol, the base station may trigger/indicate the reception of the SPS PDSCH to receive the SPS PDSCH first.

Case of collision between SPS PDSCH and SRS triggered/indicated via DCI

The DCI indicating the transmission of the SRS may be DCI format 0_0, 1_1, 0_1, 0_2 (in a case where an SRS request field exists), or 1_2 (in a case where an SRS request field exists).

(Method 20) The UE may not expect a situation in which a resource allocated for reception of an SPS PDSCH and a resource allocated for an SRS triggered/indicated via DCI in the time domain. In other words, when a first resource for reception of an SPS PDSCH in a downlink subband and a second resource for transmission of an SRS triggered/indicated via DCI in an uplink subband overlap each other in the time domain, the base station may not indicate the UE to receive the SPS PDSCH or transmit the SRS.

Methods 21 to 25 described below correspond to a case where a downlink channel/signal is a DG PDSCH. The UE may receive an indication of reception of a DG PUSCH via DCI format 1_0, 1_1, or 1_2 received through a PDCCH.

Case of Collision Between DG PDSCH and CG PUSCH Type 1

(Method 21-1) When a resource allocated for reception of a DG PDSCH and a resource allocated for transmission of CG PUSCH type 1 overlap each other in the time domain, the UE may receive the DG PDSCH. That is, the UE may not transmit CG PUSCH type 1 and receive the DG PDSCH. In this case, the case where the resources overlap each other may be a case where the resource allocated for the reception of the DG PDSCH and the resource allocated for the transmission of CG PUSCH type 1 fully overlap each other on the time domain. That is, all the symbols allocated for the transmission of CG PUSCH type 1 are included in symbols allocated for the reception of the DG PDSCH.

(Method 21-2) When a resource allocated for reception of a DG PDSCH and a resource allocated for transmission of CG PUSCH type 1 overlap each other in the time domain, the UE may receive the DG PDSCH and rate-match CG PUSCH type 1 to transmit the same. In this case, the case where the resources overlap each other may be a case where the resource allocated for the reception of the DG PDSCH and the resource allocated for the transmission of CG PUSCH type 1 partially overlap each other on the time domain. That is, the case may be a case where symbols allocated for the transmission of CG PUSCH type 1 and the symbols allocated for reception of the DG PDSCH partially overlap each other. In other words, when the resource allocated for the reception of the DG PDSCH and the resource allocated for the transmission of CG PUSCH type 1 partially overlap in a time domain interval, the UE may receive the DG PDSCH, perform rate-matching for a resource overlapping with the resource allocated for the reception of the DG PDSCH among resources allocated for CG PUSCH type 1, and transmit, based on the non-overlapping resource, CG PUSCH type 1. In this case, the UE may receive the DG PDSCH and transmit CG PUSCH type 1 in consideration of a downlink-to-uplink switching gap (DL-to-UL switching gap) symbol for RF retuning. The UE may receive the DG PDSCH in the overlapping symbol, and may rate-match CG-PUSCH type 1 and transmit the same in a symbol remaining after excluding the switching gap symbol from the non-overlapping symbols. According to method 21-2, when the configuration is made such that the reception of the DG PDSCH and the transmission of CG PUSCH type 1 are performed through multiple subbands configured in the time domain interval, respectively, the reception of the DG PDSCH can be secured in the overlapping symbol in the time domain, and the transmission of CG PUSCH type 1 can be secured to the maximum in a symbol except for the overlapping symbol and the gap symbol in the time domain.

i) When the UE is configured to repeatedly transmit CG PUSCH type 1 and a symbol allocated for transmission of the DG PDSCH and a symbol allocated for the initial repeated transmission (initial transmission occasion) of CG PUSCH type 1 partially overlap, the UE may perform the initial repeated transmission of CG PUSCH type 1 by rate-matching the same. In addition, the UE may perform the same repeated transmission of the next CG PUSCH type 1 as the initial CG PUSCH type 1 repeated transmission by rate-matching the same. Accordingly, the same TB size (TBS) is determined for repeated transmissions of CG PUSCH type 1, and thus the base station can facilitate soft combining of the repeated transmissions of the CG PUSCH.

ii) There may be a case where the UE is configured to repeatedly transmit CG PUSCH type 1 and a symbol allocated for the transmission of the DG PDSCH and a symbol allocated for repeated transmission (initial transmission occasion) of CG PUSCH type 1 partially overlap each other. In this case, when CG PUSCH type 1 configured to be transmitted in the overlapping symbol is not the initial repeated transmission, the UE may drop the transmission of CG PUSCH type 1 configured to be transmitted in the overlapping symbol, and may not transmit CG PUSCH type 1. Accordingly, the same TB size (TBS) is determined for repeated transmissions of CG PUSCH type 1, and thus the base station can facilitate soft combining of the repeated transmissions of the CG PUSCH.

Case of Collision Between DG PDSCH and CG PUSCH Type 2

The UE may receive an indication of transmission of CG PUSCH type 2 via DCI format 0_0, 0_1, or 0_2 scrambled by CS-RNTI received through a PDCCH.

(Method 22) The UE may not expect a situation in which a resource allocated for reception of a DG PDSCH and a resource allocated for transmission of CG PUSCH type 2 overlap each other in the time domain. That is, when multiple subbands are configured in the time domain interval, the UE may be indicated via DCI format 1_0, 1_1, or 1_2 to receive a DG PDSCH in a first resource of a downlink subband of the multiple subbands, and may be indicated, via DCI format 0_0, 0_1, or 0_2 scrambled by CS-RNTI, to transmit CG PUSCH type 2 in a second resource of an uplink subband of the multiple subbands. In this case, when the first resource and the second resource overlap each other in the time domain, the UE may not expect to be indicated to receive the DG PDSCH or transmit CG PUSCH type 2. In other words, when the first resource for receiving the DG PDSCH in the downlink subband and the second resource for transmitting CG PUSCH type 2 in the uplink subband overlap each other in the time domain, the base station may not configure the UE to receive the DG PDSCH or transmit CG PUSCH type 2.

Case of Collision Between DG PDSCH and DG PUSCH

The UE may receive an indication of transmission of a DG PUSCH via DCI format 0_0, 0_1, or 0_2 scrambled by CS-RNTI received through a PDCCH.

(Method 23) The UE may not expect a situation in which a resource allocated for reception of a DG PDSCH and a resource allocated for transmission of a DG PUSCH overlap each other in the time domain. That is, when multiple subbands are configured in the time domain interval, the UE may be indicated via DCI format 1_0, 1_1, or 1_2 to receive a DG PDSCH in a first resource of a downlink subband of the multiple subbands, and may be indicated to transmit a DG PUSCH in a second resource of an uplink subband of the multiple subbands. In this case, when the first resource and the second resource overlap each other in the time domain, the UE may not expect to be indicated to receive the DG PDSCH or transmit the DG PUSCH. In other words, when the first resource for receiving the DG PDSCH in the downlink subband and the second resource for transmitting CG PUSCH type 2 in the uplink subband overlap each other in the time domain, the base station may not indicate the UE to receive the DG PDSCH or transmit the DG PUSCH.

Case of Collision Between DG PDSCH and RRC-Configured SRS (Method 24) When a resource allocated for reception of a DG PDSCH and a resource allocated for transmission of an SRS overlap each other in the time domain, the UE may receive the DG PDSCH. That is, the UE may not perform the transmission of the SRS and perform the reception of the DG PDSCH. Accordingly, even though the UE receives a configuration of an uplink subband in a downlink slot or symbol, the base station may prioritize the reception of the DG PDSCH by triggering/indicating the reception of the DG PDSCH via DCI.

Case of Collision Between DG PDSCH and SRS Triggered/Indicated Via DCI

The DCI indicating the transmission of the SRS may be DCI format 0_0, 1_1, 0_1, 0_2 (in a case where an SRS request field exists), or 1_2 (in a case where an SRS request field exists).

(Method 25) The UE may not expect a situation in which a resource allocated for reception of a DG PDSCH and a resource allocated for an SRS triggered/indicated via DCI. In other words, when a first resource for reception of a DG PDSCH in a downlink subband and a second resource for transmission of an SRS triggered/indicated via DCI in an uplink subband overlap each other in the time domain, the base station may not indicate the UE to receive the DG PDSCH or transmit the SRS.

Methods 26 to 30 described below correspond to a case where a downlink channel/signal is a PDCCH (i.e., a CORESET for reception of a PDCCH). The UE may receive a configuration of a CORESET for reception of a PDCCH from the base station, and the UE may monitor the PDCCH on the CORESET and receive the PDCCH.

Case of Collision Between CORESET and CG PUSCH Type 1

(Method 26-1) When a resource allocated for a CORESET and a resource allocated for transmission of CG PUSCH type 1 overlap each other in the time domain, the UE may monitor a PDCCH on a CORESET. That is, the UE may not perform the transmission of CG PUSCH type 1, and may perform monitoring of the PDCCH on the CORESET. In this case, the case where the resources overlap each other may be a case where the resource allocated for the CORESET and the resource allocated for the transmission of CG PUSCH type 1 fully overlap each other on the time domain. That is, the case may be a case where symbols allocated for transmission of CG PUSCH type 1 are included in symbols allocated for the CORESET.

(Method 26-2) When a resource allocated for a CORESET and a resource allocated for transmission of CG PUSCH type 1 overlap each other in the time domain, the UE may monitor the PDCCH on the CORESET and rate-match CG PUSCH type 1 to transmit the same. In this case, the case where the resources overlap each other may be a case where the resource allocated for the CORESET and the resource allocated for the transmission of CG PUSCH type 1 partially overlap each other on the time domain. In other words, when the resource allocated for the CORESET and the resource allocated for the transmission of CG PUSCH type 1 partially overlap in a time domain interval, the UE may perform monitoring for reception of the PDCCH on the CORESET, perform rate-matching for a resource overlapping with the resource allocated for the CORESET among resources allocated for CG PUSCH type 1, and transmit, based on the non-overlapping resource, CG PUSCH type 1. In this case, the UE may monitor the PDCCH on the CORESET and transmit CG PUSCH type 1 in consideration of a downlink-to-uplink switching gap (DL-to-UL switching gap) symbol for RF retuning. The UE may monitor the PDCCH in the overlapping symbol, and may rate-match CG-PUSCH type 1 and transmit the same in a symbol remaining after excluding the switching gap symbol from the non-overlapping symbols. According to method 26-2, when the configuration is made such that the PDCCH monitoring and the transmission of CG PUSCH type 1 are performed through multiple subbands configured in the time domain interval, respectively, the PDCCH monitoring can be secured in the overlapping symbol in the time domain, and the transmission of CG PUSCH type 1 can be secured to the maximum in a symbol except for the overlapping symbol and the gap symbol in the time domain.

i) When the UE is configured to repeatedly transmit CG PUSCH type 1 and a symbol allocated for the CORESET and a symbol allocated for the initial repeated transmission (initial transmission occasion) of CG PUSCH type 1 partially overlap, the UE may perform the initial repeated transmission of CG PUSCH type 1 by rate-matching the same. In addition, the UE may perform the same repeated transmission of the next CG PUSCH type 1 as the initial CG PUSCH type 1 repeated transmission by rate-matching the same. Accordingly, the same TB size (TBS) is determined for repeated transmissions of CG PUSCH type 1, and thus the base station can facilitate soft combining of the repeated transmissions of the CG PUSCH.

ii) There may be a case where the UE is configured to repeatedly transmit CG PUSCH type 1 and a symbol allocated for the CORESET and a symbol allocated for repeated transmission (initial transmission occasion) of CG PUSCH type 1 partially overlap each other. In this case, when CG PUSCH type 1 configured to be transmitted in the overlapping symbol is not the initial repeated transmission, the UE may drop the transmission of CG PUSCH type 1 configured to be transmitted in the overlapping symbol, and may not transmit CG PUSCH type 1. Accordingly, the same TB size (TBS) is determined for repeated transmissions of CG PUSCH type 1, and thus the base station can facilitate soft combining of the repeated transmissions of the CG PUSCH.

Case of Collision Between CORESET and CG PUSCH Type 2

The UE may receive an indication of transmission of CG PUSCH type 2 via DCI format 0_0, 0_1, or 0_2 scrambled by CS-RNTI received through a PDCCH.

(Method 27-1) The UE may not expect a situation in which a resource allocated for a CORESET and a resource allocated for transmission of CG PUSCH type 2 overlap each other in the time domain. That is, a CORESET for PDCCH monitoring is configured in a downlink subband of multiple subbands in the same time domain interval and the UE may not expect to receive an indication of transmission of CG PUSCH type 2 in an uplink subband of the multiple subbands in the same time domain interval via DCI format 0_0, 0_1, or 0_2 scrambled by CS-RNTI. In other words, the base station may perform PDCCH monitoring in the CORE- SET of the downlink subband, and may not configure the UE in the same time domain interval to transmit CG PUSCH type 2 in the downlink subband. In this case, the case where the resources overlap each other may be a case where the resource allocated for the CORESET and the resource allocated for the transmission of CG PUSCH type 2 fully overlap each other on the time domain. That is, the case may be a case where all the symbols allocated for the transmission of CG PUSCH type 2 are included in symbols allocated for the CORESET.

(Method 27-2) When the resource allocated for the CORESET and the resource allocated for the transmission of CG PUSCH type 2 overlap each other in the time domain, the UE may perform PDCCH monitoring on the CORESET and may not transmit CG PUSCH type 2. This is to prioritize to receive, over CG PUSCH type 2, downlink control information including information (DCI) related to allocation of a resource received on the CORESET.

(Method 27-3) When a resource allocated for a CORESET and a resource allocated for transmission of CG PUSCH type 2 overlap each other in the time domain, the UE may monitor the PDCCH on the CORESET and rate-match CG PUSCH type 2 to transmit the same. In this case, the case where the resources overlap each other may be a case where the resource allocated for the CORESET and the resource allocated for the transmission of CG PUSCH type 2 partially overlap each other on the time domain. That is, the case may be a case where the symbols allocated for the CORESET and the symbols allocated for the reception of CG PUSCH type 2 partially overlap each other. In other words, when the resource allocated for the CORESET and the resource allocated for the transmission of CG PUSCH type 2 partially overlap in a time domain interval, the UE may perform monitoring for reception of the PDCCH on the CORESET, perform rate-matching for a resource overlapping with the resource allocated for the CORESET among resources allocated for CG PUSCH type 2, and transmit, based on the non-overlapping resource, CG PUSCH type 2. In this case, the UE may monitor the PDCCH on the CORESET and transmit CG PUSCH type 2 in consideration of a downlink-to-uplink switching gap (DL-to-UL switching gap) symbol for RF retuning. The UE may monitor the PDCCH in the overlapping symbol, and may rate-match CG-PUSCH type 2 and transmit the same in a symbol remaining after excluding the switching gap symbol from the non-overlapping symbols. According to method 27-3, when the configuration is made such that the CORESET and the transmission of CG PUSCH type 2 are performed through multiple subbands configured in the time domain interval, respectively, the PDCCH monitoring can be secured in the overlapping symbol in the time domain, and the transmission of CG PUSCH type 2 can be secured to the maximum in a symbol except for the overlapping symbol and the gap symbol in the time domain.

i) When the UE is configured to repeatedly transmit CG PUSCH type 2 and a symbol allocated for the CORESET and a symbol allocated for the initial repeated transmission (initial transmission occasion) of CG PUSCH type 2 partially overlap, the UE may perform the initial repeated transmission of CG PUSCH type 2 by rate-matching the same. In addition, the UE may perform the same repeated transmission of the next CG PUSCH type 2 as the initial CG PUSCH type 2 repeated transmission by rate-matching the same. Accordingly, the same TB size (TBS) is determined for repeated transmissions of CG PUSCH type 2, and thus the base station can facilitate soft combining of the repeated transmissions of the CG PUSCH.

ii) There may be a case where the UE is configured to repeatedly transmit CG PUSCH type 2 and a symbol allocated for the CORESET and a symbol allocated for repeated transmission (initial transmission occasion) of CG PUSCH type 2 partially overlap each other. In this case, when CG PUSCH type 2 configured to be transmitted in the overlapping symbol is not the initial repeated transmission, the UE may drop the transmission of CG PUSCH type 2 configured to be transmitted in the overlapping symbol, and may not transmit CG PUSCH type 2. Accordingly, the same TB size (TBS) is determined for repeated transmissions of CG PUSCH type 2, and thus the base station can facilitate soft combining of the repeated transmissions of the CG PUSCH.

Case of Collision Between CORESET and DG PUSCH

The UE may receive an indication of transmission of a DG PUSCH via DCI format 0_0, 0_1, or 0_2 scrambled by CS-RNTI received through a PDCCH.

(Method 28-1) The UE may not expect a situation in which a resource allocated for a CORESET and a resource allocated for transmission of a DG PUSCH overlap each other in the time domain. That is, when multiple subbands are configured in the same time domain interval, the UE may receive allocation of a CORESET for monitoring a PDCCH in a first resource of a downlink subband of the multiple subbands and may be indicated via DCI format 0_0, 0_1, or 0_2 a DG PUSCH in a second resource of an uplink subband of the multiple subbands. In this case, when the first resource and the second resource overlap each other in the time domain, the UE may be configured to perform PDCCH monitoring, or may not expect to receive an indication to transmit the DG PUSCH. In other words, when a first resource allocated for the CORESET for the PDCCH monitoring in the downlink subband and the second resource for transmission of the DG PUSCH in the uplink subband overlap each other in the time domain, the base station may configure the UE to perform PDCCH monitoring, or may not indicate the UE to transmit the DG PUSCH.

(Method 28-2) When a resource allocated for a CORESET and a resource allocated for transmission of a DG PUSCH overlap each other in the time domain, the UE may monitor the PDCCH on the CORESET and may not transmit the DG PUSCH. This is to prioritize to receive, over the DG PUSCH, downlink control information (DCI) including information related to allocation of a resource received on the CORESET.

Case of Collision Between CORESET and RRC-Configured SRS (Method 29) When a resource allocated for a CORESET and a resource allocated for transmission of an SRS overlap each other in the time domain, the UE may monitor a PDCCH on the CORESET. That is, the UE may not perform the transmission of the RRC-configured SRS, and the UE may monitor the PDCCH on the CORESET. This is to prioritize to receive, over the SRS, downlink control information (DCI) including information related to allocation of a resource received on the CORESET.

Case of Collision Between CORESET and SRS Triggered/Indicated Via DCI

The DCI indicating the transmission of the SRS may be DCI format 0_0, 1_1, 0_1, 0_2 (in a case where an SRS request field exists), or 1_2 (in a case where an SRS request field exists).

(Method 30-1) The UE may not expect a situation in which a resource allocated for a CORESET and a resource allocated for an SRS triggered/indicated via DCI overlap each other in the time domain. In other words, when a first resource allocated to a CORESET for PDCCH monitoring in a downlink subband and a second resource for transmission of an SRS triggered/indicated via DCI in an uplink subband overlap each other in the time domain, the base station may configure the UE to monitor the PDCCH, or may not indicate the UE to transmit the SRS.

(Method 30-2) When a resource allocated for a CORESET and a resource allocated for transmission of an SRS triggered/indicated via DCI overlap each other in the time domain, the UE may monitor a PDCCH on the CORESET. That is, the UE may not perform the transmission of the SRS triggered/indicated via DCI, and the UE may monitor the PDCCH on the CORESET. This is to prioritize to receive, over the SRS, downlink control information (DCI) including information related to allocation of a resource received on the CORESET.

Methods 31 to 35 described below correspond to a case where a downlink channel/signal is an SS/PBCH block. An SS/PBCH block may be an SS/PBCH block that is cell-commonly configured for the UE. That is, the SS/PBCH block may be cell-commonly configured for the UE in order to acquire initial cell information and cell initial access of the UE. Alternatively, the SS/PBCH block may be UE-specifically configured from a transmission and reception point (TRP) of a neighbor cell other than a serving cell. That is, the SS/PBCH block may be have a physical cell ID (PCI) different from a serving cell PCI and may be UE-specifically configured.

Case of Collision Between SS/PBCH Block and CG PUSCH Type 1

(Method 31-1) When a resource allocated for reception of an SS/PBCH block and a resource allocated for transmission of CG PUSCH type 1 overlap each other in the time domain, the UE may receive the SS/PBCH block. That is, the UE may not perform the transmission of CG PUSCH type 1, and may perform the reception of the SS/PBCH block. In this case, the case where the resources overlap each other may be a case where a resource allocated for the reception of the SS/PBCH block and a resource allocated for the transmission of CG PUSCH type 1 fully overlap each other. That is, the case may be a case where all the symbols allocated for the transmission of CG PUSCH type 1 are included in symbols allocated for the reception of the SS/PBCH block. The UE may receive the SS/PBCH block first in order to acquire the cell initial access and initial cell information first.

(Method 31-2) When a resource allocated for reception of an SS/PBCH block and a resource allocated for transmission of CG PUSCH type 1 overlap each other in the time domain, the UE may receive the SS/PBCH block and rate-match CG PUSCH type 1 to transmit the same. In this case, the case where the resources overlap each other may be a case where the resource allocated for the reception of the SS/PBCH block and the resource allocated for the transmission of CG PUSCH type 1 partially overlap each other on the time domain. In other words, when the resource allocated for the reception of the SS/PBCH block and the resource allocated for the transmission of CG PUSCH type 1 partially overlap in a time domain interval, the UE may receive the SS/PBCH block, perform rate-matching for a resource overlapping with the resource allocated for the reception of the SS/PBCH block among resources allocated for CG PUSCH type 1, and transmit, based on the non-overlapping resource, CG PUSCH type 1. In this case, the UE may receive the SS/PBCH block and transmit CG PUSCH type 1 in consideration of a downlink-to-uplink switching gap (DL-to-UL switching gap) symbol for RF retuning. The UE may receive the SS/PBCH block in the overlapping symbol, and may rate-match CG-PUSCH type 1 and transmit the same in a symbol remaining after excluding the switching gap symbol from the non-overlapping symbols. According to method 26-2, when the configuration is made such that the reception of the SS/PBCH block and the transmission of CG PUSCH type 1 are performed through multiple subbands configured in the time domain interval, respectively, the reception of the SS/PBCH block can be secured in the overlapping symbol in the time domain, and the transmission of CG PUSCH type 1 can be secured to the maximum in a symbol except for the overlapping symbol and the gap symbol in the time domain.

i) When the UE is configured to repeatedly transmit CG PUSCH type 1 and a symbol allocated for the reception of the SS/PBCH block and a symbol allocated for the initial repeated transmission (initial transmission occasion) of CG PUSCH type 1 partially overlap, the UE may perform the initial repeated transmission of CG PUSCH type 1 by rate-matching the same. In addition, the UE may perform the same repeated transmission of the next CG PUSCH type 1 as the initial CG PUSCH type 1 repeated transmission by rate-matching the same. Accordingly, the same TB size (TBS) is determined for repeated transmissions of CG PUSCH type 1, and thus the base station can facilitate soft combining of the repeated transmissions of the CG PUSCH.

ii) There may be a case where the UE is configured to repeatedly transmit CG PUSCH type 1 and a symbol allocated for the reception of the SS/PBCH block and a symbol allocated for repeated transmission (initial transmission occasion) of CG PUSCH type 1 partially overlap each other. In this case, when CG PUSCH type 1 configured to be transmitted in the overlapping symbol is not the initial repeated transmission, the UE may drop the transmission of CG PUSCH type 1 configured to be transmitted in the overlapping symbol, and may not transmit CG PUSCH type 1. Accordingly, the same TB size (TBS) is determined for repeated transmissions of CG PUSCH type 1, and thus the base station can facilitate soft combining of the repeated transmissions of the CG PUSCH.

Case of Collision Between SS/PBCH Block and CG PUSCH Type 2

The UE may receive an indication of transmission of CG PUSCH type 2 via DCI format 0_0, 0_1, or 0_2 scrambled by CS-RNTI received through a PDCCH.

(Method 32-1) The UE may not expect a situation in which a resource allocated for reception of an SS/PBCH block and a resource allocated for transmission of CG PUSCH type 2 overlap each other in the time domain. That is, the UE may be configured to receive the SS/PBCH block in a downlink subband of multiple subbands in the same time domain interval, and may not expect to receive an indication of transmission of CG PUSCH type 2 in an uplink subband of the multiple subbands in the same time domain interval via DCI format 0_0, 0_1, or 0_2 scrambled by CS-RNTI. In other words, the base station may not configure the UE to receive the SS/PBCH block in the downlink subband of the multiple subbands in the same time domain interval and transmit CG PUSCH type 2 in the downlink subband. In this case, the case where the resources overlap each other may be a case where the resource allocated for the reception of the SS/PBCH block and the resource allocated for the transmission of CG PUSCH type 2 may fully overlap each other on the time domain. That is, the case may be a case where all the symbols allocated for the transmission of CG PUSCH type 2 are included in symbols allocated for the reception of the SS/PBCH block.

(Method 32-2) When a resource allocated for reception of an SS/PBCH block and a resource allocated for transmission of CG PUSCH type 2 overlap each other in the time domain, the UE may receive the SS/PBCH block. That is, the UE may not transmit CG PUSCH type 2 and may receive the SS/PBCH block. The UE may receive the SS/PBCH block first in order to acquire the cell initial access and initial cell information first.

Case of Collision Between SS/PBCH Block and DG PUSCH

The UE may receive an indication of transmission of a DG PUSCH via DCI format 0_0, 0_1, or 0_2 scrambled by CS-RNTI received through a PDCCH.

(Method 33-1) The UE may not expect a situation in which a resource allocated for reception of an SS/PBCH block and a resource allocated for transmission of a DG PUSCH overlap each other in the time domain. That is, when multiple subbands are configured in the same time domain interval, the UE may be indicated to receive an SS/PBCH block in a first resource of a downlink subband of the multiple subbands and may be indicated via DCI format 0_0, 0_1, or 0_2, to transmit a DG PUSCH in a second resource of an uplink subband of the multiple subbands. In this case, when the first resource and the second resource overlap each other in the time domain, the UE may be configured to receive the SS/PBCH block or may not expect to be indicated to transmit the DG PUSCH. In other words, when the first resource for reception of the SS/PBCH block in the downlink subband and the second resource for transmission of the DG PUSCH in the uplink subband overlap each other in the time domain, the base station may configure the UE to receive the SS/PBCH block and may not indicate the UE to transmit the DG PUSCH.

(Method 33-2) When the resource allocated for the reception of the SS/PBCH block and the resource allocated for the transmission of the DG PUSCH overlap each other in the time domain, the UE may receive the SS/PBCH block and may not transmit the DG PUSCH. The UE may receive the SS/PBCH block first in order to acquire the cell initial access and initial cell information first.

Case of Collision Between SS/PBCH Block and RRC-Configured SRS (Method 34) When a resource allocated for an SS/PBCH block and a resource allocated for transmission of an RRC-configured SRS overlap each other in the time domain, the UE may receive the SS/PBCH block. That is, the UE may not perform the transmission of the RRC-configured SRS, and the UE may receive the SS/PBCH block. The UE may receive the SS/PBCH block first in order to acquire the cell initial access and initial cell information first.

Case of Collision Between SS/PBCH Block and SRS Triggered/Indicated Via DCI

The DCI indicating the transmission of the SRS may be DCI format 0_0, 1_1, 0_1, 0_2 (in a case where an SRS request field exists), or 1_2 (in a case where an SRS request field exists).

(Method 35-1) The UE may not expect a situation in which a resource allocated for reception of an SS/PBCH and a resource allocated for an SRS triggered/indicated via DCI overlap each other in the time domain. In other words, when a first resource for reception of an SS/PBCH block in a downlink subband and a second resource for transmission of an SRS triggered/indicated via DCI in an uplink subband overlap each other in the time domain, the base station may configure the UE to receive the SS/PBCH bock, or may not indicate the UE to transmit the SRS.

(Method 35-2) When a resource allocated for reception of an SS/PBCH block and a resource allocated for transmission of an SRS triggered/indicated via DCI overlap each other in the time domain, the UE may receive the SS/PBCH block. That is, the UE may not perform the transmission of the SRS triggered/indicated via DCI, and the UE may receive the SS/PBCH block. The UE may receive the SS/PBCH block first in order to acquire the cell initial access and initial cell information first.

FIG. 30 illustrates a method in which a UE performs uplink transmission and downlink reception through multiple subbands, respectively, according to an embodiment of the disclosure.

Referring to FIG. 30, the UE may receive a configuration of a first subband for uplink transmission in a time domain interval and a second subband for downlink reception in the time domain interval (S3010). The UE may perform the uplink transmission through a first resource configured or indicated for the uplink transmission in the first subband (S3020). The UE may perform the downlink reception through a second resource configured or indicated for the downlink reception in the second subband (S3030). The uplink transmission and the downlink reception are performed based on whether the first resource and the second resource overlap each other in the time domain interval. The first subband and the second subband may be configured or indicated on a frequency domain corresponding to the time domain interval. The frequency domain may be included in a carrier bandwidth of the UE.

When the first resource and the second resource overlap each other in the time domain, one of the uplink transmission and the downlink reception may be configured via higher-layer signaling, and the other may be indicated via downlink control information (DCI), the UE may perform an operation indicated via the DCI.

When the first resource and the second resource overlap each other in the time domain, the uplink transmission is indicated via first DCI, and the downlink reception is indicated via second DCI, the UE may perform an operation indicated via DCI recently received in a time domain between the first DCI and the second DCI.

When the first resource and the second resource entirely overlap each other in the time domain, the UE may perform one operation between the uplink transmission and the downlink reception.

When the first resource and the second resource partially overlap each other in the time domain, the UE may perform the downlink reception in the second resource. In this case, the uplink transmission may be performed in a resource remaining after excluding a resource overlapping with the second resource from the first resource. The uplink transmission may be rate-matched for the second resource and performed in the remaining resource.

When a last symbol of the second resource precedes a last symbol of the first resource, the uplink transmission may be performed in a resource remaining after excluding a resource overlapping with the second resource and a gap symbol after the last symbol of the second resource from the first resource.

The uplink transmission may be one of configured grant (CG) physical uplink shared channel (PUSCH) type 1, CG PUSCH type 2, a dynamic grant (DG) PUSCH, a sounding reference signal (SRS) configured via radio resource control (RRC) signaling, and an SRS indicated via DCI.

The downlink reception may be one of a channel state information-reference signal (CSI-RS) configured via RRC, a semi-persistent scheduling (SPS) physical downlink shared channel (PDSCH) indicated via DCI, a DG PDSCH, and a synchronization signal/physical broadcast channel (SS/PBCH) block, or the downlink reception may be a physical downlink control channel (PDCCH), and the second resource may be a control resource set (CORESET).

The time domain interval may be semi-statically configured or dynamically indicated.

A UE performing the method described with reference to FIG. 30 may be the UE described in FIG. 11. Specifically, the UE may include a communication module configured to transmit and receive wireless signals, and a processor configured to control the communication module. In this case, the processor of the UE may perform the method described in the present specification.

Furthermore, a base station performing the method described in the present specification may include a communication module configured to transmit and receive wireless signals, and a processor configured to control the communication module. In this case, the base station may be the base station described in FIG. 11. The processor of the base station may perform the method described in the present specification.

The method and system of the present disclosure are described in relation to specific embodiments, but configuration elements, a part of or the entirety of operations of the present disclosure may be implemented using a computer system having a general-purpose hardware architecture.

The foregoing descriptions of the present disclosure are for illustration purposes, and those skilled in the art, to which the present disclosure belongs, will be able to understand that modification to other specific forms can be easily achieved without changing the technical spirit or essential features of the present disclosure. Therefore, it should be understood that the embodiments described above are illustrative and are not restrictive in all respects. For example, each element described as one type may be implemented in a distributed manner, and similarly, elements described as being distributed may also be implemented in a combined form.

The scope of the present disclosure is indicated by claims to be described hereinafter rather than the detailed description, and all changes or modifications derived from the meaning and scope of the claims and their equivalent concepts should be interpreted as being included in the scope of the present disclosure.

The invention claimed is:

1. A user equipment (UE) configured to operate in a wireless communication system, the user equipment comprising,
a transceiver; and
a processor configured to control the transceiver,
wherein the processor is configured to:
receive a configuration of a first subband for uplink transmission in a time domain interval and a second subband for downlink reception in the time domain interval,
wherein the first subband and the second subband are configured in a frequency domain corresponding to the time domain interval,
wherein the frequency domain is included within a carrier bandwidth,
when a first resource for the uplink transmission within the first subband and a second resource for the downlink reception within the second subband overlap within the time domain interval:
i) perform the uplink transmission on the first resource or
ii) perform the downlink reception on the second resource.

2. The terminal of claim 1,
wherein the processor is configured to:
wherein the uplink transmission and the downlink reception are each configured by higher layer signaling or scheduled by downlink control information (DCI),
perform an operation scheduled by the DCI among the uplink transmission and the downlink reception.

3. The UE of claim 1,
wherein the uplink transmission and the downlink reception are not all configured by scheduled DCI.

4. The UE of claim 2, wherein the downlink reception is configured by the scheduled DCI.

5. The UE of claim 1,
wherein a portion of the first resource overlaps a portion of the second resource.

6. The UE of claim 1,
wherein when the downlink reception includes a SS/PBCH (synchronization signals/physical broadcast channel) reception, the downlink reception is performed on the second resource.

7. The UE of claim 1,
wherein the uplink transmission or the downlink reception is performed based on a switching gap.

8. The UE of claim 1,
wherein when a processing time for not performing the uplink transmission is met, the uplink transmission is not performed.

9. A method for use by a user equipment (UE) of a wireless communication system, the method comprising:
receiving a configuration of a first subband for uplink transmission in a time domain interval and a second subband for downlink reception in the time domain interval,
wherein the first subband and the second subband are configured in a frequency domain corresponding to the time domain interval,
wherein the frequency domain is included within a carrier bandwidth;
when a first resource for the uplink transmission within the first subband and a second resource for the downlink reception within the second subband overlap within the time domain interval:
i) performing the uplink transmission on the first resource or ii) performing the downlink reception on the second resource.

10. The method of claim 9,
wherein the uplink transmission and the downlink reception are each configured by higher layer signaling or scheduled by downlink control information (DCI),
wherein an operation scheduled by the DCI among the uplink transmission and the downlink reception is performed.

11. The method of claim 9,
wherein the uplink transmission and the downlink reception are not all scheduled by DCI.

12. The method of claim 10, wherein the downlink reception is configured by the DCI.

13. The method of claim 9, wherein a portion of the first resource overlaps a portion of the second resource.

14. The method of claim 9, wherein when the downlink reception includes a SS/PBCH (synchronization signals/physical broadcast channel) reception, the downlink reception is performed on the second resource.

15. The method of claim 9, wherein the uplink transmission or the downlink reception is performed based on a switching gap.

16. The method of claim 9, wherein when a processing time for not performing the uplink transmission is met, the uplink transmission is not performed.

17. A base station configured to operate in a wireless communication system, the base station comprising, a transceiver; and a processor configured to control the transceiver, wherein the processor is configured to:

transmit a configuration of a first subband for uplink reception in a time domain interval and a second subband for downlink transmission in the time domain interval, wherein the first subband and the second subband are configured in a frequency domain corresponding to the time domain interval, wherein the frequency domain is included within a carrier bandwidth, when a first resource for the uplink reception within the first subband and a second resource for the downlink transmission within the second subband overlap within the time domain interval:

i) perform the uplink reception on the first resource or ii) perform the downlink transmission on the second resource.

18. The base station of claim 17, wherein the uplink reception and the downlink transmission are each configured by higher layer signaling or scheduled by downlink control information (DCI).

19. The base station of claim 18, wherein the downlink transmission is scheduled by the DCI.

20. The base station of claim 17, wherein a portion of the first resource overlaps a portion of the second resource.

* * * * *